United States Patent
Hasegawa et al.

(10) Patent No.: US 11,739,187 B2
(45) Date of Patent: Aug. 29, 2023

(54) RESIN COMPOSITION, PRODUCTION METHOD THEREOF, MOLDED PRODUCT, MULTILAYER STRUCTURE, FILM, PRODUCTION METHOD THEREOF, VAPOR DEPOSITION FILM, PACKAGING MATERIAL, VACUUM PACKAGING BAG, VACUUM INSULATOR, THERMOFORMED CONTAINER, BLOW MOLDED CONTAINER, FUEL CONTAINER, AND BOTTLE-SHAPED CONTAINER

(71) Applicant: KURARAY CO., LTD., Kurashiki (JP)

(72) Inventors: Tatsuya Hasegawa, Kurashiki (JP); Hiroshi Kawai, Kurashiki (JP); Mizuko Oshita, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 198 days.

(21) Appl. No.: 16/958,559

(22) PCT Filed: Dec. 27, 2018

(86) PCT No.: PCT/JP2018/048062
§ 371 (c)(1),
(2) Date: Jun. 26, 2020

(87) PCT Pub. No.: WO2019/131844
PCT Pub. Date: Jul. 4, 2019

(65) Prior Publication Data
US 2020/0339771 A1  Oct. 29, 2020

(30) Foreign Application Priority Data

| Dec. 28, 2017 | (JP) | 2017-254566 |
| Nov. 22, 2018 | (JP) | 2018-219658 |
| Nov. 22, 2018 | (JP) | 2018-219663 |
| Nov. 22, 2018 | (JP) | 2018-219668 |
| Nov. 22, 2018 | (JP) | 2018-219673 |
| Nov. 22, 2018 | (JP) | 2018-219674 |

(51) Int. Cl.
| C08J 5/18 | (2006.01) |
| C08J 7/06 | (2006.01) |
| B32B 7/08 | (2019.01) |
| B32B 3/02 | (2006.01) |
| B32B 15/09 | (2006.01) |
| B32B 27/20 | (2006.01) |
| B32B 1/08 | (2006.01) |
| B32B 27/10 | (2006.01) |
| B32B 27/36 | (2006.01) |
| B32B 25/08 | (2006.01) |
| B32B 25/14 | (2006.01) |
| B32B 27/32 | (2006.01) |
| B65D 65/40 | (2006.01) |

(Continued)

(52) U.S. Cl.
CPC .............. *C08J 5/18* (2013.01); *B29C 51/002* (2013.01); *B29C 55/005* (2013.01); *B32B 27/08* (2013.01); *B32B 27/306* (2013.01); *B65D 65/40* (2013.01); *C08K 3/38* (2013.01); *B29K 2023/086* (2013.01); *B29L 2007/008* (2013.01); *C08J 2329/04* (2013.01)

(58) Field of Classification Search
None
See application file for complete search history.

(56) References Cited

U.S. PATENT DOCUMENTS

| 6,242,087 B1 | 6/2001 | Kawai |
| 6,503,588 B1 | 1/2003 | Hayashi et al. |

(Continued)

FOREIGN PATENT DOCUMENTS

| CN | 1289798 A | 4/2001 |
| CN | 106795232 A | 5/2017 |

(Continued)

OTHER PUBLICATIONS

International Search Report dated Apr. 2, 2019 in PCT/JP2018/048062 filed on Dec. 27, 2018, 2 pages.

*Primary Examiner* — Sheeba Ahmed
(74) *Attorney, Agent, or Firm* — Oblon, McClelland, Maier & Neustadt, L.L.P.

(57) ABSTRACT

Provided are a resin composition, a production method thereof, and a molded product and a multilayer structure each including such a resin composition. The resin composition enables: even in the case in which a film formation temperature is high, excessive elevation of torque to be inhibited with occurrence of neck-in during film formation being prevented; a molded product superior in appearance characteristics to be formed continuously for a long time period, with defects such as fish eyes and streaks being prevented; and further a thermoformable multilayer structure to be produced continuously for a long time period, the thermoformable multilayer structure being capable of providing a thermoformed product superior in appearance characteristics. A resin composition containing: an ethylene-vinyl alcohol copolymer (A) having an ethylene unit content of 20 to 60 mol %; and a boron compound (B), the boron compound (B) including a free boric acid (C), with a content of the boron compound (B) with respect to the ethylene-vinyl alcohol copolymer (A) being 100 ppm or more and 5,000 ppm or less in terms of orthoboric acid, and a proportion of the free boric acid (C) in the boron compound (B) being 0.1% by mass or more and 10% by mass or less in terms of orthoboric acid.

24 Claims, 5 Drawing Sheets

(51) Int. Cl.
*C08K 3/38* (2006.01)
*C08K 3/32* (2006.01)
*C08K 5/09* (2006.01)
*C08L 29/04* (2006.01)
*B29C 51/00* (2006.01)
*B29C 55/00* (2006.01)
*B32B 27/08* (2006.01)
*B32B 27/30* (2006.01)
*B29K 23/00* (2006.01)
*B29L 7/00* (2006.01)

(56) References Cited

U.S. PATENT DOCUMENTS

2003/0060550 A1* 3/2003 Inomata ............... C08K 3/38
524/394

2004/0170787 A1* 9/2004 Michihata ............. B32B 27/304
428/35.7
2005/0038163 A1 2/2005 Shindome et al.
2007/0029689 A1 2/2007 Miyazumi et al.
2017/0183426 A1 6/2017 Kawai et al.

FOREIGN PATENT DOCUMENTS

| | | |
|---|---|---|
| JP | 11-293078 A | 10/1999 |
| JP | 2001-58374 A | 3/2001 |
| JP | 2001-164059 A | 6/2001 |
| JP | 2002-310385 A | 10/2002 |
| JP | 2005-89482 A | 4/2005 |
| JP | 2005-119039 A | 5/2005 |
| JP | 2014-34647 A | 2/2014 |
| JP | 2015-54878 A | 3/2015 |
| JP | 2016-28886 A | 3/2016 |
| WO | WO 00/20211 A1 | 4/2000 |
| WO | WO 2017/110568 A1 | 6/2017 |

* cited by examiner

RESIN COMPOSITION, PRODUCTION METHOD THEREOF, MOLDED PRODUCT, MULTILAYER STRUCTURE, FILM, PRODUCTION METHOD THEREOF, VAPOR DEPOSITION FILM, PACKAGING MATERIAL, VACUUM PACKAGING BAG, VACUUM INSULATOR, THERMOFORMED CONTAINER, BLOW MOLDED CONTAINER, FUEL CONTAINER, AND BOTTLE-SHAPED CONTAINER

TECHNICAL FIELD

The present invention relates to a resin composition, a production method thereof, a molded product, a multilayer structure, a film, a production method thereof, a vapor deposition film, a packaging material, a vacuum packaging bag, a vacuum insulator, a thermoformed container, a blow-molded container, a fuel container, and a bottle-shaped container.

DISCUSSION OF THE BACKGROUND

Ethylene-vinyl alcohol copolymers (hereinafter, may be also referred to as "EVOH(s)") are polymeric materials that are superior in gas barrier properties, oil resistance, antistatic properties, mechanical strength and the like, and have been extensively used as various types of packaging materials such as films, sheets, and containers.

For use of the EVOHs as various types of packaging materials and the like, an EVOH resin composition, melt molding of which can be comparatively easily carried out, has been proposed. Patent Document 1 describes that in production of a resin composition containing the EVOH and a boron compound in specific amounts, an EVOH having a moisture content of 20 to 80% by mass is brought into contact with an aqueous boron compound solution, in which a content of the boron compound in the aqueous boron compound solution is adjusted to be 0.001 to 0.5 parts by mass with respect to 100 parts by mass of the total amount of water contained in the EVOH and water contained in the aqueous boron compound solution, whereby the EVOH resin composition can be obtained which is superior in melt formability, particularly enables generation of fish eyes and the like to be inhibited in production of a multilayer laminate, and also is favorable in long-run formability.

Patent Document 2 discloses a multilayer structure obtained by coextrusion of a melt multilayer structure including: an EVOH resin composition layer containing a boron compound in an amount of 100 to 5,000 ppm in terms of orthoboric acid ($H_3BO_3$), a carboxylic acid and/or a salt thereof in an amount of 100 to 1,000 ppm in terms of the carboxylic acid, and an alkali metal salt in an amount of 50 to 300 ppm in terms of the metal; and a carboxylic acid-modified polyolefin resin layer adjacent thereto, and describes that thermal stability (long-run workability) during the production at a high temperature, and coextrusion film formation stability are improved.

Meanwhile, as a film in which the EVOH is used, there is known a vapor deposition film produced by laminating to a base film made of EVOH, an inorganic vapor deposition layer such as an aluminum vapor deposition layer and/or a silica vapor deposition layer (see Patent Document 3). Taking advantage of superior gas barrier properties and the like, such a vapor deposition film has been utilized as, for example, an external packaging material for encapsulating a core material of a vacuum insulator.

In addition, as a container in which the EVOH is used, there is known a thermoformed container having an EVOH layer (see Patent Document 4). Such a thermoformed container is formed by, for example, thermoforming using a multilayer sheet that includes: an EVOH layer; and a thermoplastic resin layer containing an olefin-derived resin and/or the like as a principal component. Due to being superior in an oxygen barrier property, the thermoformed container having the EVOH layer is extensively used in intended usages for which the oxygen barrier property is demanded, for example, in a variety of fields such as foods, cosmetics, medical drugs, chemicals, and toiletries. The multilayer sheet for use in the thermoforming described above is typically produced by melt molding such as coextrusion molding.

There is also known, as a container in which the EVOH is used, a blow-molded container having an EVOH layer (see Patent Document 5). In the blow-molded container, a multilayer configuration is extensively employed which includes; an EVOH layer; another thermoplastic resin layer that is superior in moisture resistance, impact resistance, etc.; and the like. Due to being superior in gas barrier properties and the like, the blow-molded container having the EVOH layer is used for a variety of purposes such as fuel containers and various types of bottles.

PRIOR ART DOCUMENTS

Patent Documents

Patent Document 1: Japanese Unexamined Patent Application, Publication No. H11-293078
Patent Document 2: PCT International Publication No. 2000/020211
Patent Document 3: Japanese Unexamined Patent Application, Publication No. 2002-310385
Patent Document 4: Japanese Unexamined Patent Application, Publication No. 2001-058374
Patent Document 5: Japanese Unexamined Patent Application, Publication No. 2005-089482

SUMMARY OF THE INVENTION

Problems to be Solved by the Invention

According to the conventional EVOH resin compositions described above, in an attempt to meet demands for further speeding up melt molding at a high temperature, there may exist a case in which it is difficult to maintain and improve film formation stability and long-run workability. In addition, the conventional EVOH resin compositions are not considered to be satisfactory in film formability and the like.

Specifically, in cases in which the EVOH resin compositions are used as various types of packaging materials, although performance according to an intended purpose for use may be exhibited, problems in terms of appearance such as generation of fish eyes, streaks, seeds, and coloring; as well as problems in terms of neck-in, elevation of torque, and the like during film formation may be caused. The fish eye as referred to herein means a crosslinked structure produced by partially increased viscosity through local proceeding of crosslinking. The streak as referred to herein means a transparent stripy defect generated on a surface of a molded article, and is considered to result from layer turbulence and partial crosslinking. The seed as referred to herein means a particulate defect, and is considered to be generated by gelation through partial crosslinking. These may be the cause of impairment of the appearance, as well as deterioration of performance properties such as gas barrier properties. Furthermore, the neck-in as referred to herein means a phenomenon in film molding with a T die in which a width of the film extruded becomes smaller than an effective width of the die. Particularly, in a case in which a thermoformed container or the like is produced by secondary processing of a multilayer structure produced at a high film formation temperature over a long period of time, the problems in terms of the appearance tend to occur prominently. Thus, it is important for a resin composition as a melt molding material to have long-run workability, as generally referred to, i.e., stable melt molding being enabled over a long period of time while favorable characteristics are maintained even when melt molding is continuously carried out for a long time period.

Moreover, a film obtained by film formation of the EVOH resin composition may be subjected to a stretching treatment for improving strength and the like, and stripy unevenness may be caused on the film in stretching. Such stretching unevenness may be a cause of deterioration of the appearance, as well as performance properties such as gas barrier properties. Particularly, the aforementioned fish eye and stretching unevenness are more likely to be generated in a case in which a film is formed at a comparatively high temperature and a high speed, and/or formed continuously for a long time period. In addition, there are cases in which storage and/or transportation are/is conducted at a low temperature in a state of the contents being packaged with a packaging material in order to, for example, maintain freshness of contents. However, a packaging material formed from the EVOH resin composition is disadvantageous in that hardening occurs at a low temperature, and cracks and the like are likely to be generated upon impact. Similarly, a vapor deposition film is also required to be capable of maintaining its favorable gas barrier properties even at a low temperature or a high temperature, in cases of use for packaging materials such as vacuum insulators. Particularly, for example, in a case in which the vacuum insulator that includes, as an external packaging material, the vapor deposition film which is provided with the base film made of EVOH is, for instance, transported at a low temperature, the base film hardens at the low temperature, leading to a disadvantage that cracks and the like are likely to be generated upon impact. When the cracks and the like are generated, deterioration of gas barrier properties and the like may occur. Thus, the vapor deposition film and the film used as a packaging material or the like are demanded to be favorable in impact resistance even in an environment at a low temperature.

Furthermore, in a case in which the conventional EVOH resin composition is used, thickness unevenness of a layer occurs when coextrusion molding of a multilayer sheet is carried out, and thus the thermoformed container obtained from the multilayer sheet may be accompanied by defects in appearance such as streaks, seeds, and coloring. These defects tend to be marked when the multilayer sheet obtained by film formation at a comparatively high temperature and a high speed, and/or continuously for a long time period is used for thermoforming. Similarly, in a case in which a multilayer blow molding is carried out using a conventional EVOH resin composition continuously for long time period, a blow-molded container obtained may be accompanied by defects in appearance such as streaks and seeds. These defects such as thickness unevenness of the layer, streaks, and seeds can be causes of not only impairment of the appearance, but also deterioration of aspects of performance such as gas barrier properties. For example, for storage, transportation and the like of food, fuel and the like at a low temperature, thermoformed containers and blow-molded containers are demanded to have strength against impact and to allow gas barrier properties to be maintained even in an environment of a low temperature. However, the thermoformed container and the blow-molded container which include the EVOH layer are likely to be accompanied by hardening of the EVOH layer at a low temperature; therefore, cracks and the like upon impact are likely to be generated and gas barrier properties tend to be deteriorated. In this regard, when the thickness unevenness of the layer, the streaks and the seeds described above significantly occur, these may serve as origins that are likely to result in cracks and the like upon impact, thereby leading to deterioration of the gas barrier properties.

The present invention was made in view of the foregoing circumstances, and an object of the present invention is to provide a resin composition and a production method thereof; and a molded product and a multilayer structure each including such a resin composition. The resin composition enables: even in the case in which a film formation temperature is high, excessive elevation of torque to be inhibited with occurrence of neck-in during film formation being prevented; a molded product superior in appearance characteristics to be formed continuously for a long time period, with defects such as fish eyes and streaks being prevented; and further a thermoformable multilayer structure to be produced continuously for a long time period, the thermoformable multilayer structure being capable of providing a thermoformed product superior in appearance characteristics.

An object of the present invention also includes providing: a film that is superior in film formability, stretchability, and impact resistance at a low temperature and a production method thereof, and a packaging material and a vacuum packaging bag in which such a film is used; a vapor deposition film that is superior in film formability, stretchability, and impact resistance at a low temperature, and a packaging material and a vacuum insulator in which such a vapor deposition film is used; a thermoformed container that is accompanied by fewer streaks and seeds, and less coloring and thickness unevenness of the layer, and is superior in impact resistance at a low temperature; and a blow-molded container that is accompanied by fewer streaks and seeds, and is superior in impact resistance at a low temperature, and a fuel container and a bottle-shaped container each including such a blow-molded container.

Means for Solving the Problems

Specifically, the present invention is accomplished by providing the following.
(1) A resin composition containing an ethylene-vinyl alcohol copolymer (A) having an ethylene unit content of 20 to 60 mol % (hereinafter, may be abbreviated as "EVOH (A)") and a boron compound (B), wherein the boron compound (B) includes a free boric acid (C), a content of the boron compound (B) with respect to the EVOH (A) is 100 ppm or more and 5,000 ppm or less in terms of orthoboric acid, and a proportion of the free boric acid (C) in the boron compound (B) is 0.1% by mass or more and 10% by mass or less in terms of orthoboric acid.
(2) The resin composition according to (1) further containing a phosphoric acid compound in an amount of 1 ppm or more and 500 ppm or less in terms of phosphate radical.

(3) The resin composition according to (1) or (2) further containing a carboxylic acid and/or a carboxylate ion in an amount of 0.01 μmol/g or more and 20 μmol/g or less in terms of carboxylate radical.

(4) The resin composition according to any one of (1) to (3), wherein a melt index measured in accordance with ASTM D1238 at 190° C. under a load of 2,160 g is 0.1 to 15 g/10 min.

(5) A production method of the resin composition according to any one of (1) to (4), the production method including: a dehydrating step of dehydrating a composition containing an EVOH (A), a boron compound (B), and water; and a drying step of thereafter drying the composition at a temperature of 70° C. or higher.

(6) A molded product including the resin composition according to any one of (1) to (4).

(7) The molded product according to (6) which is a film or a sheet.

(8) A multilayer structure including: a resin composition layer formed from the resin composition according to any one of (1) to (4); and a thermoplastic resin layer.

(9) A film formed from the resin composition according to any one of (1) to (4).

(10) The film according to (9) which is a stretched film.

(11) A production method of the film according to (10) which includes a step of stretching the film according to (9).

(12) A vapor deposition film including: a base film (X) formed from the resin composition according to any one of (1) to (4); and an inorganic vapor deposition layer (Y) provided to at least one face side of the base film (X).

(13) The vapor deposition film according to (12), wherein the inorganic vapor deposition layer (Y) is provided to each of both face sides of the base film (X).

(14) The vapor deposition film according to (12) or (13), wherein an average thickness of the inorganic vapor deposition layer (Y) is 15 nm or more and 150 nm or less.

(15) A packaging material including the film according to (9) or (10), or the vapor deposition film according to any one of (12) to (14).

(16) A vacuum packaging bag including the film according to (9) or (10).

(17) A vacuum insulator including the vapor deposition film according to any one of (12) to (14).

(18) A thermoformed container including a layer formed from the resin composition according to any one of (1) to (4).

(19) The thermoformed container according to (18) which is a cup-shaped container.

(20) The thermoformed container according to (18) which is a tray-shaped container.

(21) A blow-molded container including a layer formed from the resin composition according to any one of (1) to (4).

(22) A fuel container including the blow-molded container according to (21).

(23) A bottle-shaped container including the blow-molded container according to (21).

Effects of the Invention

The present invention can provide: a resin composition and a production method thereof; and a molded product and a multilayer structure each including such a resin composition. The resin composition enables: even in the case in which a film formation temperature is high, excessive elevation of torque to be inhibited with occurrence of neck-in during film formation being prevented; a molded product superior in appearance characteristics to be formed continuously for a long time period, with defects such as fish eyes and streaks being prevented; and further a thermoformable multilayer structure to be produced continuously for a long time period, the thermoformable multilayer structure being capable of providing a thermoformed product superior in appearance characteristics.

Also, the present invention can provide: a film that is superior in film formability, stretchability, and impact resistance at a low temperature and a production method thereof, and a packaging material and a vacuum packaging bag in which such a film is used; a vapor deposition film that is superior in film formability, stretchability, and impact resistance at a low temperature, and a packaging material and a vacuum insulator in which such a vapor deposition film is used; a thermoformed container that is accompanied by fewer streaks and seeds, and less coloring and thickness unevenness of the layer, and is superior in impact resistance at a low temperature; and a blow-molded container that is accompanied by fewer streaks and seeds, and is superior in impact resistance at a low temperature, and a fuel container and a bottle-shaped container each including such a blow-molded container.

DESCRIPTION OF EMBODIMENTS

Resin Composition

Figure 1:
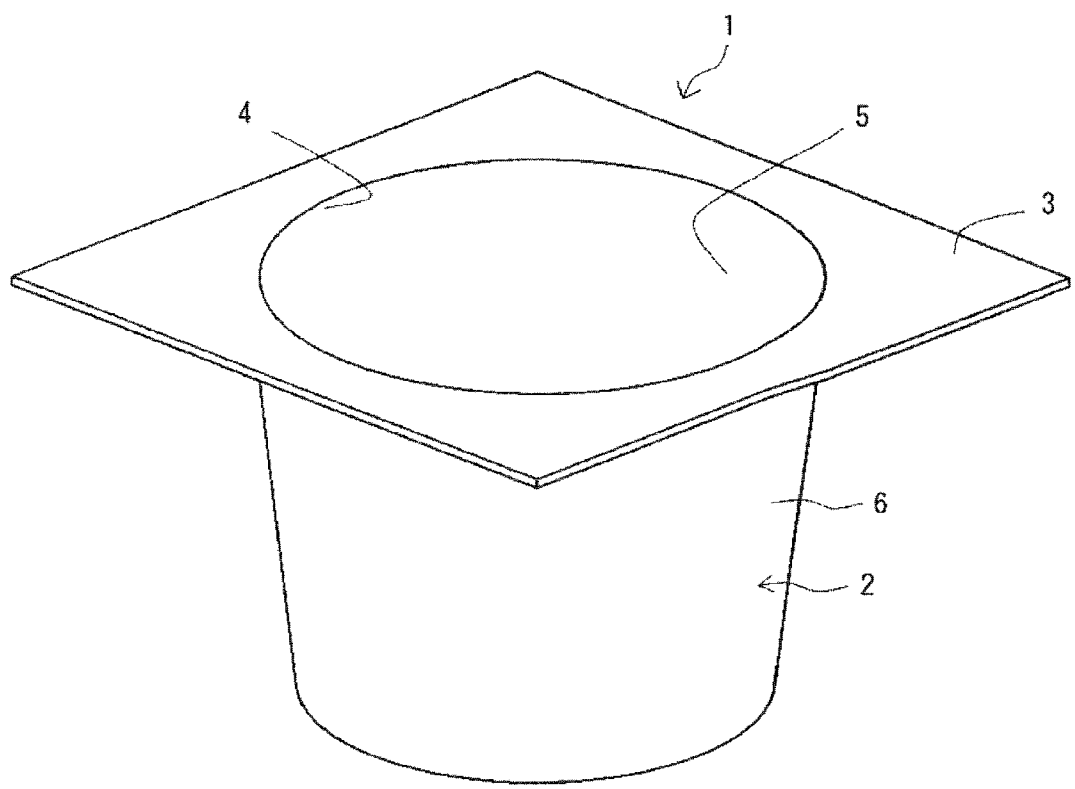
FIG. 1 shows a schematic perspective view illustrating a cup-shaped container which is one embodiment of a thermoformed container according to the present invention.

The resin composition of the embodiment of the present invention contains the EVOH (A) and the boron compound (B), wherein the boron compound (B) includes the free boric acid (C), a content of the boron compound (B) with respect to the EVOH (A) is 100 ppm or more and 5,000 ppm or less in terms of orthoboric acid, and a proportion of the free boric acid (C) in the boron compound (B) is 0.1% by mass or more and 10% by mass or less in terms of orthoboric acid. Due to containing the free boric acid (C) in the boron compound (B) at a certain proportion, local elevation of viscosity can be inhibited, and thus film formation stability during coextrusion film formation can be improved. More specifically, according to the resin composition of the embodiment of the present invention, even in the case in which a film formation temperature is high, problems during film formation such as neck-in and elevation of torque, as well as problems in appearance such as generation of fish eyes and/or streaks can be solved. In addition, the resin composition of the embodiment of the present invention enables the aforementioned characteristics to be maintained in continuous melt molding over a long period of time, and is thus superior in long-run workability.

The resin composition of the embodiment of the present invention is, as described later in detail, suitable as a molding material of various types of molded products such as a multilayer structure, a film, a vapor deposition film, a packaging material, a vacuum packaging bag, a thermoformed container, a blow-molded container, a fuel container, and a bottle-shaped container. The various types of molded products obtained from the resin composition of the embodiment of the present invention are superior in their appearance, impact resistance at a low temperature, and the like. It is to be noted that the term "impact resistance at a low temperature" as referred to herein means resistance against impact in a low-temperature environment.

MI

It is preferred that the resin composition of the embodiment of the present invention has a melt index (hereinafter, may be abbreviated as "MI") of 0.1 to 15 g/10 min as measured at 190° C. under a load of 2,160 g in accordance with ASTM D1238. When the MI is 50 g/10 min or less, mechanical strength of various types of molded products such as films may be enhanced. In addition, since excessive lowering of the melt viscosity during melt molding at a high temperature can be obviated, occurrence of neck-in is reduced and thus film formation stability may be further improved. The MI at 190° C. under a load of 2,160 g is preferably 15 g/10 min or less, more preferably 10 g/10 min or less, still more preferably 6.6 g/10 min or less, even more preferably 6 g/10 min or less, and particularly preferably 2 g/10 min or less. Meanwhile, when the MI is 0.1 g/10 min or more, breakage of various types of molded products such as films, as well as melt formation of a film becoming difficult due to elevation of resin pressure during resin extrusion can be inhibited even in the case in which a drawing speed during melt molding is high. Moreover, generation of fish eyes, streaks and the like in a case of an operation for a long time period at a high temperature can be further inhibited, and an output, i.e., an amount of a dischargeable resin when extruded with identical energy being charged can be increased. From these standpoints, the MI at 190° C. under a load of 2,160 g is preferably 0.2 g/10 min or more, and more preferably 0.5 g/10 min or more.

Moreover, when the MI of the resin composition of the embodiment of the present invention falls within the above range, thickness unevenness between a central portion and vicinities of both ends of a layer formed from the resin composition of the embodiment of the present invention can be inhibited when multilayer film formation by coextrusion is carried out. By thus forming a thermoformed container using a multilayer sheet in which thickness unevenness has been prevented, impact resistance at a low temperature of a resulting thermoformed container can be improved. Moreover, when the MI falls within the above range, generation of streaks resulting from layer turbulence during blow molding for a long time period, as well as generation of seeds arising from local crosslinking can be inhibited. Accordingly, the impact resistance of the blow-molded container at a low temperature can be improved.

Hereinafter, each component of the resin composition of the embodiment of the present invention will be described.

EVOH (A)

The EVOH (A) is a copolymer having an ethylene unit and a vinyl alcohol unit, and having an ethylene unit content of 20 to 60 mol %. The EVOH (A) is typically obtained by saponification of an ethylene-vinyl ester copolymer, and production and saponification of the ethylene-vinyl ester copolymer can be carried out by a well-known procedure. A vinyl ester is typically vinyl acetate; however, vinyl ester may be another aliphatic carboxylic acid vinyl ester such as vinyl formate, vinyl propionate, vinyl valerate, vinyl caprate, vinyl laurate, vinyl stearate, vinyl pivalate or vinyl versatate.

An ethylene unit content of the EVOH (A) is typically 20 mol % or more, preferably 25 mol % or more, and more preferably 27 mol % or more. The ethylene unit content of the EVOH (A) is typically 60 mol % or less, preferably 55 mol % or less, and more preferably 50 mol % or less. When the ethylene unit content is less than 20 mol %, thermal stability during melt extrusion may be impaired and gelation is likely to occur, whereby streaks, fish eyes, seeds and the like tend to be generated. Particularly, at a higher temperature or at a higher speed than general conditions these events are prominent when the operation is carried out for a long time period. When the ethylene unit content is greater than 60 mol %, gas barrier properties tend to deteriorate.

A degree of saponification of the EVOH (A) is preferably 90 mol % or more, more preferably 95 mol % or more, and still more preferably 99 mol % or more. When the degree of saponification of the EVOH (A) is 90 mol % or more, gas barrier properties, thermal stability, and moisture resistance of the resin composition of the embodiment of the present invention, and various types of molded products such as films obtained from the resin composition of the embodiment of the present invention tend to be favorable. Alternatively, the degree of saponification may be 100 mol % or less, 99.97 mol % or less, or 99.94 mol % or less.

In addition, the EVOH (A) may also have a unit derived from an other monomer aside from ethylene, vinyl ester and saponification products thereof, within a range not leading to impairment of the object of the present invention. In the case in which the EVOH (A) has the unit derived from the other monomer, a content of the unit derived from other monomer with respect to total structural units of the EVOH (A) is preferably 30 mol % or less, more preferably 20 mol % or less, still more preferably 10 mol % or less, even more preferably 5 mol % or less, and may be yet more preferably 1 mol % or less. Further, in the case in which the EVOH (A) has the unit derived from the other monomer, the content may be 0.05 mol % or more, or 0.10 mol % or more. Examples of the other monomer include: unsaturated carboxylic acids such as acrylic acid, methacrylic acid, crotonic acid and itaconic acid, and anhydrides, salts, mono or dialkyl esters or the like thereof; nitriles such as acrylonitrile and methacrylonitrile; amides such as acrylamide and methacrylamide; olefin sulfonic acids such as vinylsulfonic acid, allyl sulfonic acid and methallylsulfonic acid, and salts thereof; vinylsilane compounds such as vinyltrimethoxysilane, vinyltriethoxysilane, vinyltri(β-methoxy-ethoxy)silane, and γ-methacryloxypropylmethoxysilane; alkyl vinyl ethers; vinyl ketone, N-vinylpyrrolidone, vinyl chloride, vinylidene chloride, and the like.

Moreover, the unit derived from the other monomer may be at least any one of a structural unit (I) represented by the following formula (I), a structural unit (II) represented by the following formula (II), and a structural unit (III) represented by the following formula (III).

-continued

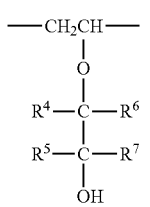
(II)

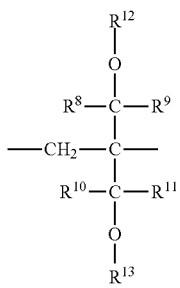
(III)

In the structural unit (I), the structural unit (II), and the structural unit (III), $R^1$, $R^2$, $R^3$, $R^4$, $R^5$, $R^6$, $R^7$, $R^8$, $R^9$, $R^{10}$, and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group, wherein $R^4$ and $R^5$, $R^6$ and $R^7$, and one pair among $R^1$, $R^2$ and $R^3$ may bond to each other. A part or all of hydrogen atoms in the aliphatic hydrocarbon group having 1 to 10 carbon atoms, the alicyclic hydrocarbon group having 3 to 10 carbon atoms and the aromatic hydrocarbon group having 6 to 10 carbon atoms may be substituted with a hydroxyl group, an alkoxy group, a carboxyl group, or a halogen atom. In the structural unit (III), $R^{12}$ and $R^{13}$ each independently represent a hydrogen atom, a formyl group or an alkanoyl group having 2 to 10 carbon atoms.

In the case in which the EVOH (A) has the structural unit (I), (II) or (III), flexibility and processing characteristics of the resin composition are improved, and thus stretchability, thermoformability and the like in various types of molded products such as the film and the multilayer structure tend to be favorable.

In the structural unit (I), (II) or (III), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group and the like.

In the structural unit (I), it is preferred that $R^1$, $R^2$ and $R^3$ each independently represent a hydrogen atom, a methyl group, an ethyl group, a hydroxy group, a hydroxymethyl group or a hydroxyethyl group, and of these, in light of enabling further improvements of formability of the resin composition, as well as stretchability and thermoformability in various types of molded products such as the multilayer structure to be obtained, it is more preferred that $R^1$, $R^2$ and $R^3$ each independently represent a hydrogen atom, a methyl group, a hydroxyl group or a hydroxymethyl group.

A procedure for incorporating the structural unit (I) in the EVOH (A) is not particularly limited, and in an exemplary procedure, a monomer from which the structural unit (I) is derived is copolymerized in polymerization of the ethylene and the vinyl ester. Examples of the monomer from which the structural unit (I) is derived include: alkenes such as propylene, butylene, pentene, and hexene; alkenes having a hydroxyl group or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, and 5,6-diacyloxy-1-hexene. Of these, in light of copolymerization reactivity, and processibility and gas barrier properties of the various types of molded products to be obtained, propylene, 3-acyloxy-1-propene, 3-acyloxy-1-butene, 4-acyloxy-1-butene, and 3,4-diacyloxy-1-butene are preferred. It is to be noted that the "acyloxy" is preferably acetoxy, and specifically, 3-acetoxy-1-propene, 3-acetoxy-1-butene, 4-acetoxy-1-butene, or 3,4-diacetoxy-1-butene is preferred. In the case of the alkene having an ester, the alkene is derived into the structural unit (I) in a reaction of the saponification.

In the structural unit (II), it is preferred that $R^4$ and $R^5$ both represent a hydrogen atom. Particularly, it is more preferred that $R^4$ and $R^5$ both represent a hydrogen atom, and that one of $R^6$ and $R^7$ represents an aliphatic hydrocarbon group having 1 to 10 carbon atoms, whereas the other of these represents a hydrogen atom. The aliphatic hydrocarbon group is preferably an alkyl group or an alkenyl group. In light of placing particular emphasis on gas barrier properties in the various types of molded product such as a multilayer structure to be obtained, it is more preferred that one of $R^6$ and $R^7$ represents a methyl group or an ethyl group, whereas the other of these represents a hydrogen atom. Further, it is still more preferred that one of $R^6$ and $R^7$ represents a substituent represented by $(CH_2)_hOH$ (wherein h is an integer of 1 to 8), whereas the other of these represents a hydrogen atom. In the substituent represented by $(CH_2)_hOH$, h is preferably an integer of 1 to 4, more preferably 1 or 2, and still more preferably 1.

A procedure for incorporating the structural unit (II) in the EVOH (A) is not particularly limited and, for example, a procedure in which a monovalent epoxy compound is allowed to react with the EVOH (A) obtained by a saponification reaction to permit incorporation, or the like may be employed. Examples of the monovalent epoxy compound which may be suitably used include compounds represented by the following formulae (IV) to (X).

(IV)

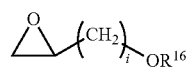
(V)

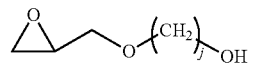
(VI)

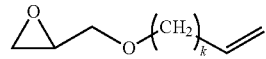
(VII)

-continued

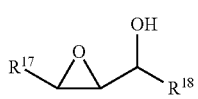
(VIII)

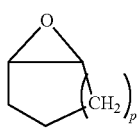
(IX)

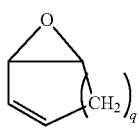
(X)

In the above formulae (IV) to (X), $R^{14}$, $R^{15}$, $R^{16}$, $R^{17}$ and $R^{18}$ each independently represent a hydrogen atom, an aliphatic hydrocarbon group having 1 to 10 carbon atoms (an alkyl group, an alkenyl group, etc.), an alicyclic hydrocarbon group having 3 to 10 carbon atoms (a cycloalkyl group, a cycloalkenyl group, etc.) or an aliphatic hydrocarbon group having 6 to 10 carbon atoms (a phenyl group, etc.); i, j, k, p and q are each independently an integer of 1 to 8, wherein in a case in which $R^{17}$ represents a hydrogen atom, $R^{18}$ has a substituent other than a hydrogen atom.

Examples of the monovalent epoxy compound represented by the above formula (IV) include epoxyethane (ethyleneoxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-epoxypropane, 3-phenyl-1,2-epoxypropane, and the like. Examples of the monovalent epoxy compound represented by the above formula (V) include various types of alkyl glycidyl ethers and the like. Examples of the monovalent epoxy compound represented by the above formula (VI) include various types of alkylene glycol monoglycidyl ethers. Examples of the monovalent epoxy compound represented by the above formula (VII) include various types of alkenyl glycidyl ethers. Examples of the monovalent epoxy compound represented by the above formula (VIII) include various types of epoxy alkanols such as glycidol. Examples of the monovalent epoxy compound represented by the above formula (IX) include various types of epoxy cycloalkanes. Examples of the monovalent epoxy compound represented by the above formula (X) include various types of epoxy cycloalkenes.

Among the monovalent epoxy compounds described above, the epoxy compounds having 2 to 8 carbon atoms are preferred. Particularly, in light of ease in handling the compound and in light of reactivity, the number of carbon atoms of the monovalent epoxy compound is more preferably 2 to 6, and still more preferably 2 to 4. Furthermore, the monovalent epoxy compound is particularly preferably the compound represented by the above formula (IV) or formula (V). Specifically, in light of: reactivity with the EVOH (A); processibility of the resin composition and various types of molded products such as films obtained therefrom; gas barrier properties; and the like, 1,2-epoxybutane, 2,3-epoxybutane, epoxypropane, epoxyethane or glycidol is preferred, and of these, epoxypropane or glycidol is more preferred.

In the above structural unit (III), it is preferred that $R^8$, $R^9$, $R^{10}$ and $R^{11}$ each represent a hydrogen atom or an aliphatic hydrocarbon group having 1 to 5 carbon atoms, and such an aliphatic hydrocarbon group is preferably a methyl group, an ethyl group, a n-propyl group, an isopropyl group, a n-butyl group, an isobutyl group, a tert-butyl group or a n-pentyl group.

A procedure for incorporating the structural unit (III) in the EVOH (A) is not particularly limited, and an exemplary procedure is described in Japanese Unexamined Patent Application, Publication No. 2014-034647.

One type of the EVOH (A) may be used alone, or two or more types thereof may be used in combination. In light of gas barrier properties and the like, a proportion of the EVOH (A) included in the resin composition of the embodiment of the present invention is preferably 70% by mass or more, still more preferably 80% by mass or more, and particularly preferably 90% by mass or more. Meanwhile, the proportion of the EVOH (A) included in the resin composition of the embodiment of the present invention is, for example, 99.9% by mass or less, and may be 99% by mass or less. The resin constituting the resin composition of the embodiment of the present invention may be substantially constituted from only the EVOH (A).

Boron Compound (B)

The resin composition of the embodiment of the present invention contains the boron compound (B) which includes the free boric acid (C) as described later in an amount of 100 ppm or more and 5,000 ppm or less in terms of orthoboric acid ($H_3BO_3$). The content of the boron compound (B) in terms of orthoboric acid has the same meaning as a content of total boron atoms in terms of orthoboric acid included in the resin composition of the embodiment of the present invention. Quantitative determination of the boron compound (B) may be carried out by a well-known procedure such as an ICP emission analysis, and specifically, the measurement can be conducted by a procedure described in the Examples. It is to be noted that "ppm" is on mass basis.

Examples of the boron compound (B) include: boric acids such as orthoboric acid ($H_3BO_3$), metaboric acid, and tetraboric acid; boric acid salts such as sodium metaborate, sodium tetraborate, sodium pentaborate, borax, lithium borate, and potassium borate; boric acid esters such as triethyl borate and trimethyl borate; and the like. Compounds obtained by reacting the boron compound (B) with a component (for example, EVOH (A)) other than the boron compound (B) are also included in the examples of the boron compound (B). Of these, orthoboric acid, borax or a derivative of either of these is preferably used in light of cost and improvement of melt formability. It is to be noted that a derivative as referred to herein means a compound, such as an ester or an amide thereof, obtained by reacting with orthoboric acid or the like.

The content of the boron compound (B) with respect to the EVOH (A) is, in terms of orthoboric acid, typically 100 ppm or more, preferably 500 ppm or more, and more preferably 700 ppm or more, or may be more preferably 1,000 ppm or more. When the content of the boron compound (B) is less than 100 ppm, neck-in tends to occur during coextrusion coating and/or other film formation. Moreover, when the content of the boron compound (B) is less than 100 ppm, thickness unevenness of the layer may be caused through reduction of viscosity during film formation of a multilayer sheet (multilayer structure) by coextrusion using the resin composition of the embodiment of the present invention. Specifically, thickness unevenness of the layer in which a central portion thins and vicinities of both ends thicken may occur. As a result, streaks and/or seeds resulting from layer turbulence are likely to be generated. In addition, when the content of the boron compound (B) is less than 100 ppm, streaks due to layer turbulence may increase in blow molding for a long time period using the resin composition of the embodiment of the present invention. When the thermoformed container or the blow-molded container is accompanied by many streaks and/or seeds, these may serve as origins that are likely to result in cracks and the like, and impact resistance at a low temperature may be reduced and gas barrier properties are likely to be deteriorated.

The content of the boron compound (B) in terms of orthoboric acid is typically 5,000 ppm or less, preferably 2,500 ppm or less, and more preferably 1,500 ppm or less. When the content of the boron compound (B) is greater than 5,000 ppm, excessive torque tends to be applied during film formation. Furthermore, when the content of the boron compound (B) is greater than 5,000 ppm, stretchability of a resulting film or the like tends to be decreased. Moreover, when the content of the boron compound (B) is greater than 5,000 ppm, thickness unevenness of the layer may be caused through increase in viscosity during film formation of the multilayer sheet by coextrusion using the resin composition of the embodiment of the present invention. Specifically, thickness unevenness of the layer in which a central portion thickens and vicinities of both ends thin may occur. As a result, streaks and/or seeds resulting from layer turbulence are likely to be generated. In addition, when the content of the boron compound (B) is greater than 5,000 ppm, streaks and/or seeds may increase in blow molding for a long time period using the resin composition of the embodiment of the present invention, and as a result, impact resistance at a low temperature of a resulting blow-molded container may be reduced. Although the reasons for increased streaks and/or seeds when the content of the boron compound (B) is greater than 5,000 ppm are nor clarified, it is speculated that, for example, increased viscosity of the resin composition may have an affect due to a greater content of the boron compound (B).

Due to the content of the boron compound (B) with respect to the EVOH (A) being 100 ppm or more and 5,000 ppm or less in terms of orthoboric acid, the resin composition having a favorable melt extrusion property can be obtained, with occurrence of neck-in during film formation and excessive torque being inhibited.

Free Boric Acid (C)

The boron compound (B) includes the free boric acid (C) that is "an unreacted boric acid or a salt thereof". In general, most of the boron compound (B) other than the free boric acid (C) is a crosslinked boric acid. Meanwhile, the free boric acid (C) is present in the resin composition of the embodiment of the present invention in a state not having been crosslinked. With respect to quantitative determination of the free boric acid (C) in the resin composition of the embodiment of the present invention, the free boric acid (C) can be calculated by a procedure including: allowing the free boric acid (C) to react with a coordinatable compound, e.g., 2-ethyl-1,3-hexanediol, which is capable of forming a complex ion with boric acid; and thereafter calculating a reaction product by quantitative determination, and specifically the quantitative determination may be carried out by a procedure described in the Examples.

A proportion of the free boric acid (C) in the boron compound (B) is typically 0.1% by mass or more, preferably 0.3% by mass or more, and more preferably 0.5% by mass or more in terms of orthoboric acid with respect to the boron compound (B). When the proportion of the free boric acid (C) with respect to the boron compound (B) is less than 0.1% by mass, turbulence of the layer tends to be likely to occur during coextrusion molding, and thus stripes, streaks and the like resulting from the turbulence of the layer tend to be likely to be generated in carrying out thermoforming by using the multilayer structure including a layer formed from the resin composition of the embodiment of the present invention. Although the reasons for these events are not clarified, it is presumed to result from, for example, an excessively increased degree of crosslinking in the case of a proportion of the free boric acid (C) being too low. In particular, the tendency described above becomes prominent in a case in which thermoforming is performed using a multilayer structure produced continuously for a long time period. Therefore, impact resistance at a low temperature and the like of the thermoformed container, etc., including a layer formed from the resin composition of the embodiment of the present invention may be reduced, whereby the gas barrier properties may deteriorate. Furthermore, even if the content of the boron compound (B) is the same, as long as the proportion of the free boric acid (C) with respect to the boron compound (B) is less than 0.1% by mass, impact resistance of a resulting film, etc. at a low temperature may be reduced and thus the gas barrier properties after applying impact at the low temperature tend to be inferior. Although the reason for this event is not clarified, the presence of a certain amount of the free boric acid (C) is presumed to inhibit embrittlement of the film and the like at a low temperature.

Furthermore, when the proportion of the free boric acid (C) with respect to the boron compound (B) is less than 0.1% by mass, streaks may increase during blow molding for a long time period. Moreover, in a case of a comparatively high content of the boron compound (B) and a low proportion of the free boric acid (C) contained, proceeding of the crosslinking is suggested, and thus seeds are considered to be likely to increase during blow molding for a long period of time. When the proportion of the free boric acid (C) with respect to the boron compound (B) is less than 0.1% by mass, generation of these streaks and/or seeds may decrease impact resistance at a low temperature of a resulting blow-molded container or the like, and thus gas barrier properties may be deteriorated.

On the other hand, the proportion of the free boric acid (C) in the boron compound (B) is, with respect to the boron compound (B) in terms of orthoboric acid, typically 10% by mass or less, preferably 7% by mass or less, more preferably 3% by mass or less, and may be still more preferably 1.5% by mass or less or 1% by mass or less. When the proportion of the free boric acid (C) with respect to the boron compound (B) is greater than 10% by mass, a local crosslinking reaction that results from the free boric acid (C) proceeds, thereby leading to generation of fish eyes, streaks, seeds and the like during film formation, and the stretchability tends to be decreased. Therefore, impact resistance at a low temperature of the thermoformed container or the like which includes the layer formed from the resin composition of the embodiment of the present invention may be reduced and gas barrier properties may also be impaired. Such a tendency also becomes prominent in a case in which melt molding is carried out continuously for a long time period. Furthermore, in the case in which the proportion of the free boric acid (C) in the boron compound (B) is greater than 10% by mass, neck-in can be more likely to occur during film formation, gelatinous seeds generated by local crosslinking may increase, and/or impact resistance at a low temperature may be reduced.

Moreover, when the proportion of the free boric acid (C) with respect to the boron compound (B) is greater than 10% by mass, seed, streaks and the like may increase owing to, for example, proceeding of the local crosslinking reaction that results from the free boric acid (C) during blow molding for a long period of time. Accordingly, impact resistance at a low temperature of the resulting blow-molded container or the like may be reduced, and gas barrier properties may be deteriorated.

It is to be noted that the proportion of the free boric acid (C) in the boron compound (B) can be adjusted by a production method of the resin composition described later.

The upper limit of a content of the free boric acid (C) with respect to the EVOH (A) in terms of orthoboric acid is typically 500 ppm (10% of 5,000 ppm), preferably 200 ppm, more preferably 100 ppm, and may be more preferably 20 ppm or 10 ppm. When the content of the free boric acid (C) is the upper limit or less, the appearance characteristics, long-run workability, film formability, stretchability, and the like can be further enhanced. In addition, generation of seeds and the like can be inhibited, and impact resistance at a low temperature of a resulting thermoformed container, blow-molded container or the like can be improved. Meanwhile, the lower limit of the content of the free boric acid (C) is typically 0.1 ppm (0.1% of 100 ppm), preferably 0.5 ppm, more preferably 1 ppm, and may be still more preferably 3 ppm or 5 ppm. When the content of the free boric acid (C) is greater than the lower limit, generation of stripes, streaks and the like tends to be reduced when carrying out, for example, thermoforming using a multilayer structure including the layer formed from the resin composition of the embodiment of the present invention, as well as blow molding using the resin composition of the embodiment of the present invention. Additionally, when the content of the free boric acid (C) is the lower limit or more, impact resistance at a low temperature and the like of a resulting film, thermoformed container, blow-molded container or the like tend to be increased.

Other Optional Component(s)

The resin composition of the embodiment of the present invention may contain, as other component(s), resin(s) other than the EVOH (A) (other resin(s)), and additive(s) other than the boron compound (B) (other additive(s)), within a range not leading to impairment of the effects of the present invention.

The other resin is exemplified by a thermoplastic resin such as polyolefin. In the case in which the resin composition of the embodiment of the present invention contains the other resin(s), the content of the other resin(s) with respect to the resin composition is preferably 10% by mass or less, more preferably 5% by mass or less, and still more preferably 3% by mass or less.

The other additive is exemplified by well-known additives such as an antioxidant, an ultraviolet ray-absorbing agent, a plasticizer, an antistatic agent, a lubricant, a colorant, a filler, an antiblocking agent, and a drying agent. A procedure for incorporating these additives in the resin composition is exemplified by: a procedure of melting the resin composition and adding thereto the additive(s); a procedure of melt-blending the resin composition and the additive(s) in an extruder; a procedure of mixing a solid, liquid or solution of these additives with pellets of the resin composition in a powdery, granular, spherical, circular cylindrical chip form or the like to allow for impregnation with and/or spreading on the resin composition; and the like, but is not particularly limited thereto. These procedures may be appropriately selected taking into consideration physical properties of the additive, as well as permeability into the resin composition. In the case in which the other additive is contained, the content thereof with respect to the resin composition is preferably 5% by mass or less, and more preferably 3% by mass or less.

Examples of the antioxidant include 2,5-di-t-butylhydroquinone, 2,6-di-t-butyl-p-cresol, 4,4'-thiobis-(6-t-butylphenol), 2,2'methylene-bis(4-methyl-6-t-butylphenol), tetrakis-[methylene-3-(3',5'-di-t-butyl-4'-hydroxyphenyl) propionate]methane, octadecyl-3-(3',5'-di-t-butyl-4'-hydroxyphenyl)propionate, 4,4'-thiobis-(6-t-butylphenol), and the like. Examples of the ultraviolet ray-absorbing agent include ethyl-2-cyano-3,3-diphenyl acrylate, 2-(2'-hydroxy-5'-methylphenyl)-5-chlorobenzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like. Examples of the plasticizer include dimethyl phthalate, diethyl phthalate, dioctyl phthalate, waxes, liquid paraffin, phosphoric acid esters, and the like. Examples of the antistatic agent include pentaerythritol monostearate, sorbitan monopalmitate, sulfated oleic acids, polyethyleneoxides, carbowaxes, and the like. Examples of the lubricant include ethylene bisstearylamide, butyl stearate, calcium stearate, zinc stearate, and the like. Examples of the colorant include carbon black, phthalocyanine, quinacridone, indoline, azo pigments, titanium oxide, colcothar, and the like. Examples of the filler include glass fibers, mica, wollastonite, and the like.

Examples of the antiblocking agent include synthetic silica, calcium carbide, amorphous aluminosilicate, zeolite, diatomaceous earth, talc, feldspar, crosslinked polymethyl methacrylate, and the like. An average particle diameter of the antiblocking agent is, for example, preferably 0.5 to 10 µm, and more preferably 1 to 5 µm. The content of the antiblocking agent in the resin composition is, for example, preferably 0.005 to 0.5% by mass, and more preferably 0.01 to 0.1% by mass.

In addition, the resin composition of the embodiment of the present invention may also contain, in light of thermal stability or viscosity adjustability, various types of acid(s) and metal salt(s), and the like. Examples of the various types of acids include carboxylic acids, phosphoric acid compounds and the like, and examples of the various types of metal salts include alkali metal salts, alkaline earth metal salts, and the like. It is to be noted that these acids, metal salts and the like may be mixed with the EVOH (A) beforehand.

Carboxylic Acid and/or Carboxylate Ion

When the resin composition of the embodiment of the present invention contains the carboxylic acid and/or carboxylate ion, coloring resistance during melt molding tends to be improved. The carboxylic acid is a compound having one or more carboxy groups within its molecule. The carboxylate ion is derived from the carboxylic acid through elimination of a hydrogen ion of a carboxy group. The carboxylic acid may be a monocarboxylic acid or a polyhydric carboxylic acid compound having two or more carboxyl groups within its molecule, or may be a combination thereof. It is to be noted that the polyhydric carboxylic acid is not categorized as a polymer. The polyhydric carboxylate ion is derived from the polyhydric carboxylic acid through elimination of at least one hydrogen ion of at least one carboxy group. The carboxy group of the carboxylic acid may be an ester structure, and the carboxylate ion may form a salt with a metal.

The monocarboxylic acid is not particularly limited, and examples thereof include formic acid, acetic acid, propionic acid, butyric acid, caproic acid, capric acid, acrylic acid, methacrylic acid, benzoic acid, 2-naphthoic acid, and the like. These carboxylic acids may have a hydroxy group or a halogen atom. Examples of the carboxylate ion include those derived from each carboxylic acid described above through elimination of a hydrogen ion of the carboxy group. A pKa of this monocarboxylic acid (also including the monocarboxylic acid that gives the monocarboxylate ion) is, in light of the pH-adjustability and melt formability of the resin composition of the embodiment of the present invention, preferably 3.5 or more, and more preferably 4 or more. Examples of such a monocarboxylic acid include formic acid (pKa=3.68), acetic acid (pKa=4.74), propionic acid (pKa=4.85), butyric acid (pKa=4.80), and the like, and in light of ease in handling and the like, acetic acid is preferred.

The polyhydric carboxylic acid is not particularly limited as long as two or more carboxy groups are included in its molecule, and examples of the polyhydric carboxylic acid include: aliphatic dicarboxylic acids such as oxalic acid, malonic acid, succinic acid, maleic acid, fumaric acid, glutaric acid, adipic acid, and pimelic acid; aromatic dicarboxylic acids such as phthalic acid, isophthalic acid, and terephthalic acid; tricarboxylic acids such as aconitic acid; carboxylic acids having four or more carboxyl groups such as 1,2,3,4-butanetetracarboxylic acid and ethylenediaminetetraacetic acid; hydroxycarboxylic acids such as tartaric acid, citric acid, isocitric acid, malic acid, mucic acid, tartronic acid, and citramalic acid; ketocarboxylic acids such as oxalo acetic acid, mesoxalic acid, 2-ketoglutaric acid, and 3-ketoglutaric acid; amino acids such as glutamic acid, aspartic acid, and 2-aminoadipic acid; and the like. It is to be noted that examples of the polyhydric carboxylate ion include anions of these. Of these, succinic acid, malic acid, tartaric acid, and citric acid are particularly preferred due to favorable availability.

In the case in which the resin composition of the embodiment of the present invention contains the carboxylic acid and/or carboxylate ion, a content thereof in the resin composition in terms of carboxylate radical is, in light of coloring resistance during melt molding, preferably 0.01 μmol/g or more, more preferably 0.05 μmol/g or more, and still more preferably 0.5 μmol/g or more. Further, in terms of carboxylate radical, the content of the carboxylic acid and/or carboxylate ion is preferably 20 μmol/g or less, more preferably 15 μmol/g or less, and still more preferably 10 μmol/g or less.

Phosphoric Acid Compound

When the resin composition of the embodiment of the present invention contains the phosphoric acid compound, long-run workability during melt molding tends to be improved. Examples of the phosphoric acid compound include various types of phosphorus oxoacids such as phosphoric acid and phosphorous acid, and salts thereof, and the like, but are not particularly limited thereto. A phosphoric acid salt may be included in any form of "monobasic phosphoric acid salt (primary phosphoric acid salt)", "dibasic phosphoric acid salt (secondary phosphoric acid salt)", or "tribasic phosphoric acid salt (tertiary phosphoric acid salt)", and a counter cationic species thereof is also not particularly limited, and is exemplified by an alkali metal salt or an alkaline earth metal salt, with the alkali metal salt being preferred. Specifically, sodium dihydrogen phosphate, potassium dihydrogen phosphate, disodium hydrogen phosphate or dipotassium hydrogen phosphate is preferred in light of improvement of long-run workability during melt molding.

In the case in which the resin composition of the embodiment of the present invention contains the phosphoric acid compound, a content thereof in terms of phosphate radical is preferably 1 ppm or more, more preferably 5 ppm or more, and still more preferably 8 ppm or more. The content of the phosphoric acid compound in terms of phosphate radical is preferably 500 ppm or less, more preferably 200 ppm or less, and still more preferably 50 ppm or less. When the content of the phosphoric acid compound falls within the above range, long-run workability during melt molding can be further improved.

Alkali Metal Salt

When the resin composition of the embodiment of the present invention contains the alkali metal salt, long-run workability and interlayer adhesive force when formed into a multilayer structure can be improved. Examples of an alkali metal constituting the alkali metal salt include lithium, sodium, potassium, rubidium, cesium and the like, and in light of industrial availability, sodium and potassium are more preferred.

The alkali metal salt is not particularly limited, and is exemplified by an aliphatic carboxylic acid salt, an aromatic carboxylic acid salt, the phosphoric acid salt also involved in the phosphoric acid compound, a metal complex, and the like of lithium, sodium, potassium or the like. Specific examples of the alkali metal salt include sodium acetate, potassium acetate, sodium dihydrogen phosphate, disodium hydrogen phosphate, trisodium phosphate, potassium dihydrogen phosphate, dipotassium hydrogen phosphate, tripotassium phosphate, dihydrogen lithium phosphate, trilithium phosphate, sodium stearate, potassium stearate, a sodium salt of ethylenediamine tetraacetate, and the like. Of these, sodium acetate, potassium acetate and sodium dihydrogen phosphate are particularly preferred due to favorable availability.

In the case in which the resin composition of the embodiment of the present invention contains the alkali metal salt, a content of the alkali metal salt in the resin composition is preferably 2.5 μmol/g or more, more preferably 3.5 μmol/g or more, and still more preferably 4.5 μmol/g or more. Further, the content of the alkali metal salt is preferably 22 μmol/g or less, more preferably 16 μmol/g or less, and still more preferably 10 μmol/g or less. When the content of the alkali metal salt is 2.5 μmol/g or more, interlayer adhesiveness of a resulting multilayer structure can be more superior. Meanwhile, when the content of the alkali metal salt is 22 μmol/g or less, appearance of resulting various types of molded products such as films tends to be more favorable.

Alkaline Earth Metal Salt

When the resin composition of the embodiment of the present invention contains the alkaline earth metal salt, a scrap recovery property of various types of molded products containing the resin composition, such as multilayer structures and films, can be improved. Examples of an alkaline earth metal constituting the alkaline earth metal salt include beryllium, magnesium, calcium, strontium, barium and the like, and in light of industrial availability, magnesium or calcium is preferred.

The resin composition of the embodiment of the present invention is suitably used as a melt molding material. The upper limit of a moisture content of the resin composition may be, for example, 3% by mass or 1% by mass, and is preferably 0.08% by mass, and more preferably 0.05% by mass. When the moisture content is the upper limit or less, the content of the free boric acid (C) is more easily adjusted to a level of a more suitable amount. Meanwhile, the lower limit of the moisture content of the resin composition may be 0% by mass.

Production Method of Resin Composition

The resin composition of the embodiment of the present invention may be produced by, for example, the following steps.

(1) a step of copolymerizing ethylene with a vinyl ester to obtain an ethylene-vinyl ester copolymer (EVAc): Polymerizing step (2) a step of saponifying the EVAc to obtain EVOH (A): Saponifying step (3) a step of obtaining pellets containing the EVOH (A) from a solution or a paste containing the EVOH (A): Pelletizing step (4) a step of washing the pellets: Washing step (5) a step of dehydrating the pellets: Dehydrating step (6) a step of drying the pellets: Drying step It is to be noted that the pellets to be subjected to the dehydrating step contain the boron compound (B). In other words, the pellets to be subjected to the dehydrating step containing the EVOH (A), the boron compound (B) and water are a typical example of the composition.

(1) Polymerizing Step

A copolymerization procedure of ethylene and the vinyl ester is not particularly limited, and for example, and any one of solution polymerization, suspension polymerization, emulsion polymerization, bulk polymerization and the like may be employed, and either of a continuous system or a batchwise system may be adopted.

The vinyl ester for use in the polymerization is exemplified by those described above. Alternatively, in a case in which an other monomer aside from the vinyl ester and ethylene is copolymerized, the other monomer is exemplified by those described above.

A solvent for use in the polymerization is not particularly limited as long as it is an organic solvent capable of dissolving ethylene, the vinyl ester, and the ethylene-vinyl ester copolymer. Examples of the solvent include: alcohols such as methanol, ethanol, propanol, n-butanol, and tert-butanol; dimethyl sulfoxide; and the like. Of these, methanol is preferred in light of easy separation by removing after the reaction.

Examples of a catalyst for use in the polymerization include: azonitrile initiators such as 2,2'-azobisisobutyronitrile, 2,2'-azobis-(2,4-dimethylvaleronitrile), 2,2'-azobis-(4-methoxy-2,4-dimethylvaleronitrile), and 2,2'-azobis-(2-cyclopropylpropionitrile); organic peroxide initiators such as isobutyryl peroxide, cumyl peroxyneodecanoate, diisopropyl peroxycarbonate, di-n-propylperoxydicarbonate, t-butylperoxyneodecanoate, lauroylperoxide, benzoylperoxide, and t-butylhydroperoxide; and the like.

A polymerization temperature is, for example, preferably 20 to 90° C., and more preferably 40 to 70° C. A time period of the polymerization is, for example, preferably 2 to 15 hrs, and more preferably 3 to 11 hrs. A rate of the polymerization (conversion) is, with respect to the vinyl ester charged, preferably 10 to 90%, and more preferably 30 to 80%. A resin matter in a solution after the polymerization is preferably 5 to 85% by mass, and more preferably 20 to 70% by mass.

In general, after performing the polymerization for a certain time period or after the rate of polymerization has reached to a certain level, as needed, a polymerization inhibitor is added and unreacted ethylene is eliminated, and then an unreacted vinyl ester is eliminated. A procedure for eliminating the unreacted vinyl ester may be, for example, a procedure including: continuously feeding a reaction liquid at a certain rate from a top part of a tower filled with a filler such as a Raschig ring; blowing a vapor of an organic solvent such as methanol from a bottom part of the tower; distilling a vapor of a mixture of the organic solvent such as methanol and an unreacted vinyl ester away from the top part of the tower; and taking a copolymer solution (EVAc solution), after eliminating therefrom an unreacted vinyl ester, out from the tower bottom, or the like.

(2) Saponifying Step

Subsequently, the EVAc obtained by the above step is saponified. A saponification procedure can be either of a continuous system or a batchwise system. A catalyst of the saponification is not particularly limited, and preferably an alkali catalyst, for example, sodium hydroxide, potassium hydroxide, or alkali metal alcoholate may be used.

Conditions of the saponification involve, for example, in the case of the batchwise system: a concentration in the EVAc solution being preferably 10 to 50% by mass; a reaction temperature being preferably 30 to 60° C.; the amount of the catalyst to be used being preferably 0.02 to 0.6 mol per mol of the vinyl ester structural unit; and a time period of the saponification being preferably 1 to 6 hrs. In the case of the continuous system, since methyl acetate produced by the saponification can be more efficiently removed, the resin with a high degree of saponification can be obtained with the catalyst in a smaller amount in comparison with the case of the batchwise system, but the saponification at a higher temperature is a prerequisite for preventing deposition of the EVOH (A) produced by the saponification. Therefore, in the case of the continuous system, the conditions may involve, for example: the concentration in the EVAc solution being 10% by mass or more and 50% by mass or less; the reaction temperature being 70° C. or higher and 150° C. or lower; the amount of the catalyst to be used being 0.005 mol or more and 0.1 mol or less per mol of the vinyl ester structural unit; and the time period of the saponification being 1 hour or longer and 6 hrs or shorter.

By the saponifying step, a solution or paste containing the EVOH (A) is obtained. Since the EVOH (A) after the saponification reaction contains the alkali catalyst, as well as by-product salts such as sodium acetate and potassium acetate, and other impurities, these may be eliminated as needed by neutralization and washing. In this step, when the EVOH (A) after the saponification reaction is washed with ion exchanged water scarcely containing metal ions, chloride ions and the like, partially remaining sodium acetate, potassium acetate and the like may remain in the EVOH (A).

(3) Pelletizing Step and (4) Washing Step

Next, an EVOH (A) solution or paste thus obtained is pelletized. A pelletization procedure is not particularly limited, and is exemplified by: a procedure of cooling the EVOH (A) solution to permit coagulation followed by cutting; a procedure of melt kneading the EVOH (A) with an extruder followed by discharging and cutting; and the like. Specific examples of the cutting procedure of the EVOH (A) include: a procedure of extruding the EVOH (A) to have a strand shape, followed by cutting with a pelletizing machine (Procedure (i)); a procedure of discharging the EVOH (A) from a die, followed by cutting with a center hot cut system, an under water cut system or the like (Procedure (ii)); and the like.

Procedure (i)

In the case of pelletizing after extrusion of the EVOH (A) solution to have a strand shape, examples of a coagulation liquid for use in deposition of the EVOH (A) include: water; mixed solvents of water and alcohols; aromatic hydrocarbons such as benzene; ketones such as acetone and methyl ethyl ketone; ethers such as dipropyl ether; organic acid esters such as methyl acetate, ethyl acetate, and methyl propionate; and the like. In light of ease in handling, water or a mixed solvent of water and an alcohol is preferred. Examples of the alcohol which may be used include methanol, ethanol, propanol and the like, and methanol is industrially preferred. A mass ratio (coagulation liquid/EVOH (A) strands) of the coagulation liquid to the EVOH (A) strands in the coagulation liquid is preferably 50 to 10,000. When the mass ratio falls within the above range, EVOH (A) pellets can be obtained with uniform size distribution.

A temperature at which the EVOH (A) solution is brought into contact with the coagulation liquid (bath temperature upon the pelletizing) is preferably −10° C. or higher, and more preferably 0° C. or higher. Furthermore, a bath temperature during the pelletizing is preferably 40° C. or lower, more preferably 20° C. or lower, still more preferably 15° C. or lower, and particularly preferably 10° C. or lower. When the bath temperature during the pelletizing is −10° C. or higher, inhibition of deposition of components having low molecular weights tends to be enabled, while when the bath temperature is 40° C. or lower, inhibition of heat deterioration of the EVOH (A) tends to be enabled.

The EVOH (A) solution is extruded with a nozzle having an arbitrary shape into the coagulation liquid to have a strand shape. The shape of such a nozzle is not particularly limited, and, for example, a cylindrical shape is preferred. It is not necessary for the number of the strand to be one, and the extrusion may be conducted with an arbitrary number of the strands, ranging from several strands to several hundred strands.

Subsequently, the EVOH (A) extruded to have the strand shape is cut after sufficient coagulation has proceeded, followed by being pelletized and then washed with water. With regard to the size of such pellets, for example, the diameter may be 1 mm or more and 10 mm or less and the length may be 1 mm or more and 10 mm or less in the case of being cylindrical, and the diameter may be 1 mm or more and 10 mm or less in the case of being spherical.

Subsequently, the washing step is carried out in which the EVOH (A) pellets are washed with water in a water bath. By such a washing treatment, oligomers, impurities, etc. in the EVOH (A) pellets can be removed. The temperature of water during the washing is preferably 5° C. or higher, and preferably 80° C. or lower. For the washing, an aqueous acetic acid solution, ion exchanged water and/or the like may be used, and it is preferred that final washing is conducted with ion exchanged water. The washing with ion exchanged water is preferably conducted two or more times for one hour or longer each time. Moreover, the temperature of ion exchanged water during this step preferably falls within the range of 5 to 60° C., and a bath ratio of ion exchanged water to EVOH (A) pellets is preferably 2 or more.

After the washing step, the pellets are immersed in a solution containing the boron compound (B) (hereinafter, may be referred to as "immersion solution"), thereby allowing the boron compound (B) to be included in the pellets. In this process, the solution may contain other component(s) (for example, an acid component and a metal salt), such that the other component(s) are also included in the pellets.

A concentration of the boron compound (B) in the immersion solution in terms of orthoboric acid is preferably 0.01 to 2 g/L, since an appropriate amount of the boron compound (B) can be included in dry resin composition pellets. The lower limit of the concentration of the boron compound (B) in the immersion solution is more preferably 0.05 g/L, and still more preferably 0.2 g/L. When the concentration is 0.01 g/L or more, a sufficient crosslinking effect may result in the MI of the resin composition of the embodiment of the present invention being sufficient, whereby the neck-in tends to be less likely to occur. The upper limit of the concentration of the boron compound (B) is more preferably 1.5 g/L, and still more preferably 0.8 g/L. When the concentration is 2 g/L or less, gelation of the resin composition may be inhibited, and as a result, appearance characteristics of various types of molded products such as films tend to be further improved through further inhibition of generation of seeds and the like.

Procedure (ii)

In the case of pelletizing by way of melt kneading using an extruder, the shape of the EVOH (A) before being charged into the extruder is not particularly limited. For example, pellets obtained by cutting a molten resin extruded into the air may be used, or deposited matter in a clam shape formed by coagulation to have an irregular shape in a solution or paste of the EVOH (A) after polymerization/saponification, etc. may be used.

A moisture content of the EVOH (A) before being charged into the extruder is preferably 0.5% by mass or more, more preferably 5% by mass or more, and still more preferably 7% by mass or more. Furthermore, the moisture content of the EVOH (A) before being charged into the extruder is preferably 70% by mass or less, more preferably 60% by mass or less, and still more preferably 50% by mass or less.

In pelletization by way of melt kneading using an extruder, the boron compound (B) can be added to the EVOH (A) in the extruder. When the boron compound (B) is added to the EVOH (A) in the extruder, with respect to a feed position of the boron compound (B), addition at a position where the EVOH (A) is in a molten state in the extruder is preferred, and addition at a kneading zone is more preferred. Particularly, it is preferred that the boron compound (B) is added to the EVOH (A) in a water bearing and molten state. The boron compound (B) may be added into the extruder from one, or two or more sites, and in this process, other component(s) (for example, an acid component and a metal salt) may be concomitantly added.

In the case in which the boron compound (B) is added into the extruder, a feed rate in the extruder corresponds to a content in the resin composition. A form of the boron compound (B) to be added is not particularly limited, and a procedure for addition of the boron compound (B) is exemplified by: a procedure of adding the boron compound (B) in a dry powder form into the extruder; a procedure of adding the boron compound (B) in a paste form obtained by impregnation with a solvent; a procedure of adding the boron compound (B) in a state of being suspended in a liquid; a procedure of adding the boron compound (B) as a solution obtained by dissolving in a solvent; and the like. In light of controllability of the amount of addition and/or homogenous dispersibility of the boron compound (B) to the EVOH (A), the procedure of adding the boron compound (B) as a solution obtained by dissolving in a solvent is particularly suitable. Such a solvent is not particularly limited, and water is suitable in light of solubility of the boron compound (B), economical efficiency, favorable handlability, operation environment safety, and the like.

When the boron compound (B) is added as a solution to the EVOH (A), the amount of the solution to be added with respect to 100 parts by mass of a dry mass of the EVOH (A) is preferably 1 part by mass or more, more preferably 3 parts by mass or more, and particularly preferably 5 parts by mass or more. Furthermore, the amount of the solution to be added with respect to 100 parts by mass of the dry mass of the EVOH (A) is preferably 50 parts by mass or less, more preferably 30 parts by mass or less, and particularly preferably 20 parts by mass or less. In the case of the amount of the solution to be added being less than 1 part by mass, the concentration in the solution generally becomes so high that the dispersibility of the boron compound (B) tends to be inferior. Further, in the case of the amount exceeding 50 parts by mass, control of the moisture content of the EVOH (A) tends to be difficult, and thus phase separation of the resin and water contained in the resin tends to be likely to occur in the extruder. Furthermore, the concentration of orthoboric acid in the solution preferably falls within the range of from 0.2 g/L to 57 g/L, and may be appropriately adjusted by the amount of orthoboric acid to be included with respect to a dry weight of the EVOH (A), and the amount of the solution added.

A resin temperature in the extruder is preferably 70 to 170° C. When the resin temperature is lower than 70° C., the EVOH (A) may not be completely melted, and thus the dispersibility of the boron compound (B) add may not be insufficient. The resin temperature is more preferably 80° C. or higher, and still more preferably 90° C. or higher. Furthermore, in the case of the resin temperature being higher than 170° C., the EVOH (A) tends to become likely to be thermally deteriorated. Moreover, in the case of the boron compound (B) being added as the aqueous solution, evaporation of the moisture may be vigorous when the resin temperature is higher than 170° C., and therefore mixing the aqueous solution with the EVOH (A) at a suitable concentration in the aqueous solution tends to be difficult. The resin temperature in the extruder is more preferably 150° C. or lower, and still more preferably 130° C. or lower. A procedure for adjusting such a resin temperature is not particularly limited, and a procedure of suitably setting a temperature of a cylinder in the extruder is particularly preferred. It is to be noted that the resin temperature as referred to herein means a temperature detected by a temperature sensor attached to the cylinder in the extruder, and a temperature close to a discharge opening of a tip part of the extruder is indicated at the position of the detection.

A moisture content of the resin composition immediately after being discharged from the extruder is preferably 5 to 40% by mass, and more preferably 5 to 35% by mass. When the moisture content of the resin composition immediately after being discharged from the extruder is greater than 40% by mass, phase separation of the resin and water contained in the resin tends to be likely to occur, and as a result, foaming of strand(s) after being discharged from the extruder tend tends to be likely to occur. Furthermore, in the case of the moisture content of the resin composition immediately after being discharged from the extruder being less than 5% by mass, inhibition of deterioration of the EVOH (A) by heating tends to be insufficient, and thus coloring resistance of resulting pellets tends to be inferior.

A procedure for pelletizing the resin composition discharged from the extruder is not particularly limited, and is exemplified by a procedure of extruding the resin composition from a die into the air, and cutting the same to have an appropriate length. In light of favorable handlability of the pellets, the diameter of a die opening is preferably 2 to 5 mmφ (wherein, and hereinafter, φ denotes a diameter), and the strand(s) is/are preferably cut to have a length of about 1 to 5 mm.

In the case of the pelletization by way of melt kneading using an extruder, the washing step may be similar to the step in the procedure (i), or the washing step may be carried out in the extruder. In the case of performing the washing in the extruder, a procedure of washing the resin by injecting a washing liquid into the extruder, and thereafter discharging the washing liquid from the downstream of the extruder, and the like may be exemplified. [0100]

(5) Dehydrating Step

A proportion of the free boric acid (C) in the boron compound (B) in the resin composition of the embodiment of the present invention can be adjusted by, for example, removing the moisture by a physical means without heating a hydrous pellet (composition) containing the boron compound (B), and thereafter drying the same. As a procedure for removing the moisture, for example, a centrifugal dehydration (separation) procedure, a vacuum sieve (hydro sieve), a gas flow or the like may be employed, wherein it is preferred that water adhering to pellets is preferentially removed, and in this respect, the centrifugal dehydration procedure may be suitably employed industrially.

Such a centrifugal dehydration procedure may be either of a batchwise system or a continuous system, and industrially, the continuous system is suitably used. In both the batchwise system and continuous system, a centrifugal dehydration apparatus (centrifugal separation apparatus) is not limited as long as a rotary member having a bucket shape and having pores of a perforated plate or slits is involved, with the continuous system having a structure that enables continuous discharging without variation of pellet shape. Adjustment of the moisture to be removed is executed with a pore size of the perforated plate, the number of revolutions, the treatment amount (treatment time period) and the like, in which the pore size of the perforated plate being smaller than a diameter of the pellets is acceptable and is preferably about 0.1 to 3 mm. When the pore size of the perforated plate is less than 0.1 mm, an ability to remove water may be insufficient, and clogging due to fine powder is likely to occur, while the pore size exceeding 3 mm may lead to difficulty in adjusting the ability to remove water. The number of revolutions may vary depending on the apparatus, but is preferably 500 to 20,000 rpm. A treatment time period is preferably 10 sec or longer and 15 min or shorter. The number of revolutions being too low tends to result in an increase in a proportion of the free boric acid (C) that remains. Meanwhile, the number of revolutions being too great tends to result in a low proportion of the free boric acid (C) that remains. Similarly, the treatment time period being shorter than 10 sec can be a cause of an increase in the proportion of the free boric acid (C) that remains in the resin composition obtained. The treatment time period is preferably 45 sec or longer, and more preferably 1 min or longer. When the treatment time period is longer than 15 min, the proportion of the free boric acid (C) in the resin composition obtained tends to decrease. The treatment time period is preferably 13 min or shorter, and more preferably 10 min or shorter.

(6) Drying Step

The pellets after completion of the dehydrating step are subjected to the drying step. By the drying, it is preferred to make the moisture content of the EVOH (A) pellets after drying 0.08% by mass or less. When the moisture content is greater than 0.08% by mass, the amount of crosslinked boric acid may be small, thereby leading to a tendency for the amount of the free boric acid (C) to increase. The moisture content is preferably 0.05% by mass or less. A drying procedure is not particularly limited and is exemplified by: a ventilation drying procedure combined with air drying or nitrogen drying; a fluidized drying procedure; a vacuum drying procedure; and the like. A multistep drying in which some drying procedures are combined is preferred, and multistep drying including preliminary drying and principal drying is more preferred. The preliminary drying as referred to herein means drying adopted in order to dry the resin composition having from a comparatively high moisture content until the resin composition has a moisture content of about 10% by mass, and is carried out at a low temperature as compared with the principal drying in order to inhibit thermal fusion of the resin composition having a high moisture content during the drying. Meanwhile, the principal drying as referred to herein means drying carried out at a high temperature as compared with the preliminary drying in order to decrease the moisture content of the resin composition having a comparatively low moisture content after the preliminary drying. In the preliminary drying, gas for heating (hot air, etc.), an infrared ray, microwaves and/or the like may be employed. A temperature and a time period of the preliminary drying are not particularly limited, and by subjecting to drying, for example, at 60° C. or higher and 100° C. or less for a time period of 1 hour or longer and 12 hrs or shorter, the resin composition having an intended moisture content can be obtained. For the principal drying, general drying means described above may be employed; however, of these, vacuum drying is suitable in order to give a specific amount of the free boric acid (C). A procedure other than the vacuum drying tends to involve some difficulty in controlling to give the specific amount of the free boric acid (C).

The lower limit of a temperature in the principal drying (atmospheric temperature) is preferably 70° C., more preferably 100° C., still more preferably 110° C., and particularly preferably 120° C. Meanwhile, the upper limit is preferably 160° C., more preferably 150° C., and still more preferably 130° C. When the temperature in the principal drying is the lower limit or higher, sufficient principal drying can be efficiently carried out, and the time period of the principal drying can be shortened. Meanwhile, when the temperature in the principal drying is the upper limit or less, heat deterioration of the EVOH (A) can be inhibited. In addition, when the temperature in the principal drying falls within the above range, the amount of the free boric acid (C) is more easily adjusted to an appropriate amount. For example, lowering of the temperature in the principal drying tends to result in a lower proportion of the free boric acid (C). Moreover, although a time period of drying for the principal drying at a specific temperature is not particularly limited, a resin composition having an intended moisture content can be obtained by the drying, for example, at 80° C. for 30 hrs or longer and 160 hrs or shorter, at 120° C. for 15 hrs or longer and 100 hrs or shorter, or at 150° C. for 0.5 hrs or longer and 20 hrs or shorter.

Molded Product

The resin composition of the embodiment of the present invention can be formed into molded products such as a film, a sheet, a tube, a bag, and a container by melt molding or the like. The molded product including the resin composition of the embodiment of the present invention is accompanied by fewer defects such as fish eyes and streaks and is superior in appearance characteristics. In addition, since the resin composition of the embodiment of the present invention is superior in long-run workability, the molded product of the embodiment of the present invention is superior in productivity. The molded product of the embodiment of the present invention may be formed from only the resin composition of the embodiment of the present invention, or may be constituted from a portion formed from only the resin composition of the embodiment of the present invention, and an other portion. The molded product of the embodiment of the present invention may be a multilayer structure. It is to be noted that the "film" as referred to herein means a molded product typically having a thickness of less than 300 μm, whereas the "sheet" as referred to herein means a molded product typically having a thickness of 300 μm or more. Examples of the procedure for the melt molding include extrusion-molding, cast-molding, inflation extrusion-molding, blow-molding, melt spinning, injection molding, injection blow molding, and the like. The melt molding temperature may vary depending on the melting point of the EVOH (A) and the like, and is preferably 150° C. to 270° C. It is possible to subject these molded products to remolding for the purpose of reuse of the same after grinding. Alternatively, the film, the sheet or the like can also be monoaxially or biaxially stretched.

Film, etc.

The film and the sheet (hereinafter, may be briefly referred to as "film, etc.") being one mode of the molded product including the resin composition of the embodiment of the present invention are accompanied by fewer defects such as fish eyes and streaks, and are superior in appearance characteristics and resistance to breakage. Moreover, since the resin composition of the embodiment of the present invention is superior in long-run workability, the film, etc. of the embodiment of the present invention is superior in productivity. The film, etc. of the embodiment of the present invention may include any of a single layer film and a multilayer film, etc., and can be used as various types of packaging material and the like.

The film according to the embodiment of the present invention is formed from the resin composition according to the embodiment of the present invention. Due to being formed from the resin composition containing a certain amount of the boron compound (B), with a certain proportion of the free boric acid (C) being included, the film is superior in film formability, stretchability, and impact resistance at a low temperature. In manufacture of the film of the embodiment of the present invention, occurrence of neck-in during film formation is inhibited, and generation of fish eyes is inhibited even in continuous film formation for a long time period; therefore, the film of the embodiment of the present invention is superior in appearance, performance and the like. Moreover, in manufacture of the film of the embodiment of the present invention, superior film formability is maintained during film formation at a comparatively high temperature and high speed, or during continuous film formation for a long time period, thereby leading to superior productivity. In addition, in the film of the embodiment of the present invention, even when being stretched, occurrence of stripy unevenness accompanied by stretching can be reduced, and superior appearance, performance and the like are achieved. Furthermore, since the film of the embodiment of the present invention is superior in impact resistance at a low temperature, favorable gas barrier properties can be maintained even in a case in which impact is applied at a low temperature.

The film of the embodiment of the present invention is formed from the resin composition of the embodiment of the present invention by melt molding or the like. The film of the embodiment of the present invention may be either a monolayer film including only a layer of the resin composition of the embodiment of the present invention, or a multilayer film. An average thickness of the film of the embodiment of the present invention is, for example, 1 μm or more and less than 300 μm, and preferably 5 μm or more and less than 100 μm. The film of the embodiment of the present invention can be suitably used as various types of packaging materials and the like.

An arithmetic average roughness (Ra) of at least one surface of the film, etc. of the embodiment of the present invention as measured in accordance with JIS B0601 is preferably 1.0 μm or less, more preferably 0.8 μm or less, still more preferably 0.6 μm or less, and particularly preferably 0.4 μm or less. The arithmetic average roughness (Ra) of the at least one surface of the film, etc. of the embodiment of the present invention is preferably 0.05 μm or more, more preferably 0.10 μm or more, still more preferably 0.15 μm or more, and particularly preferably 0.20 μm or more. When the arithmetic average roughness (Ra) of the at least one surface of the film, etc. of the embodiment of the present invention falls within the above range, the resistance to breakage may be more superior.

An average length (RSm) of a contour curve element of at least one surface of the film, etc. of the embodiment of the present invention as measured in accordance with JIS B0601 is preferably 1,000 μm or less, more preferably 800 μm or less, still more preferably 600 μm or less, and particularly preferably 400 μm or less. The average length (RSm) of the contour curve element of the at least one surface of the film, etc. of the embodiment of the present invention is preferably 50 μm or more, more preferably 100 μm or more, still more preferably 150 μm or more, and particularly preferably 200 μm or more. When the average length (RSm) of the contour curve element of the at least one surface of the film, etc. of the embodiment of the present invention falls within the above range, the resistance to breakage may be more superior. It is to be noted that "JIS B0601" may be exemplified by JIS B0601: 2001.

The film of the embodiment of the present invention may be an unstretched film, but is preferably a stretched film. Due to being stretched, the strength and the like can be improved. Moreover, in the case in which the film of the embodiment of the present invention is the stretched film, occurrence of stripy unevenness which can result from stretching may be reduced, and thus appearance, gas barrier properties and the like can also be favorable.

Production Method of Film, etc.

The film, etc. of the embodiment of the present invention can be produced by a well-known procedure. A film-forming method is not particularly limited, and is exemplified by a melting method, a solution method, a calendar method and the like, and the melting method is preferred. In the melting method, a T die process (casting process), an inflation molding process or the like may be carried out, and the casting process is preferred. Of these, a preferred method includes: a cast molding step of melt-extruding the resin composition of the embodiment of the present invention on casting rolls; and a step of stretching an unstretched film obtained from the resin composition of the embodiment of the present invention (a monoaxial stretching step, a sequential twin-screw step, a simultaneous biaxial stretching step, or an inflation molding step). Including these steps enables improvement of resistance to breakage. A melt temperature in the melting method may vary depending on the melting point of the EVOH (A) and the like, and is preferably about 150 to 300° C.

The stretching may be either monoaxial stretching or biaxial stretching, and biaxial stretching is preferred. The biaxial stretching may be either of sequential biaxial stretching and simultaneous biaxial stretching. The lower limit of a draw ratio on area basis is preferably 6 times, and more preferably 8 times. The upper limit of the draw ratio is preferably 15 times, and more preferably 12 times. When the draw ratio falls within the above range, thickness uniformity, gas barrier properties and mechanical strength of the film can be improved. In addition, a stretching temperature may be, for example, 60° C. or higher and 120° C. or lower.

The production method of the film of the embodiment of the present invention may further include after the stretching step, a step of subjecting the stretched film to a heat treatment. A temperature of the heat treatment is typically set to be higher than the stretching temperature, and may be for example, higher than 120° C. and 200° C. or lower.

Vapor Deposition Film

The vapor deposition film of the embodiment of the present invention includes a base film (X) formed from the resin composition of the embodiment of the present invention, and an inorganic vapor deposition layer (Y) provided to at least one face side of the base film (X). Due to the base film (X) being formed from the resin composition containing a certain amount of the boron compound (B), with a certain proportion of the free boric acid (C) being included, the vapor deposition film of the embodiment of the present invention is superior in film formability, stretchability, and impact resistance at a low temperature. In manufacture of the vapor deposition film of the embodiment of the present invention, occurrence of neck-in during film formation is inhibited, and generation of fish eyes is inhibited even in continuous film formation for a long time period; therefore, the vapor deposition film of the embodiment of the present invention is superior in appearance, gas barrier properties, and the like. Moreover, in manufacture of the vapor deposition film of the embodiment of the present invention, superior film formability is maintained during film formation at a comparatively high temperature and high speed, or during continuous film formation for a long time period, thereby leading to superior productivity. In addition, in the vapor deposition film of the embodiment of the present invention, even in the case of the base film (X) being stretched, occurrence of stripy unevenness accompanied by stretching can be reduced, and superior appearance, sufficient gas barrier properties and the like are achieved. Furthermore, since the vapor deposition film of the embodiment of the present invention is superior in impact resistance at a low temperature, favorable gas barrier properties can be maintained even in a case in which impact is applied at a low temperature. Moreover, the vapor deposition film of the embodiment of the present invention has favorable gas barrier properties maintained even when used in an environment with significant variation of the temperature.

Base Film (X)

The base film (X) to be included in the vapor deposition film of the embodiment of the present invention is a film formed from the resin composition of the embodiment of the present invention. The base film (X) is formed by melt molding or the like from the resin composition of the embodiment of the present invention. The base film (X) may be either a monolayer film including only a layer of the resin composition of the embodiment of the present invention, or a multilayer film. An average thickness of the base film (X) is, for example, 1 μm or more and less than 300 μm, and preferably 5 μm or more and less than 100 μm.

An arithmetic average roughness (Ra) of at least one surface of the base film (X) as measured in accordance with JIS B0601 is preferably 1.0 μm or less, more preferably 0.8 μm or less, still more preferably 0.6 μm or less, and particularly preferably 0.4 μm or less. The arithmetic average roughness (Ra) of the at least one surface of the base film (X) is preferably 0.05 μm or more, more preferably 0.10 μm or more, still more preferably 0.15 μm or more, and particularly preferably 0.20 μm or more. When the arithmetic average roughness (Ra) of the at least one surface of the base film (X) falls within the above range, the resistance to breakage may be more superior.

An average length (RSm) of a contour curve element of at least one surface of the base film (X) as measured in accordance with JIS B0601 is preferably 1,000 μm or less, more preferably 800 μm or less, still more preferably 600 μm or less, and particularly preferably 400 μm or less. The average length (RSm) of the contour curve element of the at least one surface of the base film (X) is preferably 50 μm or more, more preferably 100 μm or more, still more preferably 150 μm or more, and particularly preferably 200 μm or more. When the average length (RSm) of the contour curve element of the at least one surface of the base film (X) falls within the above range, the resistance to breakage may be more superior.

The base film (X) may be an unstretched film, but is preferably a stretched film. Due to being stretched, the strength and the like can be improved. Moreover, in the case in which the base film (X) is the stretched film, occurrence of stripy unevenness which can result from stretching may be reduced, and thus appearance and gas barrier properties can also be favorable, and unevenness of the inorganic vapor deposition layer (Y) provided can be reduced.

The base film (X) can be produced by a well-known method. Specifically, the base film (X) can be suitably produced by the method described above as "Production Method of Film, etc."

Inorganic Vapor Deposition Layer (Y)

The inorganic vapor deposition layer (Y) is provided for principally ensuring the gas barrier properties of the vapor deposition film of the embodiment of the present invention. The inorganic vapor deposition layer (Y) is provided to the base film (X). The inorganic vapor deposition layer (Y) may be provided to only one face side of the base film (X), but it is preferable that one inorganic vapor deposition layer (Y) is provided to each of both face sides of the base film (X). By providing one inorganic vapor deposition layer (Y) to each of both face sides of the base film (X), the gas barrier properties are further improved, and stability of the gas barrier can be attained. More specifically, even if a defect is generated on one inorganic vapor deposition layer (Y) resulting from physical impact or the like, gas barrier properties as a vapor deposition film are suitably maintained due to another inorganic vapor deposition layer (Y) maintaining the barrier properties. It is to be noted that the inorganic vapor deposition layer (Y) may be provided to the face of the base film (X) via another layer, and the inorganic vapor deposition layer (Y) is preferably provided directly to one face or both faces of the base film (X).

Examples of the material for forming the inorganic vapor deposition layer (Y) include aluminum, silicon, magnesium, zinc, tin, nickel and titanium, as well as oxides, carbides and nitrides of one type or two or more types of the same, and the like. Aluminum used alone or in combination is preferred. In the case in which aluminum is used, a vapor deposition film that is light and has favorable flexibility and glossiness can be obtained.

The lower limit of the average thickness of the inorganic vapor deposition layer (Y) is preferably 15 nm, more preferably 20 nm, and still more preferably 30 nm. The upper limit of the average thickness of the inorganic vapor deposition layer (Y) is preferably 150 nm, more preferably 130 nm, and still more preferably 100 nm. When the average thickness of the inorganic vapor deposition layer (Y) is less than the lower limit, the gas barrier properties may be insufficient. Meanwhile, when the average thickness of the vapor deposition layer is greater than the upper limit, a thermal bridge is likely to be generated, and a heat insulation effect may be impaired. It is to be noted that in the case where the vapor deposition layer is constituted from a plurality of layers, the average thickness of each layer preferably falls within the above range, and it is more preferred that the total of the thicknesses of the plurality of layers falls within the above range. The average thickness of the inorganic vapor deposition layer (Y) as referred to herein means an averaged value of thicknesses at arbitrary ten points on a cross section of the inorganic vapor deposition layer (Y) measured by an electron microscope.

Vapor deposition for the inorganic vapor deposition layer (Y) may be conducted by a well-known procedure. A surface temperature of the base film (X) in conducting the vapor deposition is preferably 60° C. or lower, more preferably 55° C. or lower, and still more preferably 50° C. or lower. When the surface temperature of the base film (X) in conducting the vapor deposition is 60° C. or lower, the inorganic vapor deposition layer (Y) that includes vapor deposition particles having a small particle diameter may be formed, and therefore the gas barrier properties can be further improved. The lower limit of the surface temperature of the base film (X) in conducting the vapor deposition is not particularly limited, but is preferably 0° C., more preferably 10° C., and still more preferably 20° C.

Resin Coat Layer

The vapor deposition film of the embodiment of the present invention may further include a resin coat layer that covers the inorganic vapor deposition layer (Y). The resin coat layer is laminated to a side of the face of the inorganic vapor deposition layer (Y) being opposite to the base film (X). The resin coat layer is provided for inhibiting the damage of the inorganic vapor deposition layer (Y) resulting from flexion and the like in the step following the vapor deposition, for example, upon lamination, etc., during film processing. According to the vapor deposition film provided with such a resin coat layer, deterioration of the gas barrier properties can be inhibited. The resin coat layer contains a vinyl alcohol polymer, and as needed, a swellable inorganic layered silicate may be also contained. The vinyl alcohol polymer is exemplified by polyvinyl alcohol, EVOH, and the like. Examples of the swellable inorganic layered silicate include swellable montmorillonite, swellable synthetic smectite, swellable fluorinemica minerals, and the like. The lower limit of the average thickness of the resin coat layer is not particularly limited, but is preferably 0.001 μm or more in order to obtain effective gas barrier properties. Meanwhile, the upper limit of the average thickness of the resin coat layer is not particularly limited, but is preferably 10 μm or less, and more preferably 2 μm or less.

Although the procedure for laminating the resin coat layer on the inorganic vapor deposition layer (Y) is not particularly limited, a coating process and a laminating are preferred. Examples of the coating process include: a direct gravure process; a reverse gravure process; a micro gravure process; roll coating processes such as a two-roll bead coating process and a bottom feed three-roll reverse coating process; a doctor knife process; a die coating process; a dipping coating process; a bar coating process; a combination thereof; and the like. In addition, an interface between the inorganic vapor deposition layer (Y) and the resin coat layer may have undergone a corona treatment or a treatment with an anchor coating agent, or the like.

Other Layer

The vapor deposition film of the embodiment of the present invention may further have an other layer not falling under the category of the base film (X), the inorganic vapor deposition layer (Y) and the resin coat layer. The other layer is exemplified by a layer mainly constituted with a thermoplastic resin (hereinafter, referred to as "thermoplastic resin layer"), a paper layer, and the like. The expression "mainly constituted with" as referred to herein means having a maximum content in cases in which a plurality of components are contained, indicating that, for example, 50% by mass or more thermoplastic resin is contained. Examples of the thermoplastic resin which may form the thermoplastic resin layer include: polyolefins such as polyethylene and polypropylene; polyesters such as polyethylene terephthalate; polyamides; ethylene-vinyl alcohol copolymers; and the like.

The other layer may be laminated to any of the base film (X), the inorganic vapor deposition layer (Y) and the resin coat layer, or may be a layer that serves as an adhesion layer. Also, the other layer may be formed from a stretched film or from an unstretched film, or may be formed by coating.

Intended Usage

The vapor deposition film of the embodiment of the present invention is superior in film formability, stretchability, and impact resistance at a low temperature, and has favorable gas barrier properties. Moreover, the vapor deposition film of the embodiment of the present invention also has a favorable appearance, and has favorable gas barrier properties maintained even when used in an environment with significant variation of the temperature. Therefore, the vapor deposition film is applicable to various intended usages such as, for example, packaging materials and vacuum insulators.

Multilayer Structure

The multilayer structure of the embodiment of the present invention includes a resin composition layer formed from the resin composition of the embodiment of the present invention (hereinafter, may be also referred to as "barrier layer") and a layer constituted with an other component. The multilayer structure is acceptable as long as at least one barrier layer and at least one layer constituted with the other component are included. In other words, the multilayer structure may include two layers or more. Meanwhile, the upper limit of the number of layers may be 1,000, 100, or 10. Also, the multilayer structure of the embodiment of the present invention may further include a layer formed from a material other than a resin, for example, a paper layer, a metal layer or the like. The multilayer structure is advantageous in improvement of functions and the like as compared with a molded product having a monolayer configuration, and the multilayer structure of the embodiment of the present invention is accompanied by fewer defects such as fish eyes and streaks, and is superior in appearance characteristics. In addition, since the resin composition of the embodiment of the present invention is superior in long-run workability, the multilayer structure of the embodiment of the present invention is superior in productivity.

As the layer constituted with the other component, a thermoplastic resin layer formed from a thermoplastic resin is preferred. A layer configuration of the multilayer structure of the embodiment of the present invention is not particularly limited, and when: the barrier layer is represented by "E"; a layer obtained from an adhesive resin is represented by "Ad"; and a layer obtained from the thermoplastic resin is represented by "T", configurations such as T/E/T, Ad/E/Ad, E/Ad/T, and T/Ad/E/Ad/T may be exemplified. Each of these layers may be either a monolayer or a multilayer. It is to be noted that the layer Ad obtained from the adhesive resin may be included also in examples of the thermoplastic resin layer formed from a thermoplastic resin.

Examples of the thermoplastic resin include: linear low density polyethylene, low density polyethylene, medium density polyethylene, high density polyethylene, ethylene-vinyl acetate copolymers, ethylene-propylene copolymers, polypropylene, propylene-α-olefin (α-olefin having 4 to 20 carbon atoms) copolymers, homopolymers of an olefin such as polybutene or polypentene and copolymers thereof; polyesters such as polyethylene terephthalate; polyester elastomers; polyamides such as nylon-6 and nylon-66; polystyrenes; polyvinyl chlorides, polyvinylidene chlorides; acrylic resins; vinyl ester resins; polyurethane elastomers; polycarbonates; chlorinated polyethylenes; chlorinated polypropylenes; ionomers; and the like. Of these, examples of preferably employed thermoplastic resins include polypropylenes, polyethylenes, ethylene-propylene copolymers, ethylene-vinyl acetate copolymers, polyamides, polystyrenes, and polyesters.

The adhesive resin is not particularly limited as long as it has adhesiveness to the barrier layer and the layer constituted with the other component, but the adhesive resin containing a carboxylic acid-modified polyolefin is preferred. It is to be noted that the carboxylic acid-modified polyolefin as referred to herein means: an olefin polymer having a carboxy group or an anhydride group thereof obtained by chemical bonding of an ethylenic unsaturated carboxylic acid or an anhydride thereof to an olefin polymer by an addition reaction, a graft reaction or the like. The carboxylic acid-modified polyolefin is exemplified by a modified olefin polymer containing a carboxyl group, in which an ethylenic unsaturated carboxylic acid, an ester thereof or an anhydride thereof is chemically bonded to an olefin polymer. The olefin polymer as referred to herein means a polyolefin such as polyethylene, linear low density polyethylene, polypropylene, or polybutene, or a copolymer of the olefin with another monomer. Of these, the linear low density polyethylene, the ethylene-vinyl acetate copolymer, and the ethylene-ethyl copolymer acrylate are preferred, and the linear low density polyethylene and the ethylene-vinyl acetate copolymer are particularly preferred.

A method for producing the multilayer structure of the embodiment of the present invention is not particularly limited, and is exemplified by: a method of melt-extruding an other component with the molded product (the film, the sheet, etc.) including the resin composition of the embodiment of the present invention; a method of coextruding the other component with the resin composition of the embodiment of the present invention; a method of coinjection-molding the other component with the resin composition of the embodiment of the present invention; a method of laminating a barrier layer including the resin composition of the embodiment of the present invention and the layer constituted with the other component, using a well-known adhesive such as an organic titanium compound, an isocyanate compound, or a polyester compound; a method of coextrusion-coating the other component with the resin composition of the embodiment of the present invention, on a substrate such as paper; and the like.

A procedure of coextrusion of the resin composition of the embodiment of the present invention with other component is not particularly limited, and is exemplified by a multi-manifold-merging T die process, a feedblock-merging T die process, an inflation molding process, and the like.

The multilayer structure of the embodiment of the present invention may be in the form of a film or sheet, or may be molded into any of various shapes. The multilayer structure of the embodiment of the present invention can be used for packaging materials, containers, tubes and the like, and can be suitably used also as materials for thermoforming of thermoformed containers and the like. The thermoformed product obtained from the multilayer structure of the embodiment of the present invention is accompanied by fewer defects such as stripes and is superior in appearance characteristics. Such a thermoformed product is also involved in one mode of the multilayer structure of the embodiment of the present invention.

Packaging Material

The packaging material of the embodiment of the present invention includes the film or the vapor deposition film of the embodiment of the present invention. Due to including the film or the vapor deposition film of the embodiment of the present invention, the packaging material of the embodiment of the present invention is superior in appearance as well as impact resistance at a low temperature. Therefore, even if stored in an environment at a low temperature during which impact may be applied, the packaging material can continuously maintain the gas barrier properties for a long period of time. Additionally, since the film or the vapor deposition film of the embodiment of the present invention superior in film formability is used, the packaging material of the embodiment of the present invention is also superior in productivity.

The packaging material of the embodiment of the present invention may be either a monolayer film of the embodiment of the present invention, or may be constituted from only the vapor deposition film of the embodiment of the present invention. Alternatively, the packaging material of the embodiment of the present invention may be a multilayer structure including the film or the vapor deposition film of the embodiment of the present invention. A suitable number of layers in the multilayer structure of the packaging material of the embodiment of the present invention is similar to that of the multilayer structure of the embodiment of the present invention described above. Also, the multilayer structure may further include a layer formed from a material other than a resin, for example, a paper layer, a metal layer and/or the like.

A layer configuration as the multilayer structure in the packaging material of the embodiment of the present invention is not particularly limited, and when: the film or the vapor deposition film of the embodiment of the present invention is represented by "E"; a layer obtained from an adhesive resin is represented by "Ad"; and a layer obtained from the thermoplastic resin is represented by "T", configurations such as T/E/T, E/Ad/T, and T/Ad/E/Ad/T may be exemplified. Each of these layers may be either a monolayer or a multilayer. It is to be noted that the layer Ad obtained from the adhesive resin may be included also in examples of the thermoplastic resin layer formed from a thermoplastic resin. It is to be noted that the film E of the embodiment of the present invention in the multilayer structure is preferably a monolayer film. Furthermore, the vapor deposition film E in the multilayer structure is preferably a film including only the base film (X) and the inorganic vapor deposition layer (Y), or a film including only the base film (X), the inorganic vapor deposition layer (Y) and the resin coat layer.

A method for producing the multilayer structure as the packaging material of the embodiment of the present invention is not particularly limited, and is exemplified by: a method of melt-extruding the thermoplastic resin with the film or the vapor deposition film of the embodiment of the present invention; a method of laminating the film or the vapor deposition film of the embodiment of the present invention with other thermoplastic resin layer using a well-known adhesive such as an organic titanium compound, an isocyanate compound, or a polyester compound; and the like. The thermoplastic resin and the adhesive resin for use in the multilayer structure as the packaging material of the embodiment of the present invention is similar to one for use in the multilayer structure of the embodiment of the present invention described above.

The packaging material of the embodiment of the present invention may have the shape of the film or vapor deposition film as was, or a shape formed after subjecting the film, the vapor deposition film or the multilayer structure to a secondary processing. Examples of the packaging material obtained by subjecting to the secondary processing include: (1) tray cup-shaped containers obtained by subjecting the film, the vapor deposition film or the multilayer structure to thermoforming processing such as vacuum forming, pressure forming, or vacuum/pressure forming; (2) bottles, and cup-shaped containers obtained by subjecting the film, the vapor deposition film or the multilayer structure to stretch blow molding or the like; (3) bag-shaped containers obtained by subjecting the film, the vapor deposition film or the multilayer structure to heat sealing; and the like. It is to be noted that the secondary processing procedure is not limited to each method exemplified above, and a well-known secondary processing procedure other than those described above, for example, blow molding or the like, may be appropriately used.

The packaging material of the embodiment of the present invention is used for wrapping, e.g., foods, beverages, chemicals such as pesticides and medicines, as well as industrial materials such as medical equipment, machine parts and precision materials, and the like. In particular, the packaging material of the embodiment of the present invention is preferably used in intended usage(s) for which barrier properties against oxygen would be necessary, and in intended usage(s) in which the interior of the packaging material of the embodiment of the present invention will be substituted by various types of functional gas. The packaging material is formed into a variety of shapes according to the intended usage, for example, into a vertically-manufactured bag packaging-and-sealing pouch, a vacuum packaging bag, a spout-attached pouch, a laminate tube container, a lid member for a container, and the like.

Vacuum Packaging Bag

The vacuum packaging bag of the embodiment of the present invention includes the film of the embodiment of the present invention. The vacuum packaging bag of the embodiment of the present invention is superior in appearance and impact resistance at a low temperature due to including the film of the embodiment of the present invention. Therefore, even if stored in an environment at a low temperature during which impact may be applied, the packaging material can continuously maintain the gas barrier properties for a long period of time. Additionally, since the film of the embodiment of the present invention superior in film formability is used, the vacuum packaging bag of the embodiment of the present invention is also superior in productivity.

One example of the vacuum packaging bag of the embodiment of the present invention is a bag-shaped container including the film of the embodiment of the present invention as a partition wall for isolating from the outside the interior in which content is packaged, wherein the interior is in a vacuum state. In the vacuum packaging bag of the embodiment of the present invention, for example, two films of the embodiment of the present invention are overlapped to each other, and peripheries of these two films are sealed to each other. In the vacuum packaging bag of the embodiment of the present invention, the multilayer structure including the film of the embodiment of the present invention is suitably used as the partition wall. Specific modes of the multilayer structure involve examples of the multilayer structure described above. The vacuum packaging bag can be produced by using a nozzle type or chamber type vacuum packaging machine.

The vacuum packaging bag of the embodiment of the present invention is used for intended usage(s) in which vacuum packaging is desired, for example, storage of foods, beverages and the like. Furthermore, the vacuum packaging bag of the embodiment of the present invention can be used also as an external packaging material for a vacuum insulator.

Vacuum Insulator

The vacuum insulator of the embodiment of the present invention includes the vapor deposition film of the embodiment of the present invention. The vacuum insulator is used for intended usage(s) in which cold storage or cold keeping or warmth keeping is necessary. In the vacuum insulator, the vapor deposition film of the embodiment of the present invention can be typically used as an external packaging material, and in an exemplary vacuum insulator, a core material such as polyurethane foam is included in an external packaging material in a vacuum state. The external packaging material is formed by heat-sealing a pair of laminated films provided by laminating at least one vapor deposition film of the embodiment of the present invention, with at least one other layer, for example. The external packaging material may be formed from only the vapor deposition film of the embodiment of the present invention.

Examples of the other layer for use in the external packaging material include a polyester layer, a polyamide layer, a polyolefin layer, an adhesion layer and the like, and a polyolefin layer that is a heat sealable layer is preferably included.

Although the number of layers and the order of lamination in the external packaging material are not particularly limited, it is preferred that the heat sealable layer (for example, a polyolefin (PO) layer) is provided as an outermost layer. A layered structural constitution of the external packaging material preferably includes: the vapor deposition film/the polyamide layer/the PO layer; the polyamide layer/the vapor deposition film/the PO layer; the vapor deposition film/the polyester layer/the PO layer; the polyester layer/the vapor deposition film/the PO layer; or the like, and an adhesion layer may be provided between the layers/films. Alternatively, in a case of applying the vapor deposition film that includes the inorganic vapor deposition layer (Y) formed only on one face of the base film (X), the inorganic vapor deposition layer (Y) may be provided such that the inorganic vapor deposition layer (Y) is provided on the outer side with respect to the base film (X), or may be provided such that the inorganic vapor deposition layer (Y) is provided on an inner side with respect to the base film (X). The vapor deposition film in the external packaging material is preferably a film including only the base film (X) and the inorganic vapor deposition layer (Y), or a film including only the base film (X), the inorganic vapor deposition layer (Y) and the resin coat layer.

By virtue of including the external packaging material having the vapor deposition film of the embodiment of the present invention, the vacuum insulator of the embodiment of the present invention is superior in gas barrier properties of the external packaging material. Furthermore, since the vapor deposition film of the embodiment of the present invention is used in the vacuum insulator of the embodiment of the present invention, even when used in an environment at a low temperature during which impact may be applied, or used in an environment with significant variation of the temperature, gas barrier properties of the external packaging material can be continuously maintained for a long period of time and as a result, thermal insulation properties can be maintained. In addition, since the vapor deposition film of the embodiment of the present invention superior in film formability is used, the vacuum insulator of the embodiment of the present invention is superior also in productivity.

The vacuum insulator of the embodiment of the present invention can be used in: heat insulating materials for household electric appliances such as refrigerators, hot-water supply equipments and rice cookers; heat insulating materials for housing used in wall portions, ceiling portions, loft portions, floor portions, etc.; vehicle roofs; thermal insulation panels of vending machines, etc., and the like.

Thermoformed Container

The thermoformed container of the embodiment of the present invention includes a layer formed from the resin composition of the embodiment of the present invention. Due to including a layer formed from the resin composition containing a certain amount of the boron compound (B), with a certain proportion of the free boric acid (C), the thermoformed container of the embodiment of the present invention is accompanied by fewer streaks and seeds, and less coloring and thickness unevenness of the layer, and is superior in impact resistance at a low temperature. Therefore, the thermoformed container of the embodiment of the present invention has a favorable appearance, and favorable gas barrier properties can be maintained even in a case in which impact is applied at a low temperature. Moreover, by virtue of use of the resin composition of the embodiment of the present invention, streaks, seeds, coloring, and thickness unevenness of the layer can be inhibited even in the case in which continuous film formation is carried out at a comparatively high temperature and high speed for a long period of time; therefore, the thermoformed container of the embodiment of the present invention is also superior in productivity.

The thermoformed container of the embodiment of the present invention can be used in intended usages for which gas barrier properties are demanded in a variety of fields of, for example, foods, cosmetics, medical drugs, chemicals, toiletries, and the like. The thermoformed container of the embodiment of the present invention is formed to have a retaining portion through, for example, subjecting to thermoforming the multilayer sheet.

Retaining Portion

The retaining portion is a portion for retaining contents such as foods. The shape of the retaining portion is decided in accordance with the shape of the contents. Specifically, the thermoformed container of the embodiment of the present invention is formed to give, for example, a cup-shaped container, a tray-shaped container, a bag-shaped container, a bottle-shaped container, a pouch-shaped container, and the like.

The form of the retaining portion may be expressed by a draw ratio (S) as one indicator. The draw ratio (S) as referred to herein means a value obtained by dividing the depth of the bottom of the container by the diameter of an inscribed circle having the maximum diameter in the opening of the container. Thus, a greater value of the draw ratio (S) indicates a deeper container, whereas a smaller value of the draw ratio (S) indicates a shallower container. For example, in the case of the thermoformed container of this embodiment having a cup shape, the draw ratio (S) thereof would be larger, whereas in the case of the thermoformed container having a tray shape, the draw ratio (S) thereof would be smaller. It is to be noted that the value of the diameter of a circle being inscribed in an opening of the container having the maximum diameter corresponds to, for example: a diameter of a circular shape when the opening of the retaining portion is circular; a shortest diameter (minor axis) of an elliptical shape when the opening of the retaining portion is elliptical; and a length of the shorter side of a rectangular shape when the opening of the retaining portion is rectangular.

The lower limit of the draw ratio (S) is preferably 0.2, more preferably 0.3, and still more preferably 0.4. Meanwhile, the upper limit of the draw ratio (S) is, for example, 10, and may be 5 or 3.

Multilayer Sheet

The multilayer sheet (multilayer structure) that forms the thermoformed container of the embodiment of the present invention includes the layer formed from the resin composition of the embodiment of the present invention (hereinafter, may be also referred to as "layer (1)"), and typically, other layer(s) is/are laminated on at least one face side of both faces of the layer (1). The multilayer sheet is a multilayer resin sheet, and is one mode of the multilayer structure. In this regard, according to the thermoformed container of the embodiment of the present invention, the term "one face" as referred to herein means the inner surface side of the retaining portion, provided that the thermoformed container is formed from the multilayer sheet, whereas the term "other face side" means the outer surface side of the retaining portion.

The lower limit of a thickness ratio (I/O) of the total average thickness (I) of the other layer(s) laminated to the one face side of the first layer (1) to the total average thickness (0) of the other layer(s) laminated to the other face side of the layer (1) is preferably 1/99, and more preferably 30/70. The upper limit of the thickness ratio (I/O) is preferably 70/30, and more preferably 55/45. It is to be noted that the thickness of the total layers or a monolayer of the multilayer sheet is an average value of thicknesses measured by optical microscopic inspection of samples obtained from a plurality of portions of the multilayer sheet by cutting away with a microtome.

The lower limit of an overall average thickness of the thermoformed container of the embodiment of the present invention is preferably 300 µm, more preferably 500 µm, and still more preferably 700 µm. Meanwhile, the upper limit of the overall average thickness is preferably 10,000 µm, more preferably 8,500 µm, and still more preferably 7,000 µm. It is to be noted that the overall average thickness of the thermoformed container as referred to herein means the thickness of the total layers in the retaining portion of the thermoformed container, and the measuring method thereof is similar to that in the case of the measurement of the thickness of the total layer of the multilayer sheet. When the overall average thickness of the thermoformed container is too great, a production cost tends to increase. On the other hand, when the overall average thickness of the thermoformed container is too small, the rigidity may not be maintained, leading to aptness to easy breakage.

The other layers which may be laminated to the layer (1) are exemplified by: a layer containing a thermoplastic resin other than the EVOH (A) as a principal component (hereinafter, may be also referred to as "layer (2)"); a layer that contains an adhesive resin as a principal component (hereinafter, may be also referred to as "layer (3)"); a regrind layer (hereinafter, may be also referred to as "layer (4)"); and the like. Hereinafter, each layer will be described in detail.

Layer (1)

The layer (1) is formed from the resin composition of the embodiment of the present invention. The lower limit of an average thickness of the layer (1) is not particularly limited, and in light of barrier properties, mechanical strength and the like, the lower limit of the average thickness of the layer (1) with respect to the average thickness of the total layers is preferably 0.5%, more preferably 1%, and still more preferably 2%. The upper limit of the average thickness of the layer (1) is not particularly limited, and in light of barrier properties, mechanical strength and the like, the upper limit of the average thickness of the layer (1) with respect to the average thickness of the total layers is preferably 20%, more preferably 10%, and still more preferably 5%.

Layer (2)

The layer (2) is a layer containing a thermoplastic resin other than the EVOH (A) as a principal component. The thermoplastic resin other than the EVOH (A) is exemplified by those described above as the thermoplastic resin for use in the multilayer structure, and the like. In a case in which the layer (3) is interposed when the layer (1) and the layer (2) are laminated, the layer (2) is preferably a layer containing as a principal component a thermoplastic resin having a solubility parameter, calculated using the Fedors equation, of 11 $(cal/cm^3)^{1/2}$ or less. The thermoplastic resin having the solubility parameter, calculated using the equation, of 11 $(cal/cm^3)^{1/2}$ or less is superior in moisture resistance. It is to be noted that the "solubility parameter calculated using the Fedors equation" as referred to herein means a value represented by $(E/V)^{1/2}$, wherein E represents a molecular cohesive energy (cal/mol), which is denoted by $E=\Sigma ei$, wherein ei represents an evaporation energy; and V represents a molecular volume ($cm^3$/mol), which is denoted by $V=\Sigma vi$, wherein vi represents a molar volume. It is preferred that the layer (2) is provided on an inner face side and an external surface side of the layer (1).

The thermoplastic resin having a solubility parameter of 11 $(cal/cm^3)^{1/2}$ or less is exemplified by a polyolefin, a polystyrene, a polyvinyl chloride, a polyvinylidene chloride, an acrylic resin, a vinyl ester-based resin, a polyurethane elastomer, a polycarbonate, a chlorinated polyethylene, a chlorinated polypropylene, and the like. Examples of the polyolefin include homopolymers or copolymers of an olefin, such as polyethylenes (linear low density polyethylene, low density polyethylene, medium density polyethylene, high density polyethylene, and the like), ethylene-vinyl acetate copolymers, ethylene-propylene copolymers, polypropylenes, copolymers of propylene with an α-olefin having 4 to 20 carbon atoms, polybutenes and polypentenes, and the like. Of these, the polyethylenes, the ethylene-propylene copolymers, the ethylene-vinyl acetate copolymers, the polypropylenes and the polystyrenes are preferred, and the high density polyethylene is more preferred.

The lower limit of the MI at 190° C. under a load of 2, 160 g, of the thermoplastic resin for use in the layer (2) is preferably 0.1 g/10 min, more preferably 0.2 g/10 min, and still more preferably 0.3 g/10 min. Meanwhile, the upper limit of the MI is preferably 15 g/10 min, and more preferably 10 g/10 min. It is to be noted that the thermoplastic resin used may be appropriately selected, in general, from among commercially available products. In addition, the layer (2) may contain other optional component(s) similar to those which may be contained in the layer (1), within a range not leading to impairment of the effects of the present invention.

The lower limit of an average thickness of the layer (2) with respect to the average thickness of the total layers is not particularly limited, and is preferably 10% and more preferably 30%, and may be still more preferably 50%, 70% or 90%. The upper limit of the average thickness of the layer (2) with respect to the average thickness of the total layers is not particularly limited, and is preferably 95%.

Layer (3)

The layer (3) may be provided between the layer (1) and the layer (2), and is a layer containing an adhesive resin as a principal component. The layer (3) may serve as an adhesion layer between other layers such as the layer (1) and the layer (2). Examples of the adhesive resin include those described above as the adhesive resin for use in the multilayer structure, and the like.

The lower limit of the MI of the adhesive resin for use in the layer (3) as measured at 190° C. under a load of 2,160 g is preferably 0.1 g/10 min, more preferably 0.2 g/10 min, and still more preferably 0.3 g/10 min. Meanwhile, the upper limit of the MI is preferably 15 g/10 min, and more preferably 10 g/10 min. It is to be noted that a commercially available product having been industrially produced can be used as such an adhesive resin, and examples thereof include trade names "ADMER QF551", "ADMER QB540", "ADMER QF550", "ADMER NF642E", "ADMER AT2235E", and "ADMER NF408E," all manufactured by Mitsui Chemicals, Inc., and the like used in the Examples described later.

It is to be noted that the layer (3) may contain in addition to the adhesive resin, other optional component(s) similar to those which may be contained in the layer (1), within a range not leading to impairment of the effects of the present invention.

The lower limit of an average thickness of the layer (3) with respect to the average thickness of the total layers is not particularly limited, and is preferably 0.3% and more preferably 1%. The upper limit of the average thickness of the layer (3) with respect to the average thickness of the total layers is not particularly limited, and is preferably 10% and more preferably 6%. When the average thickness of the layer (3) as the adhesive resin layer is less than the lower limit, the adhesiveness may be impaired. Further, when the average thickness of the layer (3) is greater than the upper limit, the cost may be increased.

Layer (4)

The layer (4) is a layer containing, for example, the EVOH (A), the thermoplastic resin, and the adhesive resin. In addition, the layer (4) is preferably formed by using recovered materials from the layer (1), the layer (2) and the layer (3) in the production method of the thermoformed container of the embodiment of the invention. Examples of the recovered material include burrs generated in the production method of the thermoformed containers, products which have failed an inspection, and the like.

The layer (4) may be used as a substitute for the layer (2) described above. However, in general, the layer (4) is preferably used after being laminated with the layer (2), since the layer (4) usually has less mechanical strength than the layer (2). Taking into consideration that when the thermoformed container of the embodiment of the present invention is subjected to an external impact, concentration of stress would occur in the container, and in the stress concentration area, a compression stress in response to the impact would be generated on the inner layer side of the container, which may lead to breakage, the layer (4), which is inferior in strength, is preferably provided so as to be situated on the outer layer side with respect to the layer (1). Moreover, in a case where a large amount of the resin needs to be recycled, e.g., in the case of generation of a large amount of the burr, the regrind layer being the layer (4) may be provided on both sides of the layer (1).

It is preferred that the thermoformed container of the embodiment of the present invention is produced by thermoforming a multilayer sheet including the layer (1), layer (2) and layer (3). This multilayer sheet may further include the layer (4).

Production Method of Multilayer Sheet Used in Thermoformed Container

The multilayer sheet used in the thermoformed container may be formed by using a coextrusion molding apparatus. The multilayer sheet may be formed so as to have a predetermined layered structural constitution by, for example, charging the resin compositions of the embodiment of the present invention for forming respective layers, as well as other resin into separate extruders, respectively, and carrying out coextrusion using these extruders.

The extrusion molding of each layer is carried out by operating an extruder equipped with a single screw at a certain temperature. The temperature of an extruder for forming the layer (1) is adjusted to, for example, 170° C. or more and 260° C. or less. In addition, the temperature of an extruder for forming the layer (2) is adjusted to, for example, 150° C. or more and 260° C. or less. It is to be noted that since the resin composition of the embodiment of the present invention for forming the layer (1) has the constitution described above, streaks, seeds, coloring, thickness unevenness of the layer and the like can be inhibited even in a case of film formation at a comparatively high temperature.

Thermoforming

The thermoformed container of the embodiment of the present invention can be formed by heating the multilayer sheet to be softened, and thereafter carrying out molding so as to fit a die shape. The thermoforming procedure is exemplified by: a procedure involving carrying out the molding so as to fit a die shape by means of vacuum or compressed air, which may be used in combination with a plug as needed (a straight process, a drape process, an air slip process, a snap-back process, a plug-assist process, and the like); a procedure involving press molding; and the like. Various molding conditions such as the molding temperature, the degree of vacuum, the pressure of the compressed air, and the molding speed are appropriately selected in accordance with the shape of the plug and/or the die, as well as properties of a resin as a base material, and the like.

The molding temperature is not particularly limited as long as it is a temperature at which the resin can be sufficiently softened for molding, and a suitable range of the temperature may vary in accordance with the construction of the multilayer sheet. It is to be noted that the heating temperature is typically lower than the melting point of the resin. The lower limit of the heating temperature of a specific multilayer sheet is typically 50° C., preferably 60° C., and more preferably 70° C. The upper limit of the heating temperature is, for example, 180° C., and may be 160° C.

Layered Structural Constitution of Thermoformed Container

The thermoformed container of the embodiment of the present invention is acceptable as long as at least the layer (1) is included, and may be constituted from a single layer or from a plurality of layers. The layered structural constitution in the case of the thermoformed container including a plurality of layers may be appropriately predetermined in accordance with the intended usage and the like.

The layered structural constitution in a case in which the thermoformed container of the embodiment of the present invention includes a plurality of layers preferably involves providing the layer (2) as an outermost layer. More specifically, providing in an order of: layer (2)/layer (3)/layer (1)/layer (3)/layer (2) from the inner surface of the retaining portion to the outer surface of the retaining portion (hereinafter, represented as "(2)/(3)/(1)/(3)/(2) from the inner surface to the outer surface") is preferred in light of the impact resistance. Furthermore, in a case where the layer (4) that is a regrind layer is included, examples of the layered structural constitution include:

(2)/(3)/(1)/(3)/(4)/(2) from the inner surface to the outer surface;

(2)/(4)/(3)/(1)/(3)/(4)/(2) from the inner surface to the outer surface;

(4)/(3)/(1)/(3)/(4) from the inner surface to the outer surface; and the like.

It is to be noted that in these layered structural constitutions, the layer (4) may be provided in place of the layer (2). It is to be noted that in the case of a construction in which the layer (1) to the layer (4) are each used in a plurality of number, the resin constituting each layer may be the same or different.

Cup-Shaped Container

Figure 2:
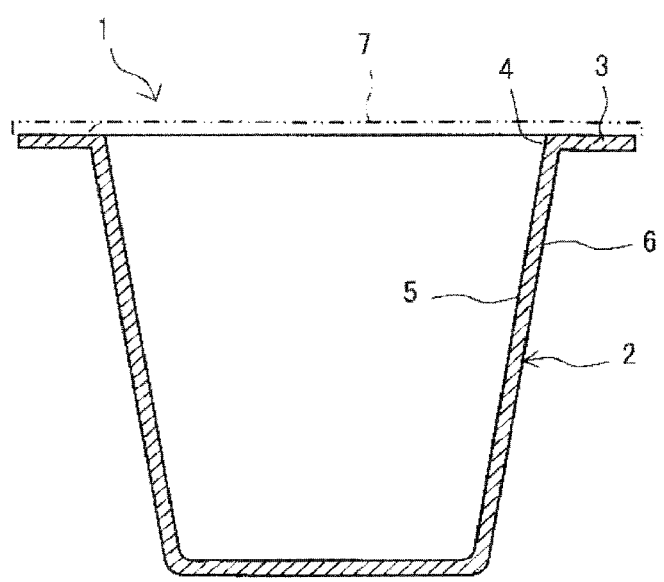
FIG. 2 shows a schematic cross sectional view illustrating the cup-shaped container shown in FIG. 1.

Next, a cup-shaped container shown in FIGS. 1 and 2 will be specifically described by way of an example of the thermoformed container according to the embodiment of the present invention. However, the cup-shaped container is merely an example of the thermoformed container of the above embodiment, and the following explanation of the cup-shaped container does not limit the scope of the present invention.

The cup-shaped container 1 shown in FIGS. 1 and 2 includes a cup main body 2 as the retaining portion, and a flange portion 3. The cup-shaped container 1 is used such that contents are retained in the cup main body 2 and thereafter a lid 7 as a sealer is attached to the flange portion 3 so as to seal an opening 4 of the cup main body 2. The lid 7 is exemplified by a resin film, a metal foil, a metal-resin composite film, and the like, and among these, a metal-resin composite film in which a metal layer is laminated to a resin film is preferred. Examples of the resin film include polyethylene films, polyethylene terephthalate films, and the like. The metal layer is not particularly limited, and is preferably a metal foil or a metal vapor-deposition layer, and is more preferably an aluminum foil in light of gas barrier properties and productivity.

The cup-shaped container 1 is typically obtained by subjecting the multilayer sheet to thermoforming. It is preferred that the multilayer sheet includes at least the layer (1), and an other layer is preferably laminated to the layer (1). The other layer is exemplified by the layer (2), the layer (3), the layer (4), and the like. Specific examples of the layered configuration of the multilayer sheet are described above.

Production Method of Cup-Shaped Container

Figure 3:
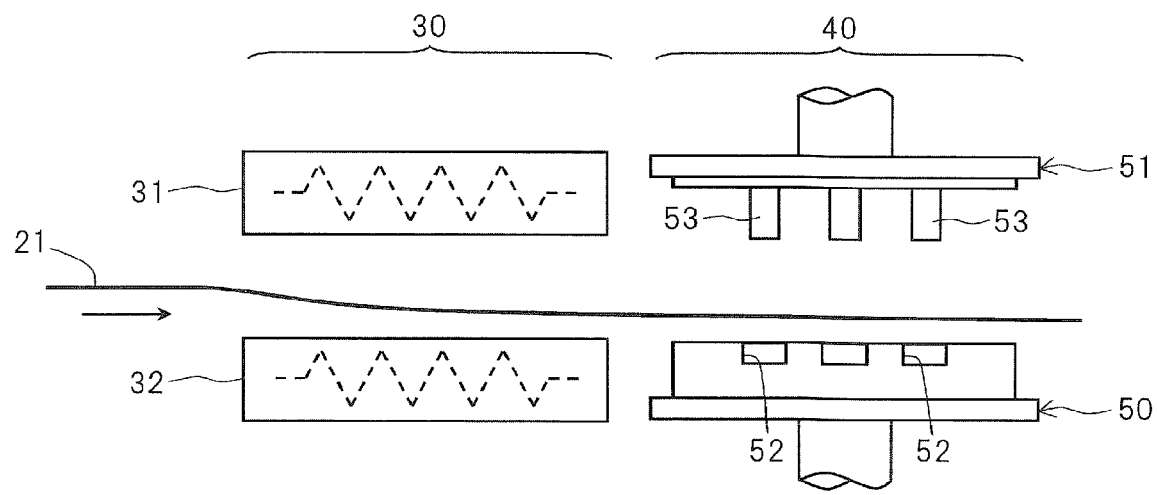
FIG. 3 shows a schematic view for illustrating the production method of the cup-shaped container shown in FIG. 1.

As shown in FIG. 3, the cup-shaped container 1 is produced by heating a continuous multilayer sheet 21 by means of the heating apparatus 30 to permit softening, followed by thermoforming by using a die apparatus 40.

Heating Apparatus

The heating apparatus 30 is provided with a pair of heaters (heater 31 and heater 32), and is configured such that the continuous multilayer sheet 21 can be passed through between the heater 31 and the heater 32. It is to be noted that an apparatus that can heat the continuous multilayer structure 20 by hot pressing may be used as the heating apparatus 30.

Die Apparatus

The die apparatus 40 is suitable for thermoforming by a plug-assist process, and includes a lower mold half 50 and an upper mold half 51 that are placed in a chamber (not shown in the Figure). The lower mold half 50 and the upper mold half 51 are configured such that they are each independently vertically movable, and in a state of being spaced apart from one another, the continuous multilayer sheet 21 can be passed between the lower mold half 50 and the upper mold half 51. The lower mold half 50 includes a plurality of recessed parts 52 for shaping the retaining portion of the cup-shaped container 1. The upper mold half 51 includes a plurality of plugs 53 that protrude toward the lower mold half 50. The plurality of plugs 53 are each provided in the position corresponding to each of the plurality of recessed parts 52 of the lower mold half 50. Each plug 53 can be inserted into the corresponding recessed part 52.

Thermoforming

Figure 4:
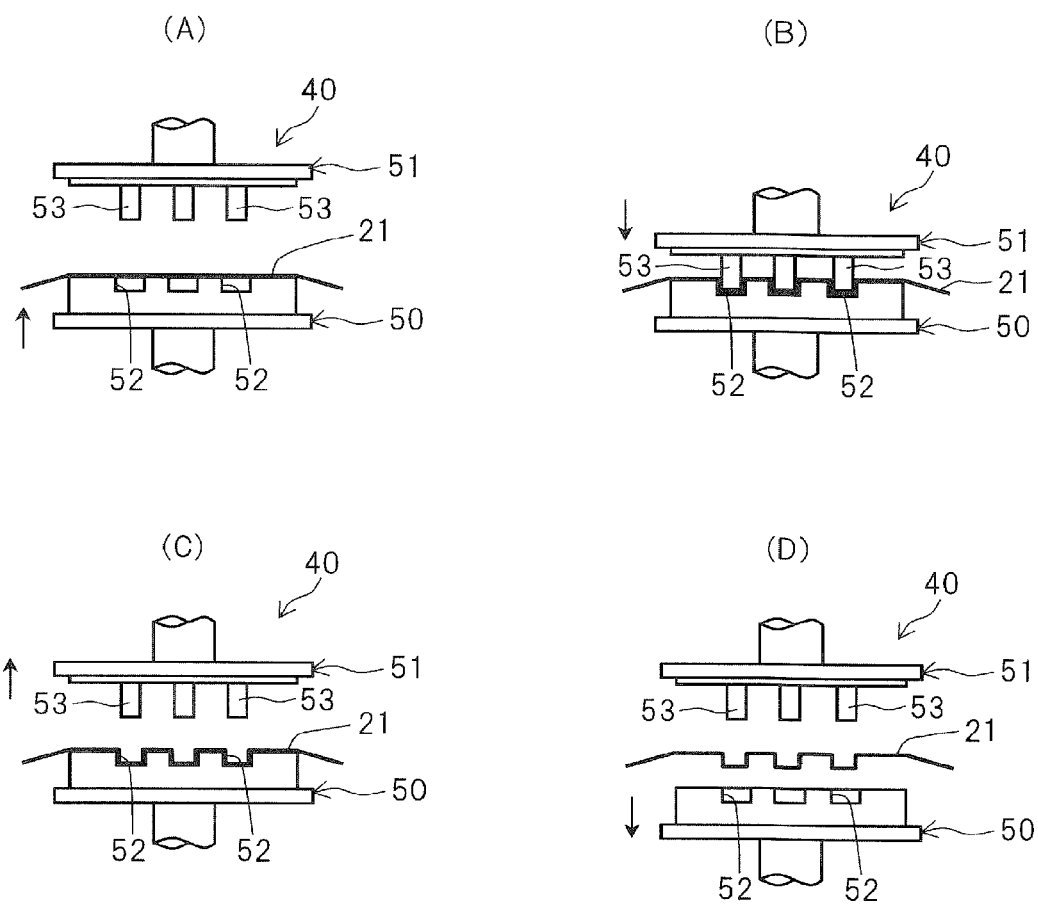
FIG. 4 shows a schematic view for illustrating the production method of the cup-shaped container shown in FIG. 1.

First, as shown in FIGS. 3 and 4(A), the lower mold half 50 is moved upward with respect to the continuous multilayer sheet 21 which has been softened using the heating apparatus 30 to bring the softened continuous multilayer sheet 21 into close contact with the lower mold half 50, and the continuous multilayer sheet 21 is somewhat lifted up to apply tension to the continuous multilayer sheet 21. Next, as shown in FIG. 4(B), the upper mold half 51 is moved downward, whereby the plugs 53 are inserted into each corresponding recessed part 52.

Subsequently, as shown in FIG. 4(C), the upper mold half 51 is moved upward to separate the plugs 53 from each corresponding recessed part 52, and the inside of the chamber (not shown in the Figure) is evacuated to bring the continuous multilayer sheet 21 into close contact with the inner face of the recessed parts 52. Thereafter, the mold is cooled by blowing air thereto to fix the shape. As shown in FIG. 4(D), the inside of the chamber (not shown in the Figure) is then exposed to ambient air and the lower mold half 50 is moved downward to release the lower mold half 50, whereby a primary molded article is obtained. The primary molded article is cut away to give the cup-shaped container 1 shown in FIGS. 1 and 2.

Blow-Molded Container

The blow-molded container of the embodiment of the present invention includes the layer formed from the resin composition of the embodiment of the present invention. Due to including the layer formed from the resin composition containing a certain amount of the boron compound (B), with a certain proportion of the free boric acid (C), the blow-molded container of the embodiment of the present invention is accompanied by fewer streaks and seeds, and is superior in impact resistance at a low temperature. Therefore, the blow-molded container of the embodiment of the present invention has a favorable appearance, and favorable gas barrier properties can be maintained even in a case in which impact is applied at a low temperature. Moreover, by virtue of use of the resin composition of the embodiment of the present invention, streaks and seeds can be inhibited even in the case in which continuous multilayer blow molding is carried out at a comparatively high temperature and high speed for a long period of time; therefore, the blow-molded container of the embodiment of the present invention is also superior in productivity. The blow-molded container of the embodiment of the present invention is utilized for various intended usages such as fuel containers and various types of bottles.

The blow-molded container of the embodiment of the present invention should include the layer formed from the resin composition of the embodiment of the present invention (hereinafter, may be also referred to as "layer (a)"), and may be a layer structure further including other layer. The other layer is exemplified by: a layer containing a thermoplastic resin other than the EVOH (A) as a principal component (hereinafter, may be also referred to as "layer (b)"); a layer that contains an adhesive resin as a principal component (hereinafter, may be also referred to as "layer (c)"); a regrind layer (hereinafter, may be also referred to as "layer (d)"); and the like. It is preferred that the blow-molded container of the embodiment of the present invention includes the layer (a), the layer (b) and the layer (c).

Specifically, the blow-molded container which may be adopted has a layer configuration involving, for example: the order of the layer (b), the layer (c), the layer (a), the layer (c), the layer (d), and the layer (b) (hereinafter, represented as (inside) b/c/a/c/d/b (outside)); (inside) b/c/a/c/b (outside); (inside) b/d/c/a/c/b (outside); (inside) d/c/a/c/d (outside), from the internal surface of the container to the external surface of the container, or the like. It is to be noted that a configuration in which the layer (d) is provided in place of the layer (b) is also acceptable, and in the case of the configuration in which a plurality of layers (a) to (d) are respectively used, resins constituting respective layers may be the same or different.

A total average thickness of the blow-molded container of the embodiment of the present invention is preferably 300 to 10,000 μm, more preferably 500 to 8,000 μm, and still more preferably 1,000 to 5,000 μm. It is to be noted that the total average thickness as referred to herein means an average thickness at a body part of the blow-molded container. When the total average thickness is too large, the weight may undesirably increase, and thus in a case of using as, for example, fuel containers of automobiles and the like, fuel consumption may be negatively affected and the cost for the container may also increase. Meanwhile, the total average thickness being too small may lead to a failure in maintaining rigidity, and therefore the blow-molded container may be easily broken. Therefore, it is important to set the thickness to correspond to the volume and/or the intended usage. Hereinafter, each layer will be described in detail.

Layer (a)

The layer (a) is formed from the resin composition of the embodiment of the present invention. The lower limit of an average thickness of the layer (a) is not particularly limited, and in light of barrier properties, mechanical strength and the like, the lower limit of the average thickness of the layer (a) with respect to the average thickness of the total layer is preferably 0.5%, more preferably 1%, and still more preferably 2%. The upper limit of the average thickness of the layer (a) is not particularly limited, and in light of barrier properties, mechanical strength and the like, the upper limit of the average thickness of the layer (1) with respect to the average thickness of the total layer is preferably 20%, more preferably 10%, and still more preferably 5%.

Layer (b)

The layer (b) contains a thermoplastic resin other than the EVOH (A) as a principal component. The thermoplastic resin other than the EVOH (A) is exemplified by those described above as the thermoplastic resin for use in the multilayer structure, and the like. In a case in which the layer (c) is interposed when the layer (a) and the layer (b) are laminated, the layer (b) preferably contains as a principal component a thermoplastic resin having a solubility parameter, calculated using the Fedors equation, of 11 $(cal/cm^3)^{1/2}$ or less. The thermoplastic resin having the solubility parameter, calculated using the equation, of 11 $(cal/cm^3)^{1/2}$ or less is superior in moisture resistance. It is preferred that the layer (b) is provided on an inner face side and an external surface side of the layer (a). Specific examples and preferred examples of the thermoplastic resin having a solubility parameter of 11 $(cal/cm^3)^{1/2}$ or less are similar to those described above as the thermoplastic resin for use in the thermoformed container.

The lower limit of the MI at 190° C. under a load of 2,160 g, of the thermoplastic resin for use in the layer (b) is preferably 0.01 g/10 min, and more preferably 0.02 g/10 min. Meanwhile, the upper limit of the MI is preferably 0.5 g/10 min, more preferably 0.1 g/10 min, and still more preferably 0.05 g/10 min. It is to be noted that the thermoplastic resin used may be appropriately selected, in general, from among commercially available products. In addition, the layer (b) may contain other optional component(s) similar to those which may be contained in the layer (a), within a range not leading to impairment of the effects of the present invention.

The lower limit of an average thickness of the layer (2) with respect to the average thickness of the total layer is not particularly limited, and is preferably 10% and more preferably 30%, and may be still more preferably 50%, 70% or 80%. The upper limit of the average thickness of the layer (2) with respect to the average thickness of the total layer is not particularly limited, and is preferably 95% and more preferably 90%.

Layer (c)

The layer (c) may be provided between the layer (a) and the layer (b), and is a layer containing an adhesive resin as a principal component. The layer (c) may serve as an adhesion layer between other layers such as the layer (a) and the layer (b). Examples of the adhesive resin include those described above as the adhesive resin for use in the multilayer structure, and the like.

The lower limit of the MI of the adhesive resin for use in the layer (c) as measured at 190° C. under a load of 2,160 g is preferably 0.1 g/10 min, more preferably 0.2 g/10 min, and still more preferably 0.3 g/10 min. Meanwhile, the upper limit of the MI is preferably 15 g/10 min, more preferably 10 g/10 min, and still more preferably 5 g/10 min.

It is to be noted that the layer (c) may contain in addition to the adhesive resin, other optional component(s) similar to those which may be contained in the layer (a), within a range not leading to impairment of the effects of the present invention.

The lower limit of an average thickness of the layer (c) with respect to the average thickness of the total layer is not particularly limited, and is preferably 0.5% and more preferably 2%. The upper limit of the average thickness of the layer (c) with respect to the average thickness of the total layer is not particularly limited, and is preferably 20% and more preferably 12%. When the average thickness of the layer (c) as the adhesive resin layer is less than the lower limit, the adhesiveness may be impaired. Further, when the average thickness of the layer (c) is greater than the upper limit, the cost may be increased.

Layer (d)

The layer (d) contains, for example, the EVOH (A), the thermoplastic resin, and the adhesive resin. In addition, the layer (d) is preferably formed by using recovered materials from the layer (a), the layer (b) and the layer (c) in the production method of the blow-molded container. Examples of the recovered material include burrs generated in the production method of the blow-molded containers, products which have failed an inspection, and the like.

The layer (d) may be used as a substitute for the layer (b) described above. However, in general, the layer (d) is preferably used after being laminated with the layer (b), since the layer (d) usually has less mechanical strength than the layer (b). Taking into consideration that when the blow-molded container of the embodiment of the present invention is subjected to an external impact, concentration of stress would occur in the container, and in the stress concentration area, a compression stress in response to the impact would be generated on the inner layer side of the container, which may lead to breakage, the layer (d) which is inferior in strength is preferably provided so as to be situated on the outer layer side with respect to the layer (a). Moreover, in a case where a large amount of the resin needs to be recycled, e.g., in the case of the generation of a large amount of the burr, the regrind layer being the layer (d) may be provided on both sides of the layer (a).

Production Method of Blow-Molded Container

The blow-molded container of the embodiment of the present invention is preferably produced by a production method that includes a step of blow molding using the resin composition of the embodiment of the present invention. The blow molding may be carried out by a well-known procedure such as direct blow molding, injection blow molding, sheet blow molding, or free blow molding.

Specifically, the blow molding is carried out by using, for example, pellets of the resin composition of the embodiment of the present invention for forming the layer (a), and as needed each resin for forming other each layer, in a blow molding machine at a temperature of 100° C. to 400° C., and then cooling wherein an internal temperature of the die is 10° C. to 30° C. for 10 sec to 30 min. Accordingly, a hollow container blow molded can be formed. A heating temperature during the blow molding may be 150° C. or more, or may be 180° C. or more or 200° C. or more. Also, the heating temperature may be a melting point of the EVOH (A) or more. Meanwhile, the upper limit of the heating temperature may be 350° C., or may be 300° C. or 250° C.

Fuel Container

The blow-molded container of the embodiment of the present invention can be used as a fuel container. The fuel container of the embodiment of the present invention may be provided with a filter, a fuel gauge, a baffle plate and the like. Due to being provided with the blow-molded container of the embodiment of the present invention, the fuel container of the embodiment of the present invention is accompanied by fewer streaks and seeds, and is superior in impact resistance at a low temperature, gas barrier properties and the like; therefore, it can be suitably used as a fuel container. The "fuel container" as referred to herein means a fuel container mounted in an automobile, a motorcycle, a watercraft, an aeroplane, an electric power generator, an industrial or agricultural instrument or the like, or a portable fuel container for supplying the fuel to such a fuel container, as well as a container for retaining the fuel. Further, typical examples of the fuel include gasoline, in particular, oxygen-containing gasoline prepared by blending gasoline with methanol, ethanol, MTBE or the like, and further, heavy oil, light mineral oil, kerosene and the like are also included. The fuel container of the embodiment of the present invention is particularly suitably used as a fuel container for oxygen-containing gasoline, among these.

Bottle-Shaped Container

The blow-molded container of the embodiment of the present invention can be used as a bottle-shaped container. The bottle-shaped container of the embodiment of the present invention may further include a constituent structure other than the blow-molded container of the embodiment of the present invention, such as a cover film and a cap. A molding procedure of the bottle-shaped container of the embodiment of the present invention is exemplified by direct blow molding and injection blow molding. Since the blow-molded container of the embodiment of the present invention having been molded to have a bottle shape is superior in appearance, impact resistance at a low temperature, gas barrier properties and the like, it can be suitably used as bottle-shaped container for food, cosmetics and the like.

EXAMPLES

Hereinafter, the present invention is specifically explained by way of Examples and the like, but the present invention is not limited to these Examples. It is to be noted that evaluations of resulting resin compositions were performed as in the following.

(1) Quantitative Determination of Boron Compound (B) in Resin Composition

Dry resin composition pellets obtained by Production Examples were ground by freeze grinding. To 0.5 g of powder thus obtained, 5 mL of nitric acid for accurate analysis manufactured by Wako Pure Chemical Industries, Ltd. was added and wet degradation was allowed by Speedwave MWS-2 (manufactured by BERGHOF). Each liquid thus obtained was diluted with ion exchanged water to 50 mL of the total liquid amount to thereby prepare a sample solution. The sample solution was subjected to a quantitative determination analysis of boron element using an ICP optical emission spectrophotometer ("Optima 4300 DV", manufactured by PerkinElmer Co. Ltd., Japan), and the amount of the boron compound (B) was calculated in terms of ortho-boric acid (B1). It is to be noted that for the quantitative determination, a calibration curve produced by using a boron standard concentrate solution (1,000 ppm) for atomic absorption spectrometry (manufactured by Kanto Chemical Co., Inc.) was used.

(2) Quantitative Determination of Free Boric Acid (C) in Resin Composition (i) Preparation of Sample Solution Dry resin composition pellets obtained by Production Examples were ground by freeze grinding. The powder thus obtained was sieved with a sieve having a nominal dimension of 1 mm (according to standard sieve designation JIS-Z8801). Each sample for measurement in an amount of 1,000 mg of the powder of the resin composition having passed the sieve was mixed with 3.5 mL of a mixed solution of 2-ethyl-1,3-hexanediol/chloroform (volume ratio: 10/90), and the mixture was left to stand at room temperature for 24 hrs and filtered through a filter having a pore size of 0.2 μm to give a filtrate.

(ii) Quantitative Determination of Free Boric Acid (C)

apparatus: ICP optical emission spectrometer iCAP6300 (manufactured by Thermo Fisher Scientific Inc.)

measurement wavelength: 208.893 nm, 208.959 nm, and 249.773 nm calibration curve: produced using a boron standard concentrate solution (1,000 ppm) for atomic absorption spectrometry manufactured by Kanto Chemical Co., Inc.

measurement sample: 0.6 g of filtrate weighed and volumetrized with ethanol to 10 mL A boron content thus obtained was regarded to be entirely derived from the free boric acid (C) and calculated as a value in terms of orthoboric acid (B2).

(iii) Calculation of proportion of free boric acid (C)

The proportion of free boric acid (C) was calculated according to the following formula using the measurement result (B1) of the boron compound (B) and the measurement result (B2) of the free boric acid (C) determined by the measurements described above.

Proportion of free boric acid $(C)$(% by mass)={measurement result $(B2)$ of free boric acid $(C)$}/{measurement result $(B1)$ of boron compound $(B)$×100}

(3) Melt Index (MI) of Resin Composition

The melt index (MI) was measured in accordance with ASTM-D1238, by using a melt indexer under a condition involving a temperature of 190° C. and a load of 2,160 g.

(4) Quantitative Determination of Metal Salt and Acid Component in Resin Composition Quantitative determination of phosphoric acid compound/metal ion Each sample solution was prepared similarly to (1), and the amount of the metal ion and phosphoric acid compound was quantitatively determined by using "Optima 4300 DV," an ICP optical emission spectrophotometer manufactured by PerkinElmer Japan Co., Ltd., through a quantitative determination analysis performed at each of the following measurement wavelengths. The amount of the phosphoric acid compound was calculated in terms of phosphate radical, through quantitative determination of phosphorus element. In the quantitative determination, a calibration curve produced by diluting various types of standard liquids was used.

Na: 589.592 nm

K: 766.490 nm

P: 214.914 nm

Quantitative determination of carboxylic acid and carboxylate ion

Dry resin compositions obtained by Production Examples were ground by freeze grinding. Each of resultant ground resin compositions was passed through a sieve having a nominal size of 1 mm (complying with standard JIS Z8801-1 to 3 for standard sieves), and 10 g of powder of the resin composition having passed through the sieve and 50 mL of ion exchanged water were charged into a 100-mL stoppered Erlenmeyer flask and a mixture was stirred at 95° C. for 10 hrs after the stoppered Erlenmeyer flask was equipped with a cooling condenser. Two mL of the solution thus obtained was removed and diluted with 8 mL of ion exchanged water. Carboxylic acid and carboxylate ion in this diluted solution were quantitatively determined by using "ICS-1500," an ion chromatography system manufactured by Yokogawa Electric Corporation, under the following measurement conditions. It is to be noted that for the quantitative determination, a calibration curve produced using a monocarboxylic acid or a polyhydric carboxylic acid was used.

Measurement Conditions column: "IonPAC ICE-AS1 (9φ×250 mm, electric conductivity detector)" manufactured by DIONEX Corporation eluent: 1.0 mmol/L aqueous octanesulfonic acid solution measurement temperature: 35° C.

eluent flow rate: 1 mL/min amount used for the analysis: 50 μL,

Production Example 1

Into a polymerization bath having a withstand pressure of 100 kg/cm$^2$, 19,600 parts of vinyl acetate, 2,180 parts of methanol, and 7.5 parts of AIBN (2,2'-azobisisobutyronitrile) were charged. After substitution with nitrogen with stirring, the temperature and the pressure were elevated to adjust the internal temperature of 60° C., and an ethylene pressure of 35.5 kg/cm$^2$. The temperature and the pressure were maintained for 3.5 hrs to allow for polymerization, and then 5 parts of hydroquinone were added thereto. The pressure in the polymerization bath was reduced back to the ordinary pressure to eliminate ethylene by evaporation. Subsequently, this methanol solution was continuously poured from above a purge tower in which Raschig rings had been packed, whereas methanol vapor was blown thereinto from the bottom of the tower to discharge unreacted vinyl acetate monomer from the top of the tower together with methanol vapor to eliminate through the condenser. Thus, a 45% methanol solution of an ethylene-vinyl acetate copolymer containing 0.01% or less unreacted vinyl acetate was obtained. A rate of polymerization in this process was 47% with respect to charged vinyl acetate, and an ethylene percentage content was 32 mol %. Next, the methanol solution of the ethylene-vinyl acetate copolymer was charged into a saponification reactor, and a sodium hydroxide/methanol solution (80 g/L) was added thereto so as to attain 0.4 equivalents with respect to the vinyl acetate component in the copolymer, followed by adding methanol to adjust the copolymer concentration to be 20%. The temperature of this solution was elevated to 60° C., and the reaction was allowed while nitrogen gas was blown into the reactor for about 4 hrs. Thereafter, neutralization with acetic acid stopped the reaction, and the solution was then extruded into water from a die plate provided with a circular opening to permit deposition. Cutting gave pellets having a diameter of about 3 mm and a length of about 5 mm. The pellets thus obtained were subjected to deliquoring using a centrifugal separator, and further an operation of adding a large amount of water thereto followed by washing and deliquoring the pellets was repeated, whereby washed hydrous pellets were obtained. The degree of saponification of the EVOH thus obtained was 99.7 mol %. Into 0.5 L of an immersion liquid containing 0.06 g/L orthoboric acid, 0.1 g/L acetic acid, and 0.3 g/L potassium dihydrogen phosphate, 300 g of the washed hydrous pellets were dispersed and the mixture was stirred for 4 hrs. Thereafter, thus obtained pellets were removed and subjected to dehydratation with a centrifugal separator (diameter of the perforated plate: 1 mm; number of revolutions: 4,000 rpm; and treatment time period: 15 min). Then, for preliminary drying, a hot-air drier was used to conduct drying in an air atmosphere at 80° C. for 3 hrs. The moisture content of the pellets before subjecting to the centrifugal separation was 200% by mass on a dry mass basis; the moisture content after the centrifugal dehydration for 15 min was 78% by mass; and the moisture content after the preliminary air drying was 10% by mass. Thereafter, for principal drying, a vacuum drier was used to conduct drying under a vacuum condition at 80° C. for 142 hrs. Until the moisture content in the pellets after the principal drying became 0.08% by mass or less, vacuum drying was conducted to give a resin composition 1. Quantitative determination of the metal component and the acid component in the resin composition 1 was carried out according to the method described in (4) above. As a result of the measurements, it was revealed that in the resin composition: the content of acetic acid and a salt thereof in terms of acetate radical was 600 ppm (10 μmol/g); the content of the alkali metal salt in terms of metal was 150 ppm; and the content of the phosphoric acid compound in terms of phosphate radical was 35 ppm.

Production Examples 2 to 24, Production Examples C1 to C14

Resin compositions 2 to 24 and resin compositions C1 to C14 were produced in a similar manner to Production Example 1 except that the ethylene unit content (Et) of EVOH used, the concentration of orthoboric acid in the immersion liquid with which the hydrous pellets after washing were immersed, the conditions of centrifugal dehydration (treatment time period, and the moisture content after centrifugal dehydration), and the treatment temperature of principal drying were changed as shown in Table 1. In each of the Production Examples, principal drying was conducted for the treatment time period shown in Table 1 until the moisture content of pellets became 0.08% by mass or less. It is to be noted that in the Production Examples in which centrifugal dehydration was not conducted, values presented in the "Moisture content after centrifugal dehydration" column are moisture contents before being subjected to the preliminary drying (the same applies to the following).

TABLE 1

| | Resin composition | Et mol % | Concentration of orthoboric acid in immersion liquid g/L | Time period of centrifugal dehydration treatment Min | Moisture content after centrifugal dehydration % by mass | Preliminary drying (air drying) | | Principal drying (vacuum drying) | |
|---|---|---|---|---|---|---|---|---|---|
| | | | | | | treatment temperature ° C. | treatment time period hours | treatment temperature ° C. | treatment time period hours |
| Production Example 1 | 1 | 32 | 0.06 | 15 | 78 | 80 | 3 | 80 | 142 |
| Production Example 2 | 2 | 32 | 0.35 | 10 | 89 | 80 | 3 | 80 | 142 |
| Production Example 3 | 3 | 32 | 0.58 | 10 | 89 | 80 | 3 | 80 | 142 |
| Production Example 4 | 4 | 32 | 1.15 | 10 | 89 | 80 | 3 | 80 | 142 |
| Production Example 5 | 5 | 32 | 0.04 | 2 | 150 | 80 | 3 | 120 | 32 |
| Production Example 6 | 6 | 32 | 0.19 | 2 | 150 | 80 | 3 | 120 | 32 |
| Production Example 7 | 7 | 32 | 0.29 | 5 | 112 | 80 | 3 | 120 | 32 |
| Production Example 8 | 8 | 32 | 0.26 | 2 | 150 | 80 | 3 | 120 | 32 |
| Production Example 9 | 9 | 32 | 0.48 | 5 | 112 | 80 | 3 | 120 | 32 |
| Production Example 10 | 10 | 32 | 0.43 | 2 | 150 | 80 | 3 | 120 | 32 |
| Production Example 11 | 11 | 44 | 0.43 | 2 | 150 | 80 | 3 | 120 | 32 |
| Production Example 12 | 12 | 27 | 0.43 | 2 | 150 | 80 | 3 | 120 | 32 |
| Production Example 13 | 13 | 32 | 0.54 | 2 | 150 | 80 | 3 | 120 | 32 |
| Production Example 14 | 14 | 32 | 0.97 | 5 | 112 | 80 | 3 | 120 | 32 |
| Production Example 15 | 15 | 32 | 0.86 | 2 | 150 | 80 | 3 | 120 | 32 |
| Production Example 16 | 16 | 32 | 1.71 | 2 | 150 | 80 | 3 | 120 | 32 |
| Production Example 17 | 17 | 32 | 0.25 | 1 | 173 | 80 | 3 | 150 | 11 |
| Production Example 18 | 18 | 32 | 0.21 | 0.8 | 178 | 80 | 3 | 150 | 11 |
| Production Example 19 | 19 | 32 | 0.41 | 1 | 173 | 80 | 3 | 150 | 11 |
| Production Example 20 | 20 | 32 | 0.34 | 0.8 | 178 | 80 | 3 | 150 | 11 |
| Production Example 21 | 21 | 32 | 0.25 | 0.3 | 191 | 80 | 3 | 150 | 11 |
| Production Example 22 | 22 | 32 | 0.83 | 1 | 173 | 80 | 3 | 150 | 11 |
| Production Example 23 | 23 | 32 | 0.68 | 0.8 | 178 | 80 | 3 | 150 | 11 |
| Production Example 24 | 24 | 32 | 1.00 | 0.3 | 191 | 80 | 3 | 150 | 11 |
| Production Example C1 | C | 32 | 0.16 | 60 | 50 | 80 | 3 | 80 | 142 |

TABLE 1-continued

| | Resin composition | Et mol % | Concentration of orthoboric acid in immersion liquid g/L | Time period of centrifugal dehydration treatment Min | Moisture content after centrifugal dehydration % by mass | Preliminary drying (air drying) | | Principal drying (vacuum drying) | |
|---|---|---|---|---|---|---|---|---|---|
| | | | | | | treatment temperature °C. | treatment time period hours | treatment temperature °C. | treatment time period hours |
| Production Example C2 | C2 | 32 | 1.66 | 60 | 50 | 80 | 3 | 80 | 142 |
| Production Example C3 | C3 | 32 | 2.06 | 60 | 50 | 80 | 3 | 80 | 142 |
| Production Example C4 | C4 | 32 | 6.59 | 60 | 50 | 80 | 3 | 80 | 142 |
| Production Example C5 | C5 | 32 | 0.03 | 2 | 150 | 80 | 3 | 120 | 32 |
| Production Example C6 | C6 | 32 | 2.32 | 2 | 150 | 80 | 3 | 120 | 32 |
| Production Example C7 | C7 | 32 | 0.02 | zero | 200 | 80 | 3 | 150 | 11 |
| Production Example C8 | C8 | 32 | 0.09 | zero | 200 | 80 | 3 | 150 | 11 |
| Production Example C9 | C9 | 32 | 0.15 | zero | 200 | 80 | 3 | 150 | 11 |
| Production Example C10 | C10 | 32 | 0.19 | zero | 200 | 80 | 3 | 150 | 11 |
| Production Example C11 | C11 | 32 | 0.31 | zero | 200 | 80 | 3 | 150 | 11 |
| Production Example C12 | C12 | 32 | 0.61 | zero | 200 | 80 | 3 | 150 | 11 |
| Production Example C13 | C13 | 32 | 1.38 | 2(1 | 57 | 80 | 3 | 120 | 32 |
| Production Example C14 | C14 | 32 | 0.21 | 2(2 | 198 | 80 | 3 | 120 | 32 |

(1 centrifugal separator, number of revolutions: 18,000 rpm
(2 centrifugal separator, number of revolutions: 500 rpm Production Examples C15 to C17

Resin compositions C15 to C17 were produced in a similar manner to Production Example 1 except that the concentration of orthoboric acid in the immersion liquid with which the hydrous pellets after washing were immersed, and the conditions of centrifugal dehydration (treatment time period, and the moisture content after centrifugal dehydration) were as shown in Table 2, and that the principal drying was air drying until the moisture content in the pellets became 0.08% by mass or less under conditions presented in Table 2 involving the temperature of a hot-air dryer in an air atmosphere.

TABLE 2

| | Resin composition | Et mol % | Concentration of orthoboric acid in immersion liquid g/L | Time period of centrifugal dehydration treatment Min | Moisture content after centrifugal dehydration % by mass | Preliminary drying (air drying) | | Principal drying (air drying) | |
|---|---|---|---|---|---|---|---|---|---|
| | | | | | | treatment temperature °C. | treatment time period hours | treatment temperature °C. | treatment time period hours |
| Production Example C15 | C15 | 32 | 6.59 | 60 | 50 | 80 | 3 | 80 | 112 |
| Production Example C16 | C16 | 32 | 0.61 | zero | 200 | 80 | 3 | 120 | 25 |
| Production Example C17 | C17 | 32 | 1.66 | 60 | 50 | 80 | 3 | 105 | 44 |

Production Examples C18 to C20

Resin compositions C18 to C20 were produced in a similar manner to Production Example 1 except that the concentration of orthoboric acid in the immersion liquid with which the hydrous pellets after washing were immersed, and the conditions of centrifugal dehydration (treatment time period, and the moisture content after centrifugal dehydration) were as shown in Table 3, and that the principal drying was nitrogen drying until the moisture content in the pellets became 0.08% by mass or less under conditions presented in Table 3 involving the temperature of a hot-air dryer (oxygen concentration in the drier: 200 ppm) in a nitrogen atmosphere.

TABLE 3

| | Resin composition | Et mol % | Concentration of orthoboric acid in immersion liquid g/L | Time period of centrifugal dehydration treatment Min | Moisture content after centrifugal dehydration % by mass | Preliminary drying (air drying) | | Principal drying (nitrogen drying) | |
|---|---|---|---|---|---|---|---|---|---|
| | | | | | | treatment temperature °C | treatment time period hours | treatment temperature °C | treatment time period hours |
| Production Example C18 | C18 | 32 | 6.59 | 60 | 50 | 80 | 3 | 80 | 107 |
| Production Example C19 | C19 | 32 | 0.61 | Zero | 200 | 80 | 3 | 150 | 8 |
| Production Example C20 | C20 | 32 | 0.15 | Zero | 200 | 80 | 3 | 125 | 20 |

Production Example 25

A methanol solution having an EVOH concentration of 20% was obtained similarly to Production Example 1 until the saponifying step. Subsequently, a methanol solution of the EVOH was introduced from above a plate tower type reaction container, and water vapor was introduced from the bottom of the reaction container. Through substitution of methanol with water under a condition involving an internal temperature of the tower of 130° C. and an internal pressure of the tower being 3 kg/cm$^2$, a hydrous EVOH composition having a concentration of 50% was obtained from the bottom of the tower. Subsequently, a resultant hydrous composition was introduced into an extruder having a slit for discharging the moisture and extruded at a die temperature of 118° C., followed by pelletizing by cutting with a center hot cutter to give EVOH pellets. Thus obtained pellets were introduced into a tower type counter-current washing machine from above, and were counter-current washed by introducing pure water at 50° C. from the bottom. Thereafter, the pellets were removed from the bottom of the counter-current washing tower bottom and subjected to solid-liquid separation with a wet sifter, whereby the EVOH having an ethylene percentage content of 32 mol %, a degree of saponification of 99.7 mol %, and a moisture content of 35% by mass was obtained. Thus obtained EVOH was charged into a twin-screw extruder to which a treatment liquid containing acetic acid/orthoboric acid/sodium acetate/potassium dihydrogen phosphate aqueous solution was added from a port for adding minor component(s) at a tip part on a discharge opening side, with a resin temperature at the discharge opening being 100° C. The amount of the EVOH charged per unit time was 10 kg/hr (including the mass of water contained); the amount of the treatment liquid charged per unit time was 0.65 L/hr; and the treatment liquid was an aqueous solution containing 4.3 g/L acetic acid, 5.3 g/L orthoboric acid, 4.6 g/L sodium acetate, and 1.4 g/L potassium dihydrogen phosphate.
  type: twin-screw extruder
  L/D: 45.5
  diameter of opening: 30 mmφ
  screw: fully intermeshing co-rotation type
  number of revolutions: 300 rpm
  motor capacity: DC22 KW
  heater: 13-segment type
  number of die holes: five (3 mmφ)
  temperature of the resin in the die: 105° C.

Figure 5:
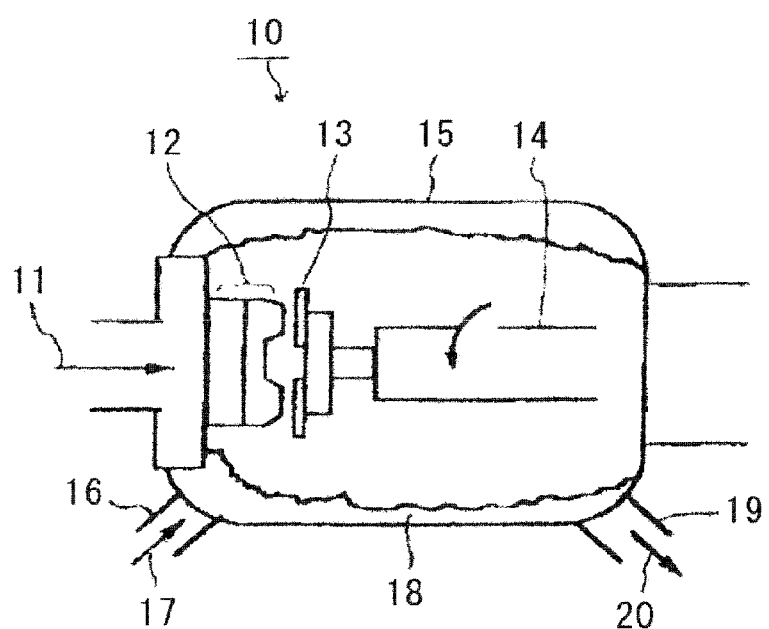
FIG. 5 shows a lateral perspective explanatory view illustrating a hot cutter used in Examples.

The resin composition extruded from the discharge opening of the twin-screw extruder was cut into pellets by a hot cutter 10 as shown in FIG. 5. Specifically, in the hot cutter 10 shown in FIG. 5, the resin composition discharged from a discharge opening 11 of the twin-screw extruder is extruded from a die 12 and applied by a revolution blade 13. The revolution blade 13 is rotated together with a rotation axis 14 directly linked to the revolution blade 13. Into a cutter box 15, cool water 17 is fed from a cool water feed port 16. The pellets immediately after having been cut are cooled by a water film 18 formed from cool water 17, and cool water and pellets 20 are discharged from a pellet outlet 19. Thus discharged pellets had flat spherical shapes and had a moisture content of 80% by mass. The resultant pellets were removed and subjected to dehydration with a centrifugal separator (diameter of the perforated plate: 1 mm; number of revolutions: 4,000 rpm; and treatment time period: 2 min). Then, for preliminary drying, a hot-air drier was used to conduct drying in an air atmosphere at 80° C. for 11 hrs to decrease the moisture content to 4.2% by mass. Subsequently, for principal drying, drying was conducted under a vacuum condition at 120° C. for 16 hrs to reduce the moisture content to 0.08% by mass or less, whereby a resin composition 25 was obtained. Quantitative determination of the metal component and the acid component in the resin composition 25 was carried out according to the method described in (4) above. The content of acetic acid and a salt thereof in terms of acetate radical was 300 ppm (5 μmol/g); the content of the phosphoric acid compound in terms of phosphate radical was 100 ppm; the content of the alkali metal (potassium) salt in terms of metal was 40 ppm; and the content of the alkali metal (sodium) salt in terms of metal was 130 ppm.

Production Examples 26 to 30, Production Examples C21 and C22

Resin compositions 26 to 30, and resin compositions C21 and C22 were produced in a similar manner to Production Example 25 except that the concentration of orthoboric acid added to the extruder, the conditions of centrifugal dehydration (treatment time period, and the moisture content after centrifugal dehydration), and the treatment temperature in the principal drying were changed as shown in Table 4. In each of the Production Examples, the principal drying was conducted until the moisture content in the pellets became 0.08% by mass or less for a treatment time period shown in Table 4.

TABLE 4

| | Resin composition | Et mol % | Concentration of orthoboric acid in treatment liquid g/L | Time period of centrifugal dehydration treatment min | Moisture content after centrifugal dehydration % by mass | Preliminary drying (air drying) | | Principal drying (vacuum drying) | |
|---|---|---|---|---|---|---|---|---|---|
| | | | | | | treatment temperature ° C. | treatment time period hours | treatment temperature ° C. | treatment time period hours |
| Production Example 25 | 25 | 32 | 5.3 | 2 | 35 | 80 | 11 | 120 | 16 |
| Production Example 26 | 26 | 32 | 12.0 | 10 | 33 | 80 | 11 | 80 | 157 |
| Production Example 27 | 27 | 32 | 12.0 | 2 | 35 | 80 | 11 | 120 | 16 |
| Production Example 28 | 28 | 32 | 12.0 | 1 | 53 | 80 | 11 | 150 | 2.9 |
| Production Example 29 | 29 | 32 | 12.0 | 0.3 | 71 | 80 | 11 | 150 | 2.9 |
| Production Example 30 | 30 | 32 | 24.0 | 2 | 35 | 80 | 11 | 120 | 16 |
| Production Example C21 | C21 | 32 | 12.0 | 60 | 30 | 80 | 11 | 80 | 157 |
| Production Example C22 | C22 | 32 | 12.0 | zero | 80 | 80 | 11 | 150 | 2.9 |

Production Examples 31 to 34

Resin compositions 31 to 34 were produced in a similar manner to Production Example 1 except that the concentration of orthoboric acid in the immersion liquid, the conditions of centrifugal dehydration (treatment time period, and the moisture content after centrifugal dehydration), and the atmosphere, the temperature and the time period of the principal drying were changed as shown in Table 5.

Production Example C23

A resin composition C23 was produced in a similar manner to Production Example C2 except that the components of the immersion liquid were changed to give 0.5 L of an immersion liquid containing 1.66 g/L orthoboric acid and 0.11 g/L potassium hydroxide. Quantitative determination of the metal component and the acid component was carried out according to the method described in (4) above. Acetic acid and a salt thereof in terms of acetate radical was 0 ppm; the alkali metal salt in terms of metal was 160 ppm; and the phosphoric acid compound in terms of phosphate radical was 0 ppm.

Examples 1 to 37, Comparative Examples 1 to 24

(a) Coextrusion Coatability

Coextrusion coating of three layers each selected from two types was carried out on a paper substrate, a multilayer structure (paper/adhesion layer/resin composition layer/adhesion layer) was obtained using each of the resin compositions obtained by the Production Examples and as the adhesion layer, "Admer (registered trademark) AT1188" (manufactured by Mitsui Chemicals, Inc.), maleic anhydride-modified linear low density polyethylene, was used. The type of the substrate and extrusion conditions were as presented below.

Substrate

"Kishu premium quality paper N" (grammage: 81.4 g/m², thickness: 100 μm, width: 600 mm) manufactured by Hokuetsu Kishu Paper Co. Ltd.

Extrusion conditions extruder for the resin composition: single screw; L/D=26, diameter of opening=50 mmφ extruder for the carboxylic acid-modified polyolefin: single screw; L/D=31, diameter of opening=65 mmφ

TABLE 5

| | Resin composition | Et mol % | Concentration of orthoboric acid in immersion liquid g/L | Time period of centrifugal dehydration treatment min | Moisture content after centrifugal dehydration % by mass | Preliminary drying (air drying) | | Principal drying | | |
|---|---|---|---|---|---|---|---|---|---|---|
| | | | | | | treatment temperature ° C. | treatment time period hours | atmosphere | treatment temperature ° C. | treatment time period hours |
| Production Example 31 | 31 | 32 | 0.43 | 2 | 150 | 80 | 3 | vacuum | 80 | 142 |
| Production Example 32 | 32 | 32 | 0.43 | 2 | 150 | 80 | 3 | vacuum | 150 | 11 |
| Production Example 33 | 33 | 32 | 0.43 | 2 | 150 | 80 | 3 | air | 120 | 25 |
| Production Example 34 | 34 | 32 | 0.43 | 2 | 150 | 80 | 3 | nitrogen | 120 | 24 |
| Production Example C23 | C23 | 32 | 1.66 | 60 | 50 | 80 | 3 | vacuum | 80 | 142 | die shape: T-die, width=620 mm, rib interval=0.7 mm, air gap=110 mm feed block and die temperature: 280° C.

drawing speed: 150 m/min (a-1) Neck-In

Sampling of 10 m of the multilayer structure obtained immediately after starting the coextrusion coating was conducted and the width of resin portion having been coextrusion coated was measured with an interval of 1 m. A value obtained by subtracting the measured width from the die width was defined as neck-in width, and evaluation was made in accordance with the following criteria. The cases of A to C were considered as inhibition of occurrence of neck-in during film formation being enabled.

A: less than 50 mm
B: 50 mm or more and less than 100 mm
C: 100 mm or more and less than 200 mm
D: 200 mm or more (a-2) Torque Pressure Extrusion torque of the extruder for each resin composition immediately after starting the coextrusion coating, 8 hrs later, and 24 hrs later was employed for evaluation of molding processability in accordance with the following criteria. The cases of A to C were considered as inhibition of excessive elevation of torque being enabled.

Evaluation Criteria of Torque Pressure

A: extrusion torque being extremely low, and molding processability being extremely favorable B: extrusion torque being low, and molding processability being favorable C: extrusion torque being high but molding processability being nonproblematic (with occasional occurrence of foaming and/or rippling)

D: extrusion torque being extremely high, and molding processability being extremely unfavorable (with frequent occurrence of foaming and/or rippling, leading to shutdown of extruder itself)

(a-3) Film Appearance

A state of generation of fish eyes, streaks and foaming of the samples collected was evaluated by visual inspection conducted immediately after starting the coextrusion coating, 8 hrs later, and 24 hrs later, respectively. With respect to the fish eyes, the number of fish eyes able to be visually observed in a field of 10 cm×10 cm was counted, and the streaks were evaluated on a field of 10 cm×10 cm in accordance with the following criteria. The cases of A to C were considered as being favorable in terms of the appearance characteristics as a film.

Evaluation Criteria of Fish Eyes

A: count of less than $5/100$ cm$^2$
B: count of $5/100$ cm$^2$ or more and less than $20/100$ cm$^2$
C: count of $20/100$ cm$^2$ or more and less than $50/100$ cm$^2$
D: count of $50/100$ cm$^2$ or more Evaluation Criteria of Streaks A: no streak found
B: slight streaks found
C: clear streaks found
D: a large number of streaks found Film Foaming absent: foaming not found
present: foaming or perforation found (b) Multilayer Film Formability under Coextrusion Condition A multilayer film was produced with a coextrusion apparatus for five layers each selected from three types described below by using each of the resin compositions obtained in the Production Examples, and evaluated in terms of (b-1) and (b-2) below.

Coextrusion molding condition

LLDPE: Ultzex (registered trademark) 3523L (linear low density polyethylene, manufactured by Mitsui Chemicals, Inc.)

adhesion layer: Bondine (registered trademark) TX8030 (manufactured by Sumitomo Chemical Co., Ltd.)

layered structural constitution: LLDPE layer/adhesion layer/resin composition layer/adhesion layer/LLDPE layer (thickness (μm): 50/10/20/10/50)

extruder for LLDPE: 32 mmφ, model GT-32-A (manufactured by Research Laboratory of Plastics Technology Co., Ltd.)

extruder for the adhesion layer: 25 mmφ, P25-18AC (manufactured by Osaka Seiki Kosaku K.K.)

extruder for the resin composition: 20 mmφ, laboratory extruder, ME model CO-EXT (manufactured by Toyo Seiki Seisaku-sho, Ltd.)

T-die: width=300 mm for five layers each selected from three types (manufactured by Research Laboratory of Plastics Technology Co., Ltd.)

extrusion temperature: C1/C2/C3/die=170/190/250/250° C.

temperature of cooling rolls: 60° C.

drawing speed: 4 m/min (b-1) Film Appearance (Fish Eye)

Each multilayer film immediately after starting the coextrusion film formation, and 240 hrs later was obtained, and the number of fish eyes each visually observable in a field of 10 cm×10 cm was counted and evaluated in accordance with the following criteria. The cases of A to C were considered as inhibition of generation of fish eyes being enabled.

Evaluation Criteria of Fish Eyes

A: count of less than $5/100$ cm$^2$
B: count of $5/100$ cm$^2$ or more and less than $20/100$ cm$^2$
C: count of $20/100$ cm$^2$ or more and less than $50/100$ cm$^2$
D: count of $50/100$ cm$^2$ or more (b-2) Film hue Ten multilayer films after the operation for 240 hrs were overlaid, and a YI (yellowness index) value was measured using "LabScan XE Sensor" manufactured by Hunter Associates Laboratory, Inc. (HunterLab). The YI value is a marker of a degree of yellowing (yellowness) of a subject, and a greater YI value indicates a higher degree of yellowing (yellowness), whereas a lower YI value indicates a lower degree of yellowing (yellowness), suggesting less coloring. The difference from a YI value measured on ten overlaid films having four layers each selected from two types not including an EVOH layer was evaluated in accordance with the following criteria.

A: less than 10
B: 10 or more and less than 20
C: 20 or more and less than 40
D: 40 or more (c) Thermoformability A multilayer structure including five layers each selected from three types (PO resin/adhesion layer/resin composition layer/adhesion layer/PO resin=400 μm/50 μm/100 μm/50 μm/400 μm) was produced by coextrusion using each of the resin compositions obtained by the Production Examples, the following polyolefin resin (PO resin), and the following adhesive resin. It is to be noted that the PO resin and the adhesive resin were selected to meet the MI of each resulting resin composition and used such that coextrusion was enabled. The PO resin and the adhesive resin used are shown in Tables 6 to 15, respectively.

PO Resin

P-1: Novatec (registered trademark) PP EX6ES (manufactured by Japan Polypropylene Corporation, MI: 3.0 g/10 min, 230° C./2,160 g)

P-2: Novatec (registered trademark) PP EA9HD (manufactured by Japan Polypropylene Corporation, MI: 0.4 g/10 min, 230° C./2,160 g)

P-3: Novatec (registered trademark) PP EA7AD (manufactured by Japan Polypropylene Corporation, MI: 1.4 g/10 min, 230° C./2,160 g)

Adhesive Resin

A-1: Admer (registered trademark) QF551 (manufactured by Mitsui Chemicals, Inc., MI: 5.7 g/10 min, 230° C./2,160 g)

A-2: Admer (registered trademark) QB540 (manufactured by Mitsui Chemicals, Inc., MI: 1.1 g/10 min, 230° C./2,160 g)

A-3: Admer QF500 (manufactured by Mitsui Chemicals, Inc., MI: 3.0 g/10 min, 230° C./2,160 g)

extruder for the PO resin: 65 mmφ, L/D=22, monoaxial screw C1/C2/C3/C4/adapter=150/200/220/240/240° C.

(single screw extruder, SZW65GT manufactured by Tekunoberu Co., Ltd.)

extruder for the adhesive resin: 40 mmφ, L/D=26, monoaxial screw C1/C2/C3/C4/adapter=150/210/220/230/240° C.

(single screw extruder, manufactured by Research Laboratory of Plastics Technology Co., Ltd. GT-40-A)

extruder for the resin composition: 40 mmφ, L/D=22, monoaxial screw C1/C2/C3/C4/adapter=175/210/220/230/240° C.

(single screw extruder, manufactured by Research Laboratory of Plastics Technology Co., Ltd. GT-40-I)

feed block die: width=600 mm 240° C.

With respect to the multilayer structure thus obtained, the multilayer structure was used immediately after starting the film formation, 48 hrs later, and 96 hrs later, respectively, to carry out thermoforming (compressed air=5 kg/cm², plug: 45 mmφ×65 mm, syntax form, plug temperature=150° C., die temperature=70° C.) into a cup-shape (die shape: 70 mmφ×70 mm, draw ratio S=1.0) with a thermoforming machine (Compact multifunction pressure and vacuum forming machine FKS-0632-20, manufactured by Asano Laboratories Co. Ltd.). The appearance of the formed cup was evaluated by visual inspection. The cases of A to C were considered as being favorable in appearance characteristics.

Evaluation Criteria of Appearance

A: no stripes

B: one or fewer slight stripes

C: two or more slight stripes

D: clear stripe(s)

(d) Film Formability

With respect to 100 parts by mass of the pellets of each of the resin compositions obtained by the Production Examples, 0.03 parts by mass of synthetic silica ("Sylysia 310P" manufactured by Fuji Silysia Chemical Ltd., having an average particle diameter of 2.7 μm as measured by a laser procedure) were dry-blended using a tumbler. A mixture thus obtained (a resin composition containing synthetic silica) was melted at 260° C., and concurrently with extrusion on casting rolls from a die having a width of 1,200 mm, the air was blown thereto at a rate of 30 m/sec by using an air knife to give an unstretched film by rolling up at a drawing speed of 100 m/min. Each unstretched film thus obtained was evaluated as in the following.

(d-1) Neck-In

Sampling of 10 m of the unstretched film obtained immediately after starting-up was conducted, and the width of the unstretched film was measured with an interval of 1 m. A value obtained by subtracting the measured width from the die width was defined as neck-in width, and evaluation was made in accordance with the following criteria. The cases of A to C were considered as the neck-in being inhibited.

A: less than 96 mm

B: 96 mm or more and less than 192 mm

C: 192 mm or more and less than 384 mm

D: 384 mm or more (d-2) Fish Eye

With respect to the unstretched film each obtained after a continuous operation for 48 hrs and after a continuous operation for 96 hrs, the number of fish eyes was counted by visual inspection on a 10-cm square, and the fish eyes were evaluated in accordance with the following criteria. The cases of A to C were considered as generation of fish eyes being inhibited.

A: count of less than 5

B: count of 5 or more and less than 20

C: count of 20 or more and less than 50

D: count of 50 or more (e) Stretchability

The unstretched film obtained in (d) described above was brought into contact with warm water at 80° C. for 10 sec and stretched using tenter type simultaneous biaxial stretching equipment at 90° C., 3.2 times in a machine direction and 3.0 times in a transverse direction, and further subjected to a heat treatment for 5 sec in a tenter preset to 170° C. to produce a biaxially stretched film having a total width of 3.6 m. It is to be noted that biaxially stretched films were similarly produced except that: with respect to the resin composition 11, the setting of the stretching temperature was 83° C. and the setting of the heat treatment temperature was 152° C.; and with respect to the resin composition 12, the setting of the stretching temperature was 93° C. and the setting of the heat treatment temperature was 177° C. Each of thus produced biaxially stretched films was slit to give a width of 80 cm while unwinding, with a middle position with respect to the film total width being centered, whereby a roll having a length of 4,000 m was obtained. Furthermore, a film was continuously produced to yield 432 rolls in total having a length of 4,000 m for each resin composition. Each stretched film had an average thickness of 12 μm. With respect to the biaxially stretched film produced from the unstretched film after the operation for 96 hrs, the occurrence of stripy stretching unevenness was visually observed, and evaluated in accordance with the following criteria. The cases of A to C were considered as being favorable in stretchability.

A: stretching unevenness not found

B: slight stretching unevenness found

C: clear stretching unevenness found

D: occurrence of paper breakage or perforation found (f) Impact Resistance at Low Temperature (Multilayer Film)

The biaxially stretched film obtained in (e) described above was cut out into A4 size from a central portion in the width direction, and a surface thereof was coated with an adhesive for dry lamination (a mixture of TAKELAC A-520 and TAKENATE A-50 manufactured by Mitsui Chemicals, Inc., in a mass ratio of 6/1 to prepare an ethyl acetate solution having a solid content concentration of 23% by mass) using a bar coater No. 12 available from Dai-ichi Rika Co., Ltd., and subjected to hot-air drying at 50° C. for 5 min. An LLDPE film (manufactured by Idemitsu Unitech Co.

Ltd., UNILAX LS-760C: thickness=50 μm) was pasted on one face to which the adhesive was applied, and lamination was performed with nip rolls heated to 80° C. An unstretched polypropylene (CPP) film (RXC-21 manufactured by Mitsui Chemicals Tohcello Inc., thickness=50 μm) was further pasted similarly on another face and allowed to age at 40° C. for 5 days. Accordingly, a multilayer structure having a layered structural constitution of: (outside) LLDPE layer/adhesive layer/EVOH layer/adhesive layer/CPP layer (inside) was obtained.

Two multilayer structures obtained in this manner were heat sealed to form a pouch bag, which was packed with ceramic spheres having a radius shown in each of Tables 6 to 15 below in a state of being spread to form a single layer such that spherical bodies were in contact with one another. After cooling in a−20° C. temperature-controlled room for 6 hrs, vacuum packaging was performed. A corrugated carton box (15 cm×35 cm×45 cm) in which a cushioning material had been spread was packed with the vacuum packaging bags numbering fifty in total, and a transportation test was performed in which the corrugated carton box was loaded on a track which shuttled between Tokyo and Okayama ten times at −20° C. After the transportation test, the pouch bag was opened and the multilayer structure was cut out to give a piece of 10-cm square. It is to be noted that as the radius of ceramic sphere increases, flexion during vacuum packaging is enhanced. Evaluations were made under the same condition in the case of the same content of the boron compound (B), i.e., using the ceramic spheres having the same radius. The multilayer structure cut out was connected to MOCON OX-TRAN 2/20, manufactured by Modern Controls, Inc., (detection limit: 0.01 mL/(m²·day·atm)) to measure an oxygen transmission rate and evaluated in accordance with the following criteria. The measurement conditions involved 23° C. and 65% RH on both a carrier gas side and an oxygen gas side, and an oxygen pressure of 1 atmospheric pressure and a carrier gas pressure of 1 atmospheric pressure. The cases of A to C were considered as being favorable in impact resistance at a low temperature (gas barrier properties).

A: less than 0.6 mL/(m²·day·atm)
B: 0.6 mL/(m²·day·atm) or more and less than 1.2 mL/(m²·day·atm)
C: 1.2 mL/(m²·day·atm) or more and less than 1.8 mL/(m²·day·atm)
D: 1.8 mL/(m²·day·atm) or more (g) Impact Resistance at Low Temperature (Vapor Deposition Film)

Production of Vapor Deposition Film

With respect to Examples 1 to 34 and Comparative Examples 1 to 23, a vapor deposition film was obtained by using batch-type vapor deposition equipment ("EWA-105" available from ULVAC, Inc.) on each biaxially stretched film obtained in (e) described above through vapor deposition of aluminum on one face of the biaxially stretched film, at a surface temperature of the biaxially stretched film of 38° C., and at a travelling speed of the biaxially stretched film of 200 m/min. The vapor deposition film thus obtained was cut with a microtome, and a thus exposed cross section was observed using a scanning electron microscope. As a result of a measurement of the thickness of the vapor deposition layer using a backscattered electron detector, the vapor deposition layer had an average thickness of 70 nm.

With respect to Example 35 and Comparative Example 24, vapor deposition films were obtained by vapor deposition of aluminum on both faces under a similar condition to that described above. Each average thickness of the vapor deposition layers on both faces was 70 nm.

With respect to Example 36 and Example 37, travelling speed of the film during formation of the vapor deposition layer was regulated to give the vapor deposition films in which the average thickness of the vapor deposition layer was in Example 36, and the average thickness of the vapor deposition layer was 130 nm in Example 37.

Production of Multilayer Structure

Next, the vapor deposition film obtained was cut out into A4 size from a central portion in the width direction, and a surface thereof was coated with an adhesive for dry lamination (a mixture of TAKELAC A-520 and TAKENATE A-50 manufactured by Mitsui Chemicals, Inc., in a mass ratio of 6/1 to prepare an ethyl acetate solution having a solid content concentration of 23% by mass) using a bar coater No. 12 available from Dai-ichi Rika Co., Ltd., and subjected to hot-air drying at 50° C. for 5 min. An LLDPE film (manufactured by Tdemitsu Unitech Co. Ltd., UNTLAX LS-760C: thickness=50 μm) was pasted on one face to which the adhesive was applied, and lamination was performed with nip rolls heated to 80° C. An unstretched polypropylene (CPP) film (RXC-21 manufactured by Mitsui Chemicals Tohcello Inc., thickness=50 μm) was further pasted similarly on another face and allowed to age at 40° C. for 5 days. Accordingly, a multilayer structure having a layered structural constitution of: (outside) LLDPE layer/adhesive layer/vapor deposition film/adhesive layer/CPP layer (inside) was obtained.

Two multilayer structures obtained in this manner were heat sealed to form a pouch bag (vacuum packaging bag), which was packed with ceramic spheres having a radius shown in each of Tables 6 to 16 below in a state of being spread to form a single layer such that spherical bodies were in contact with one another. After cooling in a −20° C. temperature-controlled room for 6 hrs, vacuum packaging was performed. A corrugated carton box (15 cm×35 cm×45 cm), in which a cushioning material had been spread, was packed with the vacuum packaging bags fifty in total, and a transportation test was performed in which the corrugated carton box was loaded on a track which shuttled between Tokyo and Okayama ten times at −20° C. After the transportation test, the pouch bag was opened and the multilayer structure was cut out to give a piece of 10-cm square. It is to be noted that as the radius of ceramic sphere increases, flexion during vacuum packaging is enhanced. Evaluations were made under the same condition in the case of the same content of the boron compound (B), i.e., using the ceramic spheres having the same radius. The multilayer structure cut out was connected to MOCON OX-TRAN 2/20 manufactured by Modern Controls, Inc., (detection limit: 0.01 mL/(m²·day·atm)) to measure an oxygen transmission rate and evaluated in accordance with the following criteria. The measurement conditions involved 23° C. and 65% RH on both a carrier gas side and an oxygen gas side, and an oxygen pressure of 1 atmospheric pressure and a carrier gas pressure of 1 atmospheric pressure. The cases of A to C were considered as being favorable in impact resistance at a low temperature (gas barrier properties).

A: less than 0.05 mL/(m²·day·atm)
B: 0.05 mL/(m²·day·atm) or more and less than 0.10 mL/(m²·day·atm)
C: 0.10 mL/(m²·day·atm) or more and less than 0.30 mL/(m²·day·atm)
D: 0.30 mL/(m²·day·atm) or more (h) Heat Cycle Resistance The pouch bag produced by a similar procedure to that in (g) described above was stored at −20° C. for 24 hrs, and then dried with a 100° C. dryer for 24 hrs. This process was regarded as one cycle, and a heat treatment of 50 cycles was performed. After the test, the pouch bag was opened and the multilayer structure was cut out to give a piece of 10-cm square.

The multilayer structure cut out was connected to MOCON OX-TRAN 2/20 manufactured by Modern Controls, Inc., (detection limit: 0.01 mL/(m²·day·atm)) to measure an oxygen transmission rate and evaluated in accordance with the following criteria. The measurement conditions involved 23° C. and 65% RH on both a carrier gas side and an oxygen gas side, and an oxygen pressure of 1 atmospheric pressure and a carrier gas pressure of 1 atmospheric pressure. The cases of A to C were considered as being favorable in heat cycle resistance.

A: less than 0.05 mL/(m²·day·atm)
B: 0.05 mL/(m²·day·atm) or more and less than 0.10 mL/(m²·day·atm)
C: 0.10 mL/(m²·day·atm) or more and less than 0.30 mL/(m²·day·atm)
D: 0.30 mL/(m²·day·atm) or more (i) Thickness Unevenness of Resin Composition Layer of Multilayer Sheet Production of Multilayer Sheet A multilayer sheet including five layers each selected from three types (PO resin layer/adhesive resin/resin composition layer/adhesive resin layer/PO resin layer=460 μm/20 μm/40 μm/20 μm/460 μm) was produced by coextrusion molding using each of the resin compositions obtained by the Production Examples, a polyolefin resin (PO resin), and an adhesive resin. It is to be noted that the PO resin and the adhesive resin were selected to meet the MI of each resulting resin composition and used such that coextrusion molding was enabled. Types of the PO resin and the adhesive resin used were similar to those used in the evaluation of (c) Thermoformability described above. The PO resin and the adhesive resin used are shown in Tables 6 to 15, respectively.

Coextrusion condition
  extruder for the PO resin: 65 mmφ extruder, L/D=22, monoaxial screw C1/C2/C3/C4/adapter=150/200/220/240/240° C.
  (single screw extruder, SZW65GT manufactured by Tekunoberu Co., Ltd.)
  extruder for the adhesive resin: 40 mmφ extruder, L/D=26, monoaxial screw C1/C2/C3/C4/adapter=150/210/220/230/240° C.
  (single screw extruder, manufactured by Research Laboratory of Plastics Technology Co., Ltd.GT-40-A)
  extruder for the resin composition: 40 mmφ extruder, L/D=22, monoaxial screw C1/C2/C3/C4/adapter=175/210/220/230/240° C.
  (single screw extruder, manufactured by Research Laboratory of Plastics Technology Co., Ltd.GT-40-I)
  feed block die: width=600 mm 240° C.

The multilayer sheet obtained immediately after starting the film formation was observed by a microscope on cross sections at the center with respect to the width and at two positions 200 mm away therefrom in the transverse direction (TD), and evaluated based on the difference by % of the thickness of the resin composition layer on both ends in TD with respect to the thickness of the central position of the resin composition layer. This evaluation was made on five sites per sample, with an interval of 1 m in the machine direction (MD) of the multilayer sheet, and the average was calculated and evaluated in accordance with the following evaluation criteria. The cases of A to C were considered as the thickness unevenness being inhibited.

A: average thickness unevenness being±less than 5%
B: average thickness unevenness being±5% or more and less than 15%
C: average thickness unevenness being±15% or more and less than 25%
D: average thickness unevenness being±25% or more (j) Appearance of Thermoformed Container With respect to the multilayer sheet produced in (i) above, the multilayer sheet was used immediately after starting the film formation, after the continuous operation for 48 hrs, and after the continuous operation for 96 hrs, respectively, to carry out thermoforming (compressed air=5 kg/cm², plug: 45 mmφ×65 mm, syntax form, plug temperature=150° C., die temperature=70° C.) into a cup-shape (die shape: 70 mmφ×70 mm, draw ratio S=1.0) with a thermoforming machine (Compact multifunction pressure and vacuum forming machine FKS-0632-20, manufactured by Asano Laboratories Co. Ltd.).

With respect to the thermoformed container thus obtained, the streaks were evaluated by visual inspection in accordance with the following criteria. In addition, with respect to the thermoformed container obtained using the multilayer sheet after the operation for 96 hrs, five pieces cut out from the bottom were overlaid, and the YI (yellowness index) value of the sheet after thermoforming was measured using "Lab Scan XE Sensor" manufactured by Hunter Associates Laboratory, Inc. (HunterLab). It is to be noted that the YI value is a marker indicating a degree of yellowing (yellowness) of a subject, and a greater YI value indicates a higher degree of yellowing (yellowness), whereas a less YI value indicates a lower degree of yellowing (yellowness), suggesting less coloring. The difference from a YI value measured on five overlaid sheets having four layers each selected from two types not including an EVOH layer was evaluated in accordance with the following criteria. Furthermore, with respect to the thermoformed container obtained using the multilayer sheet after the continuous operation for 96 hrs, the seeds were evaluated by visual inspection in accordance with the following criteria. In the evaluation of the streaks, the cases of A to C were considered as the streaks being inhibited; in the evaluation of the coloring, the cases of A to C were considered as the coloring being inhibited; and in the evaluation of the seeds, the cases of A to C were considered as the seeds being inhibited.

Evaluation Criteria of Streaks
  A: no streak(s)
  B: one or fewer slight streak(s) found
  C: two or more slight streaks found
  D: clear stripe(s)

Evaluation Criteria of Coloring
  A: YI value being less than 10
  B: YI value being 10 or more and less than 20
  C: YI value being 20 or more and less than 40
  D: YI value being 40 or more Evaluation Criteria of Seeds
  A: seed(s) not found
  B: fine seed(s) found
  C: two or fewer clear seed(s) per container found
  D: three or more clear seeds per container found (k) Impact Resistance at Low Temperature (Thermoformed Container)

The thermoformed container obtained using the multilayer sheet after the continuous operation for 96 hrs was packed with 250 mL of propylene glycol, and the opening was shut with a lid by heat sealing of a film including polyethylene 40 μm/aluminum foil 12 μm/polyethylene terephthalate 12 μm. This container was stored with cooling at −40° C. for eight weeks.

After storage at a low temperature, the lid was taken off and polypropylene glycol was discharged therefrom, followed by washing of the surface of the thermoformed container. The container was fixed with an epoxy adhesive to a jig provided by connecting a copper tube with a metal plate such that the inner surface side faced the metal plate, and then connected to MOCON OX-TRAN 2/20 manufactured by Modern Controls, Inc., (detection limit: 0.01 mL/(m$^2$·day·atm)) to measure an oxygen transmission rate. The measurement conditions involved 23° C. and 65% RH on both a carrier gas side and an oxygen gas side, and an oxygen pressure of 1 atmospheric pressure and a carrier gas pressure of 1 atmospheric pressure.

In addition, the container stored at −40° C. for eight weeks was dropped from a height of 3 m while the temperature has been maintained at −40° C., and with respect to an unbroken container by this process, the oxygen transmission rate was measured similarly to the measurement before this drop test. Based on the oxygen transmission rates before and after the drop test, evaluations were made in accordance with the following criteria. The cases of A to C for the evaluation after the drop test were considered as being favorable in impact resistance at a low temperature (gas barrier properties).

A: less than 1.0 mL/(m$^2$·day·atm)
B: 1.0 mL/(m$^2$·day·atm) or more and less than 5.0 mL/(m$^2$·day·atm)
C: 5.0 mL/(m$^2$·day·atm) or more and less than 30 mL/(m$^2$·day·atm)
D: 30 mL/(m$^2$·day·atm) or more (l) Appearance of Blow-Molded Container Production of Blow-Molded Container A blow-molded container including five layers each selected from three types (inside) high density polyethylene/adhesive resin/resin composition/adhesive resin layer/high density polyethylene (outside) was produced by a blow molding machine TB-ST-6P manufactured by Suzuki Tekkojo Kabushiki Kaisha (Suzuki Ironworks Co., Ltd.) at 210° C. using each of the resin compositions obtained by the Production Examples, high density polyethylene (Prime Polymer Co., Ltd., HI-ZEX8200B, MI at 190° C., 2,160 g=0.03 g/10 min), and the following adhesive resin. It is to be noted that in production of the blow-molded container, by cooling at an internal temperature of the die of 15° C. for 20 sec, a 3-L tank which includes a body part having a total layer thickness of 1,000 μm: ((inside)high density polyethylene/adhesive resin/resin composition/adhesive resin/high density polyethylene (outside)=(inside) 430/50/40/50/430 μm (outside)) was molded. This tank had an average diameter of the bottom face being 100 mm, and an average height of 400 mm. It is to be noted that the following adhesive resin was selected to meet the MI of each resulting resin composition and used such that blow molding is enabled. The adhesive resin used is shown in each of Tables 6 to 15.

Adhesive Resin

A'-1: ADMER NF642E (manufactured by Mitsui Chemicals, Inc., MI at 190° C., 2,160 g=4.0 g/10 min)
A'-2: ADMER AT2235E (manufactured by Mitsui Chemicals, Inc., MI at 190° C., 2,160 g=0.3 g/10 min)
A'-3: ADMER NF408E (manufactured by Mitsui Chemicals, Inc., MI at 190° C., 2,160 g=1.6 g/10 min)

The 3-L tank (blow-molded container) molded immediately after the starting up of the blow molding machine, after the continuous operation for 48 hrs, and after the continuous operation for 96 hrs, respectively, was cut along a long axis direction, and then held up to a illumination with a fluorescent lamp to confirm the presence of streaks and seeds by visual inspection and evaluate in accordance with the following criteria. The cases of A to C were considered as the streaks or seeds being inhibited.

Evaluation Criteria of Streaks
A: no streak found
B: two or fewer slight streak(s) found
C: a large number of slight streaks found
D: clear streak(s) found Evaluation Criteria of Seeds
A: seed(s) not found
B: fine seed(s) found
C: two or fewer clear seed(s) per container found
D: three or more clear seeds per container found (m) Impact Resistance at Low Temperature (Blow-Molded Container)

The 3-L tank (blow-molded container) molded after the continuous operation for 96 hrs was packed with 2.5 L of propylene glycol, and the opening was shut with a lid by heat sealing of a film including polyethylene 40 μm/aluminum foil 12 μm/polyethylene terephthalate 12 μm. This tank was stored at−40° C. for eight weeks.

A 10-cm square flat plate was cut out from a portion having a shape approximate to planar positioned below a liquid level in the body part of the blow-molded container after storing, and the surface was washed. Thereafter, the tank was fixed with an epoxy adhesive to a jig provided by connecting a copper tube with a metal plate such that the inner face side was brought into contact with the metal plate, and then connected to MOCON OX-TRAN 2/20 manufactured by Modern Controls, Inc., (detection limit: 0.01 mL/(m$^2$·day·atm)) to measure an oxygen transmission rate. The measurement conditions involved 23° C. and 65% RH on both a carrier gas side and an oxygen gas side, and an oxygen pressure of 1 atmospheric pressure and a carrier gas pressure of 1 atmospheric pressure.

In addition, the tank stored at −40° C. was dropped from a height of 6 m while maintaining the temperature of −40° C., and with respect to an unbroken container by this process, the oxygen transmission rate was measured similarly to the measurement before this drop test. Based on the oxygen transmission rates before and after the drop test, evaluations were made in accordance with the following criteria. The cases of A to C for the evaluation after the drop test were considered as being superior in impact resistance at a low temperature (gas barrier properties).

A: less than 0.1 mL/(m$^2$·day·atm)
B: 0.1 mL/(m$^2$·day·atm) or more and less than 1.0 mL/(m$^2$·day·atm)
C: 1.0 mL/(m$^2$·day·atm) or more and less than 10 mL/(m$^2$·day·atm)
D: 10 mL/(m$^2$·day·atm) or more With respect to the resin compositions 1 to 34 and resin compositions C1 to C23, quantitative determination of the boron compound (B) and the free boric acid (C), and measurement of the MI was carried out according to the procedure described in (1) to (3) above. In addition, with respect to each of the Examples and Comparative Examples in which the resin compositions 1 to 34 and the resin compositions C1 to C23 were used, each evaluation presented in Tables 6 to 16 was made according to each method described in (a) to (m) above. The results are shown in Tables 6 to 16. It is to be noted that a blank column in Tables 6 to 16 indicates that the evaluation was not made.

TABLE 6

| | | | | Example 1 | Example 2 | Example 3 | Example 4 | Example 5 | Example 6 |
|---|---|---|---|---|---|---|---|---|---|
| Resin composition | | resin composition | | 1 | 2 | 3 | 4 | 5 | 6 |
| | | ethylene unit content | mol % | 32 | 32 | 32 | 32 | 32 | 32 |
| | | boron compound (B) | ppm | 110 | 730 | 1200 | 2400 | 110 | 530 |
| | free boric acid (C) | proportion | mass % | 0.10 | 0.13 | 0.13 | 0.13 | 0.70 | 0.70 |
| | | content | ppm | 0.11 | 0.95 | 1.56 | 3.12 | 0.77 | 3.71 |
| | | MI | g/10 min (190° C., 2,160 g) | 6.5 | 2.1 | 1.2 | 0.8 | 6.5 | 3.5 |
| Evaluations | (a) coextrusion coatability | neck-in | immediately after | C | B | A | A | C | B |
| | | torque | immediately after | A | A | A | B | A | A |
| | | | 8 hrs later | A | A | A | B | A | A |
| | | | 24 hrs later | A | A | A | B | A | A |
| | | fish eye | immediately after | A | A | A | A | A | A |
| | | | 8 hrs later | A | A | A | A | A | A |
| | | | 24 hrs later | A | A | A | A | A | A |
| | | streak | immediately after | A | A | A | A | A | A |
| | | | 8 hrs later | A | A | A | A | A | A |
| | | | 24 hrs later | A | A | A | A | A | A |
| | | foaming | immediately after | absent | absent | absent | absent | absent | absent |
| | (b) multilayer film formability by coextrusion | fish eye | immediately after | A | A | A | A | A | A |
| | | | 240 hrs later | A | A | A | A | A | A |
| | | film hue | 240 hrs later | A | A | A | A | A | A |
| | (c) thermoformability | PO resin layer | | | | P-3 | | P-1 | |
| | | adhesion layer | | | | A-3 | | A-1 | |
| | | streak | immediately after | | | B | | A | |
| | | | 48 hrs later | | | B | | B | |
| | | | 96 hrs later | | | C | | C | |
| Film evaluation | (d) film formability | neck-in | immediately after | C | B | A | A | C | B |
| | | fish eye | 48 hrs later | A | A | A | A | A | A |
| | | | 96 hrs later | A | A | A | A | A | A |
| | (e) stretchability | biaxial stretchability | 96 hrs later | A | A | A | B | A | A |
| | (f) impact resistance at low temperature | radius of ceramic sphere | mm | 20 | | 10 | | 20 | |
| | | OTR after transportation test | | C | | C | | A | |
| Vapor deposition film evaluation | inorganic vapor deposition layer | face with vapor deposition | | one face | one face | one face | one face | one face | one face |
| | | thickness | nm | 70 | 70 | 70 | 70 | 70 | 70 |
| | (g) impact resistance at low temperature | radius of ceramic sphere | mm | 20 | | 10 | | 20 | |
| | | OTR after transportation test | | C | | C | | A | |
| | (h) heat cycle resistance | OTR after heat cycle test | | A | | A | | A | |
| Thermoformed container evaluation | | PO resin layer | | P-1 | P-1 | P-3 | P-2 | P-1 | P-1 |
| | | adhesive resin layer | | A-1 | A-1 | A-3 | A-2 | A-1 | A-1 |
| | (i) thickness unevenness of layer of multilayer sheet | | immediately after | C | A | A | A | C | A |
| | (j) appearance | streak | immediately after | A | A | A | A | A | A |
| | | | 48 hrs later | B | C | B | C | B | A |
| | | | 96 hrs later | C | C | C | C | C | B |
| | | coloring | 96 hrs later | A | A | A | A | A | A |
| | | seed | 96 hrs later | A | A | A | A | A | A |
| | (k) impact resistance at low temperature | OTR | before drop test | C | C | B | C | B | B |
| | | | after drop test | C | C | B | C | C | B |
| Blow-molded container evaluation | | adhesive resin | | A'-1 | A'-1 | A'-3 | A'-2 | A'-1 | A'-1 |
| | (l) appearance | streak | immediately after | A | A | A | A | A | A |
| | | | 48 hrs later | B | C | B | C | B | A |
| | | | 96 hrs later | C | C | C | C | C | B |
| | | seed | 48 hrs later | A | A | A | A | A | A |
| | | | 96 hrs later | A | A | A | A | A | A |
| | (m) impact resistance at low temperature | OTR | before drop test | C | C | B | C | B | B |
| | | | after drop test | C | C | B | C | C | B |

TABLE 7

| | | | | Example 7 | Example 8 | Example 9 | Example 10 | Example 11 | Example 12 |
|---|---|---|---|---|---|---|---|---|---|
| Resin composition | | resin composition | | 7 | 8 | 9 | 10 | 11 | 12 |
| | | ethylene unit content | mol % | 32 | 32 | 32 | 32 | 44 | 27 |
| | | boron compound (B) | ppm | 730 | 730 | 1200 | 1200 | 1200 | 1200 |
| | free boric acid (C) | proportion | mass % | 0.33 | 0.70 | 0.33 | 0.70 | 0.70 | 0.70 |
| | | content | ppm | 2.41 | 5.11 | 3.96 | 8.40 | 8.40 | 8.40 |
| | | MI | g/10 min (190° C., 2,160 g) | 2.1 | 2.1 | 1.2 | 1.2 | 2.0 | 4.0 (210° C.) |

TABLE 7-continued

|  |  |  |  | Example 7 | Example 8 | Example 9 | Example 10 | Example 11 | Example 12 |
|---|---|---|---|---|---|---|---|---|---|
| Evaluations | (a) coextrusion coatability | neck-in | immediately after | B | B | A | A | B | A |
|  |  | torque | immediately after | A | A | A | A | A | A |
|  |  |  | 8 hrs later | A | A | A | A | A | A |
|  |  |  | 24 hrs later | A | A | A | A | A | B |
|  |  | fish eye | immediately after | A | A | A | A | A | A |
|  |  |  | 8 hrs later | A | A | A | A | A | A |
|  |  |  | 24 hrs later | A | A | A | A | A | B |
|  |  | streak | immediately after | A | A | A | A | A | A |
|  |  |  | 8 hrs later | A | A | A | A | A | A |
|  |  |  | 24 hrs later | A | A | A | A | A | B |
|  |  | foaming | immediately after | absent | absent | absent | absent | absent | absent |
|  | (b) multilayer film formability by coextrusion | fish eye | immediately after | A | A | A | A | A | A |
|  |  |  | 240 hrs later | A | A | A | A | A | B |
|  |  | film hue | 240 hrs later | A | A | A | A | A | A |
|  | (c) thermoformability |  | PO resin layer |  |  | P-3 | P-3 |  |  |
|  |  |  | adhesion layer |  |  | A-3 | A-3 |  |  |
|  |  | streak | immediately after |  |  | A | A |  |  |
|  |  |  | 48 hrs later |  |  | B | A |  |  |
|  |  |  | 96 hrs later |  |  | B | A |  |  |
| Film evaluation | (d) film formability | neck-in | immediately after | B | B | A | A | B | A |
|  |  | fish eye | 48 hrs later | A | A | A | A | A | A |
|  |  |  | 96 hrs later | A | A | A | A | A | B |
|  | (e) stretchability | biaxial stretchability | 96 hrs later | A | A | A | A | A | C |
|  | (f) impact resistance at low temperature | radius of ceramic sphere | mm |  |  | 10 | 10 | 10 | 10 |
|  |  | OTR after transportation test |  |  |  | B | A | C | B |
| Vapor deposition film evaluation | inorganic vapor deposition layer | face with vapor deposition | | one face | one face | one face | one face | one face | one face |
|  |  | thickness | nm | 70 | 70 | 70 | 70 | 70 | 70 |
|  | (g) impact resistance at low temperature | radius of ceramic sphere | mm | 10 | 10 | 10 | 10 | 10 | 10 |
|  |  | OTR after transportation test |  |  |  | B | A | B | C |
|  | (h) heat cycle resistance | OTR after heat cycle test |  |  |  | A | A | A | B |
| Thermoformed container evaluation |  | PO resin layer |  | P-1 | P-1 | P-3 | P-3 | P-3 | P-1 |
|  |  | adhesive resin layer |  | A-1 | A-1 | A-3 | A-3 | A-3 | A-1 |
|  | (i) thickness unevenness of layer of multilayer sheet |  | immediately after | A | A | A | A | B | B |
|  | (j) appearance | streak | immediately after | A | A | A | A | A | A |
|  |  |  | 48 hrs later | B | A | B | A | A | A |
|  |  |  | 96 hrs later | C | A | B | A | A | B |
|  |  | coloring | 96 hrs later | A | A | A | A | A | A |
|  |  | seed | 96 hrs later | A | A | A | A | A | B |
|  | (k) impact resistance at low temperature | OTR | before drop test | C | A | A | A | A | A |
|  |  |  | after drop test | C | B | B | A | A | C |
| Blow-molded container evaluation |  | adhesive resin |  | A'-1 | A'-1 | A'-3 | A'-3 | A'-3 | A'-1 |
|  | (l) appearance | streak | immediately after | A | A | A | A | A | A |
|  |  |  | 48 hrs later | B | A | B | A | A | A |
|  |  |  | 96 hrs later | C | A | B | A | A | B |
|  |  | seed | 48 hrs later | A | A | A | A | A | A |
|  |  |  | 96 hrs later | A | A | A | A | A | B |
|  | (m) impact resistance at low temperature | OTR | before drop test | C | A | A | A | A | A |
|  |  |  | after drop test | C | B | B | A | A | C |

TABLE 8

|  |  |  |  | Example 13 | Example 14 | Example 15 | Example 16 | Example 17 | Example 18 |
|---|---|---|---|---|---|---|---|---|---|
| Resin composition |  | resin composition |  | 13 | 14 | 15 | 16 | 17 | 18 |
|  |  | ethylene unit content | mol % | 32 | 32 | 32 | 32 | 32 | 32 |
|  |  | boron compound (B) | ppm | 1500 | 2400 | 2400 | 4800 | 730 | 730 |
|  | free boric acid (C) | proportion | mass % | 0.70 | 0.33 | 0.70 | 0.70 | 2.80 | 6.80 |
|  |  | content | ppm | 10.5 | 7.92 | 16.8 | 33.6 | 20.4 | 49.6 |
|  |  | MI | g/10 min (190° C., 2,160 g) | 1.1 | 0.8 | 0.8 | 0.3 | 2.1 | 2.1 |
| Evaluations | (a) coextrusion coatability | neck-in | immediately after | A | A | A | A | B | B |
|  |  | torque | immediately after | A | B | B | B | A | A |
|  |  |  | 8 hrs later | A | B | B | B | A | B |
|  |  |  | 24 hrs later | A | B | B | C | A | B |
|  |  | fish eye | immediately after | A | A | A | A | A | A |
|  |  |  | 8 hrs later | A | A | A | A | A | A |
|  |  |  | 24 hrs later | A | A | A | B | B | B |
|  |  | streak | immediately after | A | A | A | A | A | A |
|  |  |  | 8 hrs later | A | A | B | B | A | B |
|  |  |  | 24 hrs later | A | A | B | C | B | B |
|  |  | foaming | immediately after | absent | absent | absent | absent | absent | absent |

TABLE 8-continued

|  |  |  |  | Example 13 | Example 14 | Example 15 | Example 16 | Example 17 | Example 18 |
|---|---|---|---|---|---|---|---|---|---|
|  |  | (b) multilayer film formability by coextrusion | fish eye immediately after | A | A | A | A | A | A |
|  |  |  | 240 hrs later | B | A | A | B | B | B |
|  |  |  | film hue 240 hrs later | A | A | A | A | A | A |
|  |  | (c) thermoformability | PO resin layer | P-3 |  |  | P-2 |  |  |
|  |  |  | adhesion layer | A-3 |  |  | A-2 |  |  |
|  |  |  | streak immediately after | A |  |  | A |  |  |
|  |  |  | 48 hrs later | A |  |  | A |  |  |
|  |  |  | 96 hrs later | A |  |  | B |  |  |
| Film | evaluation | (d) film formability | neck-in immediately after | A | A | A | A | B | B |
|  |  |  | fish eye 48 hrs later | A | A | A | A | A | A |
|  |  |  | 96 hrs later | A | A | A | B | B | B |
|  |  | (e) stretchability | biaxial stretchability 96 hrs later | A | B | B | C | B | B |
|  |  | (f) impact resistance | radius of ceramic sphere mm | 7 |  |  | 5 |  |  |
|  |  | at low temperature | OTR after transportation test | B |  |  | B |  |  |
| Vapor | inorganic vapor deposition | | face with vapor deposition | one face | one face | one face | one face | one face | one face |
| deposition | layer | | thickness nm | 70 | 70 | 70 | 70 | 70 | 70 |
| film | evaluation | (g) impact resistance | radius of ceramic sphere mm | 7 |  |  | 5 |  |  |
|  |  | at low temperature | OTR after transportation test | A |  |  | C |  |  |
|  |  | (h) heat cycle resistance | OTR after heat cycle test | A |  |  | B |  |  |
| Thermo- |  | PO resin layer |  | P-3 | P-2 | P-2 | P-2 | P-1 | P-1 |
| formed |  | adhesive resin layer |  | A-3 | A-2 | A-2 | A-2 | A-1 | A-1 |
| container | evaluation | (i) thickness unevenness of layer of multilayer sheet | immediately after | A | A | A | B | A | A |
|  |  | (j) appearance | streak immediately after | A | A | A | A | A | A |
|  |  |  | 48 hrs later | A | B | A | A | A | A |
|  |  |  | 96 hrs later | A | C | A | B | B | B |
|  |  |  | coloring 96 hrs later | A | A | A | A | A | A |
|  |  |  | seed 96 hrs later | B | A | A | B | B | B |
|  |  | (k) impact resistance | OTR before drop test | A | B | A | B | B | B |
|  |  | at low temperature |  after drop test | B | C | B | B | B | C |
| Blow- |  | adhesive resin |  | A'-3 | A'-2 | A'-2 | A'-2 | A'-1 | A'-1 |
| molded | evaluation | (l) appearance | streak immediately after | A | A | A | A | A | A |
| container |  |  | 48 hrs later | A | B | A | A | A | A |
|  |  |  | 96 hrs later | A | C | A | B | B | B |
|  |  |  | seed 48 hrs later | A | A | A | B | A | A |
|  |  |  | 96 hrs later | B | A | A | B | B | B |
|  |  | (m) impact resistance | OTR before drop test | A | B | A | B | B | B |
|  |  | at low temperature |  after drop test | B | C | B | B | B | C |

TABLE 9

|  |  |  |  | Example 19 | Example 20 | Example 21 | Example 22 | Example 23 | Example 24 |
|---|---|---|---|---|---|---|---|---|---|
| Resin | resin composition |  | mol % | 19 | 20 | 21 | 22 | 23 | 24 |
| com- | ethylene unit content |  | mol % | 32 | 32 | 32 | 32 | 32 | 32 |
| position | boron compound (B) |  | ppm | 1200 | 1200 | 1200 | 2400 | 2400 | 4800 |
|  | free boric acid (C) | proportion | mass % | 2.80 | 6.80 | 9.5 | 2.8 | 6.8 | 9.5 |
|  |  | content | ppm | 33.6 | 81.6 | 114 | 67.2 | 163 | 456 |
|  | MI |  | g/10 min (190° C., 2,160 g) | 1.2 | 1.2 | 1.2 | 0.8 | 0.8 | 0.3 |
| Eval- | (a) coextrusion coatability | neck-in | immediately after | A | A | A | A | A | A |
| uations |  | torque | immediately after | A | A | A | B | B | B |
|  |  |  | 8 hrs later | A | B | B | B | C | C |
|  |  |  | 24 hrs later | B | B | C | C | C | C |
|  |  | fish eye | immediately after | A | A | A | A | A | A |
|  |  |  | 8 hrs later | A | B | B | B | B | C |
|  |  |  | 24 hrs later | B | B | C | B | C | C |
|  |  | streak | immediately after | A | A | A | A | A | A |
|  |  |  | 8 hrs later | A | B | B | B | C | C |
|  |  |  | 24 hrs later | B | B | C | B | C | C |
|  |  | foaming | immediately after | absent | absent | absent | absent | absent | absent |

TABLE 9-continued

|  |  |  |  | Example 19 | Example 20 | Example 21 | Example 22 | Example 23 | Example 24 |
|---|---|---|---|---|---|---|---|---|---|
|  |  | (b) multilayer film formability by coextrusion | fish eye | immediately after | A | A | A | A | A | A |
|  |  |  |  | 240 hrs later | B | B | C | B | C | C |
|  |  |  | film hue | 240 hrs later | A | A | A | A | A | A |
|  |  | (c) thermoformability | PO resin layer adhesion layer streak | immediately after |  |  |  |  |  |  |
|  |  |  |  | 48 hrs later |  |  |  |  |  |  |
|  |  |  |  | 96 hrs later |  |  |  |  |  |  |
| Film | evaluation | (d) film formability | neck-in | immediately after | A | A | A | A | A | A |
|  |  |  | fish eye | 48 hrs later | A | B | B | B | B | C |
|  |  |  |  | 96 hrs later | B | B | C | B | C | C |
|  |  | (e) stretchability | biaxial stretchability | 96 hrs later | B | B | C | C | C | C |
|  |  | (f) impact resistance at low temperature | radius of ceramic sphere | mm | 10 | 10 | 10 |  |  | 5 |
|  |  |  | OTR after transportation test |  | B | C | C |  |  | C |
| Vapor deposition film | inorganic vapor deposition layer | face with vapor deposition |  | one face | one face | one face | one face | one face | one face |
|  |  |  | thickness | nm | 70 | 70 | 70 | 70 | 70 | 70 |
|  | evaluation | (g) impact resistance at low temperature | radius of ceramic sphere | mm | 10 | 10 | 10 |  |  | 5 |
|  |  |  | OTR after transportation test |  | B | B | C |  |  | C |
|  |  | (h) heat cycle resistance | OTR after heat cycle test |  | B | B | C |  |  | C |
| Thermo-formed container | evaluation | PO resin layer |  |  | P-3 | P-3 | P-3 | P-2 | P-2 | P-2 |
|  |  | adhesive resin layer |  |  | A-3 | A-3 | A-3 | A-2 | A-2 | A-2 |
|  |  | (i) thickness unevenness of layer of multilayer sheet |  | immediately after | A | A | A | A | A | B |
|  |  | (j) appearance | streak | immediately after | A | A | A | A | A | B |
|  |  |  |  | 48 hrs later | A | B | B | B | C | C |
|  |  |  |  | 96 hrs later | B | B | C | C | C | C |
|  |  |  | coloring | 96 hrs later | A | A | A | A | A | A |
|  |  |  | seed | 96 hrs later | B | B | C | B | C | C |
|  |  | (k) impact resistance at low temperature | OTR | before drop test | B | B | B | B | C | C |
|  |  |  |  | after drop test | C | C | C | C | C | C |
| Blow-molded container | evaluation | adhesive resin |  |  | A'-3 | A'-3 | A'-3 | A'-2 | A'-2 | A'-2 |
|  |  | (l) appearance | streak | immediately after | A | A | A | A | A | B |
|  |  |  |  | 48 hrs later | A | B | B | B | C | C |
|  |  |  |  | 96 hrs later | B | B | C | C | C | C |
|  |  |  | seed | 48 hrs later | A | B | B | B | B | C |
|  |  |  |  | 96 hrs later | B | B | C | B | C | C |
|  |  | (m) impact resistance at low temperature | OTR | before drop test | B | B | B | B | C | C |
|  |  |  |  | after drop test | C | C | C | C | C | C |

TABLE 10

|  |  |  |  | Example 25 | Example 26 | Example 27 | Example 28 | Example 29 | Example 30 |
|---|---|---|---|---|---|---|---|---|---|
| resin composition | resin composition |  |  | 25 | 26 | 27 | 28 | 29 | 30 |
|  | ethylene unit content |  | mol % | 32 | 32 | 32 | 32 | 32 | 32 |
|  | boron compound (B) |  | ppm | 530 | 1200 | 1200 | 1200 | 1200 | 2400 |
|  | free boric acid (C) | proportion | mass % | 0.7 | 0.13 | 0.13 | 2.8 | 9.5 | 0.7 |
|  |  | content | ppm | 3.50 | 1.20 | 1.20 | 1.2 | 1 | 0.8 |
|  | MI |  | g/10 min (190° C., 2,160 g) | 3.5 | 1.2 | 1.2 | 1.2 | 1.2 | 0.8 |

TABLE 10-continued

|  |  |  |  | Example 25 | Example 26 | Example 27 | Example 28 | Example 29 | Example 30 |
|---|---|---|---|---|---|---|---|---|---|
| Evaluations | (a) coextrusion coatability | neck-in | immediately after | B | A | A | A | A | A |
|  |  | torque | immediately after | A | A | A | A | A | B |
|  |  |  | 8 hrs later | A | A | A | A | A | B |
|  |  |  | 24 hrs later | A | A | A | B | C | B |
|  |  | fish eye | immediately after | A | A | A | A | A | A |
|  |  |  | 8 hrs later | A | A | A | A | B | A |
|  |  |  | 24 hrs later | A | A | A | B | C | A |
|  |  | streak | immediately after | A | A | A | A | A | A |
|  |  |  | 8 hrs later | A | A | A | A | B | B |
|  |  |  | 24 hrs later | A | A | A | B | C | B |
|  |  | foaming | immediately after | absent | absent | absent | absent | absent | absent |
|  | (b) multilayer film formability by coextrusion | fish eye | immediately after | A | A | A | A | A | A |
|  |  |  | 240 hrs later | A | A | A | B | C | A |
|  |  | film hue | 240 hrs later | A | A | A | A | A | A |
|  | (c) thermoformability | PO resin layer |  |  |  |  |  |  |  |
|  |  | adhesion layer |  |  |  |  |  |  |  |
|  |  | streak | immediately after |  |  |  |  |  |  |
|  |  |  | 48 hrs later |  |  |  |  |  |  |
|  |  |  | 96 hrs later |  |  |  |  |  |  |
| Film evaluation | (d) film formability | neck-in | immediately after | B | A | A | A | A | A |
|  |  | fish eye | 48 hrs later | A | A | A | A | B | A |
|  |  |  | 96 hrs later | A | A | A | B | C | A |
|  | (e) stretchability | biaxial stretchability | 96 hrs later | A | A | A | B | C | B |
|  | (f) impact resistance at low temperature | radius of ceramic sphere | mm |  | 10 | 10 | 10 | 10 |  |
|  |  | OTR after transportation test |  |  | C | A | B | C |  |
| Vapor deposition film | inorganic vapor deposition layer | face with vapor deposition |  | one face | one face | one face | one face | one face | one face |
|  |  | thickness | nm | 70 | 70 | 70 | 70 | 70 | 70 |
|  | evaluation | (g) impact resistance at low temperature | radius of ceramic sphere | mm |  | 10 | 10 | 10 | 10 |  |
|  |  | OTR after transportation test |  |  | C | A | B | C |  |
|  |  | (h) heat cycle resistance | OTR after heat cycle test |  | A | A | B | C |  |
| Thermoformed container evaluation | PO resin layer |  |  | P-1 | P-3 | P-3 | P-3 | P-3 | P-2 |
|  | adhesive resin layer |  |  | A-1 | A-3 | A-3 | A-3 | A-3 | A-2 |
|  | (i) thickness unevenness of layer of multilayer sheet |  | immediately after | A | A | A | A | A | A |
|  | (j) appearance | streak | immediately after | A | A | A | A | A | A |
|  |  |  | 48 hrs later | A | B | A | A | B | A |
|  |  |  | 96 hrs later | B | C | A | B | C | A |
|  |  | coloring | 96 hrs later | A | A | A | A | A | A |
|  |  | seed | 96 hrs later | A | A | A | B | C | A |
|  | (k) impact resistance at low temperature | OTR | before drop test | B | B | A | B | B | A |
|  |  |  | after drop test | B | B | A | C | C | B |
| Blow-molded container evaluation | adhesive resin |  |  | A'-1 | A'-3 | A'-3 | A'-3 | A'-3 | A'-2 |
|  | (l) appearance | streak | immediately after | A | A | A | A | A | A |
|  |  |  | 48 hrs later | A | B | A | A | B | A |
|  |  |  | 96 hrs later | B | C | A | B | C | A |
|  |  | seed | 48 hrs later | A | A | A | B | C | A |
|  |  |  | 96 hrs later | A | A | A | B | C | A |
|  | (m) impact resistance at low temperature | OTR | before drop test | B | B | A | B | B | A |
|  |  |  | after drop test | B | B | A | C | C | B |

TABLE 11

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Resin composition | | resin composition | | C1 | C2 | C3 | C4 | C5 | C6 |
| | | ethylene unit content | mol % | 32 | 32 | 32 | 32 | 32 | 32 |
| | | boron compound (B) | ppm | 110 | 1200 | 1500 | 4800 | 80 | 6500 |
| | free boric acid (C) | proportion | mass % | 0.02 | 0.02 | 0.02 | 0.02 | 0.7 | 0.7 |
| | | content | ppm | 0.02 | 0.24 | 0.30 | 0.96 | 0.56 | 45.5 |
| | | MI | g/10 min (190° C., 2,160 g) | 6.5 | 1.2 | 1.1 | 0.3 | 7.0 | less than 0.1 |
| Evaluations | (a) coextrusion coatability | neck-in | immediately after | C | A | A | A | D | A |
| | | torque | immediately after | A | A | A | B | A | C |
| | | | 8 hrs later | A | A | A | B | A | D |
| | | | 24 hrs later | A | A | A | B | A | D |
| | | fish eye | immediately after | A | A | A | A | A | A |
| | | | 8 hrs later | A | A | A | A | A | C |
| | | | 24 hrs later | A | A | A | A | A | C |
| | | streak | immediately after | A | A | A | A | A | A |
| | | | 8 hrs later | A | A | A | A | A | B |
| | | | 24 hrs later | A | A | A | A | A | B |
| | | foaming | immediately after | absent | absent | absent | absent | absent | absent |
| | (b) multilayer film formability by coextrusion | fish eye | immediately after | A | A | A | A | A | A |
| | | | 240 hrs later | A | A | A | A | A | * |
| | | film hue | 240 hrs later | A | A | A | A | A | |
| | (c) thermoformability | PO resin layer | | P-1 | P-3 | P-3 | P-2 | | |
| | | adhesion layer | | A-1 | A-3 | A-3 | A-2 | | |
| | | streak | immediately after | A | B | A | A | | |
| | | | 48 hrs later | C | C | C | C | | |
| | | | 96 hrs later | D | D | D | D | | |
| Film evaluation | (d) film formability | neck-in | immediately after | C | A | A | A | D | A |
| | | fish eye | 48 hrs later | A | A | A | A | A | C |
| | | | 96 hrs later | A | A | A | A | A | C |
| | (e) stretchability | biaxial stretchability | 96 hrs later | A | A | A | C | A | D |
| | (f) impact resistance at low temperature | radius of ceramic sphere | mm | 20 | 10 | 7 | 5 | | |
| | | OTR after transportation test | | D | D | D | D | | |
| Vapor deposition film | inorganic vapor deposition layer | face with vapor deposition | | one face | one face | one face | one face | one face | one face |
| | | thickness | nm | 70 | 70 | 70 | 70 | 70 | 70 |
| | evaluation | (g) impact resistance at low temperature | radius of ceramic sphere | mm | 20 | 10 | 7 | 5 | |
| | | | OTR after transportation test | D | D | D | D | | |
| | | (h) heat cycle resistance | OTR after heat cycle test | A | A | A | A | | |
| Thermoformed container | | PO resin layer | | P-1 | P-3 | P-3 | P-2 | P-1 | P-2 |
| | | adhesive resin layer | | A-1 | A-3 | A-3 | A-2 | A-1 | A-2 |
| | evaluation | (i) thickness unevenness of layer of multilayer sheet | immediately after | C | A | A | B | D | D |
| | | (j) appearance streak | immediately after | A | A | A | A | A | B |
| | | | 48 hrs later | C | C | C | C | C | C |
| | | | 96 hrs later | D | D | D | D | D | D |
| | | coloring | 96 hrs later | A | A | A | A | A | A |
| | | seed | 96 hrs later | A | A | A | D | A | D |
| | | (k) impact resistance at low temperature | OTR before drop test | D | C | C | C | B | C |
| | | | after drop test | D | D | D | D | D | D |
| Blow-molded container | | adhesive resin | | A'-1 | A'-3 | A'-3 | A'-2 | A'-1 | A'-2 |
| | evaluation | (l) appearance streak | immediately after | A | A | A | A | A | B |
| | | | 48 hrs later | C | C | C | C | C | C |
| | | | 96 hrs later | D | D | D | D | D | D |
| | | seed | 48 hrs later | A | A | A | C | A | C |
| | | | 96 hrs later | A | A | A | D | A | D |

TABLE 11-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| (m) impact resistance at low temperature | OTR | before drop test | D | C | C | C | B | C |
|  |  | after drop test | D | D | D | D | D | D |

*The operation was stopped due to excessive torque attained.

TABLE 12

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| Resin composition | resin composition | | | C7 | C8 | C9 | C10 | C11 | C12 |
| | ethylene unit content | | mol % | 32 | 32 | 32 | 32 | 32 | 32 |
| | boron compound (B) | | ppm | 110 | 730 | 1200 | 1500 | 2400 | 4800 |
| | free boric acid (C) | proportion | mass % | 12 | 12 | 12 | 12 | 12 | 12 |
| | | content | ppm | 13.2 | 87.6 | 144 | 180 | 288 | 576 |
| | MI | | g/10 min (190° C., 2,160 g) | 6.7 | 2.1 | 1.2 | 1.1 | 0.8 | 0.4 |
| Evaluations | (a) coextrusion coatability | neck-in | immediately after | D | B | A | A | A | A |
| | | torque | immediately after | A | A | A | A | A | A |
| | | | 8 hrs later | A | B | B | B | C | C |
| | | | 24 hrs later | B | B | C | C | C | D |
| | | fish eye | immediately after | A | A | A | A | A | B |
| | | | 8 hrs later | A | B | B | B | B | C |
| | | | 24 hrs later | B | C | C | C | D | D |
| | | streak | immediately after | A | A | A | A | A | A |
| | | | 8 hrs later | A | B | C | C | C | C |
| | | | 24 hrs later | B | B | C | C | C | D |
| | | foaming | immediately after | absent | absent | absent | absent | absent | absent |
| | (b) multilayer film formability by coextrusion | fish eye | immediately after | A | A | A | A | A | B |
| | | | 240 hrs later | B | D | D | D | D | * |
| | | film hue | 240 hrs later | A | A | A | A | A | |
| | (c) thermoformability | PO resin layer adhesion layer streak | immediately after 48 hrs later 96 hrs later | | | | | | |
| Film evaluation | (d) film formability | neck-in | immediately after | D | B | A | A | A | A |
| | | fish eye | 48 hrs later | A | B | B | B | B | C |
| | | | 96 hrs later | B | C | C | C | D | D |
| | (e) stretchability | biaxial stretchability | 96 hrs later | B | D | D | D | D | D |
| | (f) impact resistance at low temperature | radius of ceramic sphere | mm | | | | | | |
| | | OTR after transportation test | | | | | | | |
| Vapor deposition film | inorganic vapor deposition layer | face with vapor deposition | | one face | one face | one face | one face | one face | one face |
| | | thickness | nm | 70 | 70 | 70 | 70 | 70 | 70 |
| | evaluation | (g) impact resistance at low temperature | radius of ceramic sphere | mm | | | | | |
| | | OTR after transportation test | | | | | | | |
| | (h) heat cycle resistance | OTR after heat cycle test | | | | | | | |

TABLE 12-continued

|  |  |  |  | Comparative Example 7 | Comparative Example 8 | Comparative Example 9 | Comparative Example 10 | Comparative Example 11 | Comparative Example 12 |
|---|---|---|---|---|---|---|---|---|---|
| Thermo-formed container | evaluation | PO resin layer | | P-1 | P-1 | P-3 | P-3 | P-2 | P-2 |
| | | adhesive resin layer | | A-1 | A-1 | A-3 | A-3 | A-2 | A-2 |
| | | (i) thickness unevenness of layer of multilayer sheet | immediately after | C | A | A | A | A | B |
| | | (j) appearance streak | immediately after | A | A | A | C | B | B |
| | | | 48 hrs later | C | D | C | C | C | D |
| | | | 96 hrs later | D | D | C | D | D | D |
| | | coloring | 96 hrs later | A | A | A | A | A | A |
| | | seed | 96 hrs later | D | D | D | D | D | D |
| | (k) impact resistance at low temperature | OTR | before drop test | C | C | C | C | C | C |
| | | | after drop test | D | D | D | D | D | D |
| Blow-molded container | evaluation | adhesive resin | | A'-1 | A'-1 | A'-3 | A'-3 | A'-2 | A'-2 |
| | | (l) appearance streak | immediately after | A | A | A | C | B | B |
| | | | 48 hrs later | C | D | C | C | C | D |
| | | | 96 hrs later | D | D | C | D | D | D |
| | | seed | 48 hrs later | B | C | D | C | C | D |
| | | | 96 hrs later | D | D | D | D | D | D |
| | (m) impact resistance at low temperature | OTR | before drop test | C | C | C | C | C | C |
| | | | after drop test | D | D | D | D | D | D |

*The operation was stopped due to excessive torque attained.

TABLE 13

|  |  |  |  | Comparative Example 13 | Comparative Example 14 | Comparative Example 15 | Comparative Example 16 | Comparative Example 17 | Comparative Example 18 |
|---|---|---|---|---|---|---|---|---|---|
| Resin composition | resin composition | | | C13 | C14 | C15 | C16 | C17 | C18 |
| | ethylene unit content | | mol % | 32 | 32 | 32 | 32 | 32 | 32 |
| | boron compound (B) | | ppm | 1200 | 1200 | 4800 | 4800 | 1200 | 4800 |
| | free boric acid (C) | proportion | mass % | 0.03 | 11.1 | 0.03 | 10.5 | 0.04 | 0.04 |
| | | content | ppm | 0.36 | 133 | 1.44 | 504 | 0.48 | 1.92 |
| | MI | | g/10 min (190° C., 2,160 g) | 1.2 | 1.2 | 0.3 | 0.4 | 1.2 | 0.3 |
| Evaluations | (a) coextrusion coatability | neck-in | immediately after | A | A | A | A | A | A |
| | | torque | immediately after | A | A | B | B | A | B |
| | | | 8 hrs later | A | B | B | C | A | B |
| | | | 24 hrs later | A | C | C | D | A | C |
| | | fish eye | immediately after | A | A | A | C | A | A |
| | | | 8 hrs later | A | B | A | C | A | A |
| | | | 24 hrs later | A | C | B | D | A | B |
| | | streak | immediately after | A | A | A | B | A | A |
| | | | 8 hrs later | A | C | A | C | A | A |
| | | | 24 hrs later | A | C | B | D | A | B |
| | | foaming | immediately after | absent | absent | absent | absent | absent | absent |
| | (b) multilayer film formability by coextrusion | fish eye | immediately after | A | A | A | B | A | A |
| | | | 240 hrs later | A | D | A | * | A | A |
| | | film hue | 240 hrs later | A | A | C | | C | B |
| | (c) thermo-formability | PO resin layer | | P-3 | | P-2 | | P-3 | P-2 |
| | | adhesion layer | | A-3 | | A-2 | | A-3 | A-2 |
| | | streak | immediately after | B | | A | | B | A |
| | | | 48 hrs later | C | | D | | C | D |
| | | | 96 hrs later | D | | D | | D | D |
| Film evaluation | (d) film formability | neck-in | immediately after | A | A | A | A | A | A |
| | | fish eye | 48 hrs later | A | B | A | C | A | A |
| | | | 96 hrs later | A | C | B | D | A | B |

TABLE 13-continued

|  |  |  |  | Comparative Example 13 | Comparative Example 14 | Comparative Example 15 | Comparative Example 16 | Comparative Example 17 | Comparative Example 18 |
|---|---|---|---|---|---|---|---|---|---|
|  |  | (e) stretchability | biaxial stretchability | 96 hrs later | A | D | C | D | A | C |
|  |  | (f) impact resistance at low temperature | radius of ceramic sphere | mm | 10 |  | 5 |  | 10 | 5 |
|  |  |  |  | OTR after transportation test | D |  | D |  | D | D |
| Vapor deposition film | inorganic vapor deposition layer evaluation | face with vapor deposition thickness | | nm | one face 70 | one face 70 | one face 70 | one face 70 | one face 70 | one face 70 |
|  |  | (g) impact resistance at low temperature | radius of ceramic sphere | mm | 10 |  | 5 |  | 10 | 5 |
|  |  |  |  | OTR after transportation test | D |  | D |  | D | D |
|  |  | (h) heat cycle resistance | OTR after heat cycle test |  | A |  | B |  | A | B |
| Thermoformed container | evaluation | PO resin layer | | | P-3 | P-3 | P-2 | P-2 | P-3 | P-2 |
|  |  | adhesive resin layer | | | A-3 | A-3 | A-2 | A-2 | A-3 | A-2 |
|  |  | (i) thickness unevenness of layer of multilayer sheet | | immediately after | A | A | B | B | A | B |
|  |  | (j) appearance | streak | immediately after | B | A | A | B | B | A |
|  |  |  |  | 48 hrs later | C | C | D | C | C | D |
|  |  |  |  | 96 hrs later | D | C | D | D | D | D |
|  |  |  | coloring | 96 hrs later | A | A | C | C | C | B |
|  |  |  | seed | 96 hrs later | A | D | D | D | A | D |
|  |  | (k) impact resistance at low temperature | OTR | before drop test | C | C | C | C | C | C |
|  |  |  |  | after drop test | D | D | D | D | D | D |
| Blow-molded container | evaluation | adhesive resin | | | A'-3 | A'-3 | A'-2 | A'-2 | A'-3 | A'-2 |
|  |  | (l) appearance | streak | immediately after | B | A | A | B | B | A |
|  |  |  |  | 48 hrs later | C | C | D | C | C | D |
|  |  |  |  | 96 hrs later | D | C | D | D | D | D |
|  |  |  | seed | 48 hrs later | A | C | C | C | A | C |
|  |  |  |  | 96 hrs later | A | D | D | D | A | D |
|  |  | (m) impact resistance at low temperature | OTR | before drop test | C | C | C | C | C | C |
|  |  |  |  | after drop test | D | D | D | D | D | D |

*The operation was stopped due to excessive torque attained.

TABLE 14

|  |  |  |  | Comparative Example 19 | Comparative Example 20 | Comparative Example 21 | Comparative Example 22 |
|---|---|---|---|---|---|---|---|
| Resin composition | resin composition | | | C19 | C20 | C21 | C22 |
|  | ethylene unit content | | mol % | 32 | 32 | 32 | 32 |
|  | boron compound (B) | | ppm | 4800 | 1200 | 1200 | 1200 |
|  | free boric acid (C) | proportion | mass % | 11.9 | 10.6 | 0.02 | 12 |
|  |  | content | ppm | 571 | 127 | 1.56 | 144 |
|  | MI | | g/10 min (190° C., 2,160 g) | 0.4 | 1.2 | 1.2 | 1.2 |
| Evaluations | (a) coextrusion coatability | neck-in | immediately after | A | A | A | A |
|  |  | torque | immediately after | B | A | A | A |
|  |  |  | 8 hrs later | C | B | A | B |
|  |  |  | 24 hrs later | D | C | A | C |
|  |  | fish eye | immediately after | B | A | A | A |
|  |  |  | 8 hrs later | D | B | A | B |
|  |  |  | 24 hrs later | D | C | A | C |

TABLE 14-continued

|  |  |  |  | Comparative Example 19 | Comparative Example 20 | Comparative Example 21 | Comparative Example 22 |
|---|---|---|---|---|---|---|---|
|  |  | streak | immediately after | A | A | A | A |
|  |  |  | 8 hrs later | C | B | A | C |
|  |  |  | 24 hrs later | D | C | A | C |
|  |  | foaming | immediately after | absent | absent | absent | absent |
|  | (b) multilayer film formability by coextrusion | fish eye | immediately after | B | A | A | A |
|  |  |  | 240 hrs later | * | D | A | D |
|  |  | film hue | 240 hrs later |  | B | A | A |
|  | (c) thermoformability | PO resin layer |  |  |  | P-3 |  |
|  |  | adhesion layer |  |  |  | A-3 |  |
|  |  | streak | immediately after |  |  | B |  |
|  |  |  | 48 hrs later |  |  | C |  |
|  |  |  | 96 hrs later |  |  | D |  |
| Film | eval- uation | (d) film formability | neck-in | immediately after | A | A | A | A |
|  |  |  | fish eye | 48 hrs later | D | B | A | B |
|  |  |  |  | 96 hrs later | D | C | A | C |
|  |  | (e) stretch- ability | biaxial stretchability | 96 hrs later | D | C | A | D |
|  |  | (f) impact resistance at low temperature | radius of ceramic sphere | mm |  | 10 | 10 |  |
|  |  |  | OTR after transportation test |  |  | D | D |  |
| Vapor deposition film | eval- uation | inorganic vapor deposition layer | face with vapor deposition | one face | one face | one face | one face |
|  |  |  | thickness | nm | 70 | 70 | 70 | 70 |
|  |  | (g) impact resistance at low temperature | radius of ceramic sphere | mm |  | 10 | 10 |  |
|  |  |  | OTR after transportation test |  |  | D | D |  |
|  |  | (h) heat cycle resistance | OTR after heat cycle test |  |  | C | A |  |
| Thermo- formed container | eval- uation | PO resin layer |  |  | P-2 | P-3 | P-3 | P-3 |
|  |  | adhesive resin layer |  |  | A-2 | A-3 | A-3 | A-3 |
|  |  | (i) thickness unevenness of layer of multilayer sheet |  | immediately after | B | A | A | A |
|  |  | (j) appearance | streak | immediately after | B | A | B | B |
|  |  |  |  | 48 hrs later | D | C | C | C |
|  |  |  |  | 96 hrs later | D | C | D | D |
|  |  |  | coloring | 96 hrs later | B | B | A | A |
|  |  |  | seed | 96 hrs later | D | D | A | D |
|  |  | (k) impact resistance at low temperature | OTR | before drop test | C | C | C | C |
|  |  |  |  | after drop test | D | D | D | D |
| Blow- molded container | eval- uation | adhesive resin |  |  | A'-2 | A'-3 | A'-3 | A'-3 |
|  |  | (l) appearance | streak | immediately after | B | A | B | B |
|  |  |  |  | 48 hrs later | D | C | C | C |
|  |  |  |  | 96 hrs later | D | C | D | D |
|  |  |  | seed | 48 hrs later | D | C | A | D |
|  |  |  |  | 96 hrs later | D | D | A | D |
|  |  | (m) impact resistance at low temperature | OTR | before drop test | C | C | C | C |
|  |  |  |  | after drop test | D | D | D | D |

*The operation was stopped due to excessive torque attained.

TABLE 15

|  |  |  |  | Comparative Example 31 | Comparative Example 32 | Comparative Example 33 | Comparative Example 34 | Comparative Example 23 |
|---|---|---|---|---|---|---|---|---|
| Resin com- position | resin composition |  |  | 31 | 32 | 33 | 34 | C23 |
|  | ethylene unit content |  | mol % | 32 | 32 | 32 | 32 | 32 |
|  | boron compound (B) |  | ppm | 1200 | 1200 | 1200 | 1200 | 1200 |
|  | free boric acid (C) | proportion | mass % | 0.2 | 2.1 | 0.9 | 1.1 | 0.02 |
|  |  | content | ppm | 2.4 | 25.2 | 10.8 | 13.2 | 0.24 |
|  | MI |  | g/10 min (190° C., 2,160 g) | 1.2 | 1.2 | 1.2 | 1.2 | 1.2 |

TABLE 15-continued

|  |  |  |  | Comparative Example 31 | Comparative Example 32 | Comparative Example 33 | Comparative Example 34 | Comparative Example 23 |
|---|---|---|---|---|---|---|---|---|
| Evaluations | (a) coextrusion coatability | neck-in | immediately after | A | A | A | A | A |
|  |  | torque | immediately after | A | A | A | A | A |
|  |  |  | 8 hrs later | A | A | A | A | A |
|  |  |  | 24 hrs later | A | B | A | A | A |
|  |  | fish eye | immediately after | A | A | A | A | B |
|  |  |  | 8 hrs later | A | A | A | A | B |
|  |  |  | 24 hrs later | A | B | A | A | C |
|  |  | streak | immediately after | A | A | A | A | A |
|  |  |  | 8 hrs later | A | A | A | A | B |
|  |  |  | 24 hrs later | A | B | A | A | B |
|  |  | foaming | immediately after | absent | absent | absent | absent | present |
|  | (b) multilayer film formability by coextrusion | fish eye | immediately after | A | A | A | A | A |
|  |  |  | 240 hrs later | A | B | A | A | C |
|  |  | film hue | 240 hrs later | A | A | C | B | D |
|  | (c) thermoformability | PO resin layer |  | P-3 |  |  |  | P-3 |
|  |  | adhesion layer |  | A-3 |  |  |  | A-3 |
|  |  | streak | immediately after | A |  |  |  | B |
|  |  |  | 48 hrs later | B |  |  |  | C |
|  |  |  | 96 hrs later | B |  |  |  | D |
| Film evaluation | (d) film formability | neck-in | immediately after | A | A | A | A | A |
|  |  | fish eye | 48 hrs later | A | A | A | A | C |
|  |  |  | 96 hrs later | A | B | C | A | C |
|  | (e) stretchability | biaxial stretchability | 96 hrs later | A | B | B | A | B |
|  | (f) impact resistance at low temperature | radius of ceramic sphere | mm | 10 | 10 | 10 | 10 | 10 |
|  |  | OTR after transportation test |  | B | A | A | A | D |
| Vapor deposition film | inorganic vapor deposition layer | face with vapor deposition | | one face | one face | one face | one face | one face |
|  |  | thickness | nm | 70 | 70 | 70 | 70 | 70 |
|  | evaluation (g) impact resistance at low temperature | radius of ceramic sphere | mm | 10 | 10 | 10 | 10 | 10 |
|  |  | OTR after transportation test |  | C | B | B | A | D |
|  | (h) heat cycle resistance | OTR after heat cycle test |  | A | B | C | A | A |
| Thermoformed container evaluation |  | PO resin layer |  | P-3 | P-3 | P-3 | P-3 | P-3 |
|  |  | adhesive resin layer |  | A-3 | A-3 | A-3 | A-3 | A-3 |
|  | (i) thickness unevenness of layer of multilayer sheet |  | immediately after | A | A | A | A | A |
|  | (j) appearance | streak | immediately after | A | A | A | A | B |
|  |  |  | 48 hrs later | B | A | A | A | C |
|  |  |  | 96 hrs later | B | B | A | A | D |
|  |  | coloring | 96 hrs later | A | A | C | B | D |
|  |  | seed | 96 hrs later | A | B | B | B | C |
|  | (k) impact resistance at low temperature | OTR | before drop test | B | A | A | A | C |
|  |  |  | after drop test | B | C | B | B | D |
| Blow-molded container evaluation |  | adhesive resin |  | A'-3 | A'-3 | A'-3 | A'-3 | A'-3 |
|  | (l) appearance | streak | immediately after | A | A | A | A | B |
|  |  |  | 48 hrs later | B | A | A | A | C |
|  |  |  | 96 hrs later | B | B | A | A | D |
|  |  | seed | 48 hrs later | A | A | A | A | C |
|  |  |  | 96 hrs later | A | B | B | B | C |
|  | (m) impact resistance at low temperature | OTR | before drop test | B | A | A | A | C |
|  |  |  | after drop test | B | C | B | B | D |

TABLE 16

| | | | | Example 35 | Example 36 | Example 37 | Comparative Example 24 |
|---|---|---|---|---|---|---|---|
| Resin composition | resin composition | | | 27 | 27 | 27 | C21 |
| | ethylene unit content | | mol % | 32 | 32 | 32 | 32 |
| | boron compound (B) | | ppm | 1200 | 1200 | 1200 | 1200 |
| | free boric acid (C) | proportion | mass % | 0.7 | 0.7 | 0.7 | 0.02 |
| | | content | ppm | 1.20 | 1.20 | 1.2 | 1.56 |
| | MI | | g/10 min (190° C., 2,160 g) | 1.2 | 1.2 | 1.2 | 1.2 |
| Vapor deposition film | inorganic vapor deposition layer | | face with vapor deposition | two faces | one face | one face | two faces |
| | | | thickness  nm | 70 | 25 | 130 | 70 |
| | evaluation | (g) impact resistance at low temperature | radius of ceramic sphere  Mm | 20 | 10 | 10 | 20 |
| | | | OTR after transportation test | A | A | A | D |
| | | (h) heat cycle resistance | OTR after heat cycle test | A | A | A | A |

Production Examples 3, 9, 10, 19, C2 and C9 (Examples 3, 9, 10 and 19, and Comparative Examples 2 and 9) in which boron was added by immersion reveled that a prolonged treatment time period of centrifugal dehydration, and a lowered temperature during principal drying result in a low proportion of the free boric acid (C) even if the concentration of the boron compound (B) was the same. Even in the case in which boric acid was added by the extruder, a similar tendency can be recognized from a comparison of Production Examples 26 to 29, C21 and C22 (Examples 26 to 29, and Comparative Example 21 and 22).

Regarding (a) coextrusion coatability, the following tendency can be confirmed. In the evaluation of neck-in, when the MI of the resin composition as measured at 190° C. under a load of 2,160 g was less than 2 g/10 min, neck-in was less than 50 mm. When the MI was 2 g/10 min or more and 6 g/10 min or less, neck-in became 50 to 100 mm, whereas when the MI was more than 6 g/10 min and 6.6 g/10 min or less, neck-in became 100 to 200 mm. From Example 1 and Comparative Example 7, it was revealed that even when the content of the boron compound (B) was the same, 110 ppm, Comparative Example 7, in which the proportion of the free boric acid (C) was 12%, exhibited a somewhat high MI, 6.7 g/10 min, and also neck-in being further inferior, i.e., 200 mm or more. Furthermore, from Examples 3, 9, 10, 19, 20, and 21 and Comparative Example 9, even when the MI was the same, 1.2 g/10 min, when the proportion of the free boric acid (C) increased, elevation of torque, as well as deterioration of the fish eyes and the streaks were confirmed 8 hrs later and 24 hrs later, although the torque, the fish eye, and the streak immediately after coextrusion coating were all nonproblematic.

Also in the evaluation of (b) multilayer film formability by coextrusion, each resin composition of the Production Examples 1 to 34 revealed that it was possible to continuously produce the multilayer structure (multilayer film) for a long time period, with the fish eyes and coloring being prevented.

The evaluation of (c) thermoformability is made to evaluate influences from the proportion of the free boric acid (C) contained. For example, as in Comparative Example 2, 3 and 4, even when the content of the boron compound (B) in the resin composition was 1,200 ppm, 1,500 ppm or 4,800 ppm, as long as the proportion of the free boric acid (C) was 0.03% by mass, being less than the range specified herein, the appearance of the formed cup was favorable immediately after the operation; however, slight stripes had came to be found 48 hrs later and clear stripes were found 96 hrs later. When the proportion of the free boric acid (C) was 0.7% by mass as in Examples 10 and 13, the appearance was favorable also 96 hrs later.

Moreover, from Examples 10, 33, and 34 (Production Examples 10, 33, and 34), the degree of coloring of the resulting film tends to be changed depending on the atmosphere of the principal drying (see, (b) multilayer film formability by coextrusion and the like). Moreover, from these three Examples (Production Examples), when the treatment temperature of the principal drying was the same, carrying out the vacuum drying lowered the proportion of the free boric acid (C) even when the concentration of the boron compound (B) was the same. Additionally, from a comparison of Comparative Example 2 and Comparative Example 23 (Production Examples C2 and C23), it was revealed that when the acid component such as acetic acid or phosphoric acid was present, inhibition of generation of fish eyes, seeds, etc., as well as coloring and the like was enabled.

From the evaluations on the films (d) to (f), the following tendency can be confirmed. Neck-in was evaluated as A when the MI was less than 2 g/10 min (190° C./2,160 g). When the MT was 2 g/10 min (190° C./2,160 g) or more and 6 g/10 min (190° C./2,160 g) or less, the evaluation result was B, whereas when the MI was greater than 6 g/10 min (190° C./2,160 g) and 6.6 g/10 min (190° C./2,160 g) or less, the evaluation result was C. In Comparative Example 5, in which the content of the boron compound (B) was low, neck-in was evaluated as D. Additionally, from a comparison of Example 1 and Comparative Example 7, even when the boron compound (B) was the same, 110 ppm, Comparative Example 7, in which the proportion of the free boric acid (C) was 12%, revealed somewhat high MI, 6.7 g/10 min (190° C./2,160 g), and neck-in further deterioriated, having an evaluation result of D. Meanwhile, Comparative Example 6, in which the content of the boron compound (B) was high, revealed the results of the MI to be low, and the stretchability to be inferior. When attention is focused on the proportion of the free boron (C) contained, Comparative Examples 1 to 4 and 7 to 23, in which the proportion of the free boron (C) contained was less than 0.1% by mass or was more than 10% by mass, revealed the results of each of film formability (neck-in and fish eyes), stretchability and impact resistance at a low temperature to be inferior. In contrast, all the Examples 1 to 34, in which the content of the boron compound (B) and the proportion of the free boric acid (C) contained fell within the given range, revealed favorable results for all of film formability, stretchability, and impact resistance at a low temperature.

From the evaluations on the vapor deposition film of (g) to (h), the following tendency can be confirmed. Examples 1 to 37 all revealed favorable results for the impact resistance at a low temperature and heat cycle resistance. These results have proven that the vapor deposition film (multilayer structure) of each Example can be suitably used also as, for example, a packaging material for a vacuum insulator. In addition, from the evaluations on the film (d) to (f), each film of Examples 1 to 34 was revealed to be suitable as a base film of a vapor deposition film due to the film formability and stretchability being superior.

From the results regarding the thermoformed containers (i) to (k), the following tendency can be confirmed. When attention is focused on the content of the boron compound (B), Comparative Example 5, in which the content of the boron compound (B) was low, revealed excessively high MI, i.e., excessively low viscosity, thereby leading to significant thickness unevenness of the layer. Resulting from such layer turbulence, streaks are generated, which may serve as origins of cracks, and therefore, the impact resistance at a low temperature (gas barrier properties after the drop test) is considered to be reduced. Furthermore, Comparative Example 6, in which the content of the boron compound (B) was high revealed excessively low MI, i.e., excessively high viscosity, thereby leading to great thickness unevenness of the layer. Thus, seeds and streaks are generated, and these serve as origins of cracks; therefore, impact resistance at a low temperature (gas barrier properties after the drop test) is considered to be inferior. When attention is focused on the proportion of the free boron (C) contained, in Comparative Examples 1 to 4, 13, 15, 17, 18, 21, and 23, in which the proportion of the free boron (C) contained was low, layer turbulence occurred in continuous film formation for a long time period, thereby leading to generation of streaks. Since the streaks serve as origins of cracks, these are conceived to result in inferior impact resistance at a low temperature (gas barrier properties after the drop test). In addition, in Comparative Examples 7 to 12, 14, 16, 19, 20, and 22, in which the proportion of the free boron (C) contained is great, since the free boron (C) caused local crosslinking, the seeds tend to be increased. Since the seeds serve as origins of cracks, these are conceived to result in inferior impact resistance at a low temperature (gas barrier properties after the drop test). In contrast, Examples 1 to 34, in which the content of the boron compound (B) and the proportion of the free boric acid (C) contained fell within the given range, all revealed favorable results for the impact resistance at a low temperature, with fewer streaks and seeds, and less coloring and less thickness unevenness of the layer.

Also from the evaluations regarding the blow-molded container (1) to (m), a similar tendency to that of the thermoformed container can be confirmed. More specifically, when attention is focused on the content of the boron compound (B), Comparative Example 5, in which the content of the boron compound (B) was low, revealed an increase in the streaks during blow molding for a long period of time. This event is speculated to result from, for example, excessively high MI, which may lead to layer turbulence being more likely to occur. In Comparative Example 5, since a large amount of streaks serve as origins of cracks, these are conceived to result in inferior impact resistance at a low temperature (gas barrier properties after the drop test). Meanwhile, Comparative Example 6, in which the content of the boron compound (B) is high, revealed a large number of streaks and seeds. This event is speculated to result from, for example, low MI, and high viscosity, and the like. In Comparative Example 6, since a large amount of streaks and seeds serve as origins of cracks, these are conceived to result in inferior impact resistance at a low temperature (gas barrier properties after the drop test). When attention is focused on the proportion of the free boron (C) contained, in Comparative Examples 1 to 4, 13, 15, 17, 18, 21, and 23, in which the proportion of the free boron (C) contained was low, layer turbulence may occur during blow molding for a long time period, thereby leading to generation of streaks. Since the streaks serve as origins of cracks, these are conceived to result in inferior impact resistance at a low temperature (gas barrier properties after the drop test). Furthermore, in Comparative Examples 7 to 12, 14, 16, 19, 20, and 22, in which the proportion of the free boron (C) contained was great, since the free boron (C) may cause local crosslinking, seeds tend to increase. Since the seeds serve as origins of cracks, these are conceived to result in inferior impact resistance at a low temperature (gas barrier properties after the drop test). Moreover, a comparison of Comparative Example 4 with Example 16 reveals that when the content of the boron compound (B) was high and the proportion of the free boron (C) contained was low (Comparative Example 4), the seeds were proved to be increased, which may result from crosslinking having proceeded. In contrast, Examples 1 to 34, in which the content of the boron compound (B) and the proportion of the free boric acid (C) contained both fell within the given range, all revealed results accompanied by fewer streaks and fewer seeds, with the impact resistance at a low temperature being favorable.

INDUSTRIAL APPLICABILITY

According to the present invention, a resin composition is provided which enables: even in the case in which a film formation temperature is high, excessive elevation of torque to be inhibited with occurrence of neck-in during film formation being prevented; a molded product superior in appearance characteristics to be formed over continuous production for a long time period, with defects such as fish eyes and streaks being prevented; and a multilayer structure being capable of thermoforming a thermoformed product superior in appearance characteristics to be continuously formed over a long time period. In addition, according to the present invention, a production method of such a resin composition, and a molded product and a multilayer structure each including the resin composition can be provided. Such a multilayer structure is superior in appearance characteristics even if processed into various types of containers, for example, shapes of a cup and the like.

Furthermore, the present invention is able to provide: a film that is superior in film formability, stretchability, and impact resistance at a low temperature and a production method thereof, and a packaging material and a vacuum packaging bag in which such a film is used; a vapor deposition film that is superior in film formability, stretchability, and impact resistance at a low temperature, and a packaging material and a vacuum insulator in which such a vapor deposition film is used; a thermoformed container that is accompanied by fewer streaks and seeds, and less coloring and thickness unevenness of the layer, and is superior in impact resistance at a low temperature; and a blow-molded container that is accompanied by fewer streaks and seeds, and is superior in impact resistance at a low temperature, and a fuel container and a bottle-shaped container each including such a blow-molded container.

EXPLANATION OF THE REFERENCE SYMBOLS

1 Cup-shaped container
2 Cup main body
3 Flange portion
4 Opening
5 Inner surface
6 Outer surface
7 Lid
10 Hot cutter
11 Discharge opening
12 Die
13 Revolution blade
14 Rotation axis
15 Cutter box
16 Cool water feed port
17 Cool water
18 Water film
19 Pellet outlet
20 Cool water and pellets
21 Continuous multilayer sheet
30 Heating apparatus
31, 32 Heater
40 Die apparatus
50 Lower mold half
51 Upper mold half
52 Recessed part
53 Plug

The invention claimed is:

1. A resin composition comprising:
an ethylene-vinyl alcohol copolymer (A) having an ethylene unit content of 20 to 60 mol %; and
a boron compound (B),
wherein the boron compound (B) comprises a free boric acid (C),
a content of the boron compound (B) with respect to the ethylene-vinyl alcohol copolymer (A) is 100 ppm or more and 5,000 ppm or less, calculated in terms of orthoboric acid, and
a proportion of the free boric acid (C) in the boron compound (B) is 0.1% by mass or more and 10% by mass or less, calculated in terms of orthoboric acid.

2. The resin composition according to claim 1, further comprising a 1 ppm or more and 500 ppm or less phosphoric acid compound in terms of phosphate radical.

3. The resin composition according to claim 1, further comprising a carboxylic acid and/or a carboxylate ion in an amount of 0.01 µmol/g or more and 20 µmol/g or less in terms of carboxylate radical.

4. The resin composition according to claim 1, wherein a melt index measured in accordance with ASTM D1238 at 190° C. under a load of 2,160 g is 0.1 to 15 g/10 min.

5. A method for producing the resin composition according to claim 1, the method comprising:
dehydrating a composition comprising an ethylene-vinyl alcohol copolymer (A), a boron compound (B), and water, the ethylene-vinyl alcohol copolymer (A) having an ethylene unit content of 20 to 60 mol %; and
drying the composition at a temperature of 70° C. or higher.

6. A molded product comprising the resin composition according to claim 1.

7. The molded product according to claim 6 which is a film or a sheet.

8. A multilayer structure, comprising:
a resin composition layer formed from the resin composition according to claim 1; and
a thermoplastic resin layer.

9. A film formed from the resin composition according to claim 1.

10. The film according to claim 9 which is a stretched film.

11. A method for producing the film according to claim 10, the method comprises:
stretching a film formed from the resin composition.

12. A vapor deposition film, comprising:
a base film (X) formed from the resin composition according to claim 1; and
an inorganic vapor deposition layer (Y) provided to at least one face side of the base film (X).

13. The vapor deposition film according to claim 12, wherein the inorganic vapor deposition layer (Y) is provided to each of both face sides of the base film (X).

14. The vapor deposition film according to claim 12, wherein an average thickness of the inorganic vapor deposition layer (Y) is 15 nm or more and 150 nm or less.

15. A packaging material comprising the film according to claim 9.

16. A vacuum packaging bag comprising the film according to claim 9.

17. A vacuum insulator comprising the vapor deposition film according to claim 12.

18. A thermoformed container comprising a layer formed from the resin composition according to claim 1.

19. The thermoformed container according to claim 18 which is a cup-shaped container.

20. The thermoformed container according to claim 18 which is a tray-shaped container.

21. A blow-molded container comprising a layer formed from the resin composition according to claim 1.

22. A fuel container comprising the blow-molded container according to claim 21.

23. A bottle-shaped container comprising the blow-molded container according to claim 21.

24. The resin composition according to claim 1, wherein the proportion of the free boric acid (C) in the boron compound (B) is 0.5% by mass or more and 10% by mass or less, calculated in terms of orthoboric acid.

* * * * *